US007666953B2

(12) United States Patent
Nakamura et al.

(10) Patent No.: US 7,666,953 B2
(45) Date of Patent: Feb. 23, 2010

(54) PHOSPHINE-PROTONATED HALOAROMATIC COMPOUND ACCELERATOR WITH CURING RESIN AND CURING AGENT

(75) Inventors: Shinya Nakamura, Tsukuba (JP); Mitsuo Katayose, Tsukuba (JP); Kayoko Nakamura, Colmar (FR)

(73) Assignee: Hitachi Chemical Co., Ltd., Tokyo (JP)

( * ) Notice: Subject to any disclaimer, the term of this patent is extended or adjusted under 35 U.S.C. 154(b) by 41 days.

(21) Appl. No.: 12/108,023

(22) Filed: Apr. 23, 2008

(65) Prior Publication Data

US 2009/0005480 A1     Jan. 1, 2009

Related U.S. Application Data

(62) Division of application No. 10/968,216, filed on Oct. 20, 2004, now abandoned.

(30) Foreign Application Priority Data

Oct. 20, 2003     (JP)     .............................. 2003-359335

(51) Int. Cl.
*C08K 3/36*     (2006.01)
*C08L 63/00*     (2006.01)
*C08L 63/04*     (2006.01)

(52) U.S. Cl. ...................... 525/481; 523/466; 525/523; 525/533

(58) Field of Classification Search ....................... None
See application file for complete search history.

(56) References Cited

U.S. PATENT DOCUMENTS

| 7,074,738 | B2 | 7/2006 | Okubo et al. |
| 2004/0039154 | A1 | 2/2004 | Okubo et al. |
| 2006/0014873 | A1 | 1/2006 | Ikezawa et al. |

FOREIGN PATENT DOCUMENTS

| JP | 9-157497 | A | * | 6/1997 |
| JP | 11-060906 | | | 3/1999 |
| JP | 2001-233944 | A | * | 8/2001 |
| JP | 2002-3574 | A | * | 1/2002 |
| JP | 2002-003574 | A | | 1/2002 |
| JP | 2002-080563 | | | 3/2002 |
| JP | 2004-176039 | | | 6/2004 |

OTHER PUBLICATIONS

Japanese Official Action for Application No. 2003-359335, issued Apr. 3, 2007.
"Presentation of Publications and the like", for Application No. 2003-359335, dated May 23, 2005.
M. K. Cooper, et al., "Preparation of Hybrid Bidentate Phosphine Ligands by Reduction of Their Benzyl- or Phenyl-phosphonium Salts. X-Ray Crystal Structure of 2-Aminophenyltriphenylphosphonium Tetrachloronickelate (II)", *Australian Journal of Chemistry*, vol. 45, No. 3 (1992).
Horner, et al., "Zum Spaltungsverlanf gemischt substituierter Tetraaryl-phosphonium-hydroxyde", *Chemische Berichte*, (1958), 91, pp. 52-57.
Caplus accession No. 1958:104011 for the Chemische Berichte article by Horner et al., 1958, with registry No. 102753-96-8, three pages.
Caplus accession No. 1958:104012 for the Chemische Berichte article by Hoffman et al., 1958, with registry No. 102753-96-8, two pages.
Caplus accession No. 1969:11770 for the Justus Liebigs Annalen der Chemie article by Bestmann et al., 1968, with registry No. 70013-27-3, two pages.
Caplus accession No. 1962:79494 for the Chemische Berchte article by Hoffmann et al, 1962, one page.
Caplus accession No. 1979:186021 for the Journal of Physical Chemistry article by Da Silva et al., 1979, with registry No. 70013-27-3, two pages.
Caplus, accession No. 2004:450909 for US Publication No. 2005/0267286 of U.S. Appl. No. 10/968,216, Nakamura et al., Dec. 1, 2005, three pages.
Derwent accession No. 2003-803813 for PCT Publication No. 2003/072628 and US Publication No. 2006/0014873, Ikezawa et al., Sep. 4, 2003, one page.

* cited by examiner

*Primary Examiner*—Robert Sellers
(74) *Attorney, Agent, or Firm*—Antonelli, Terry, Stout & Kraus, LLP.

(57)     ABSTRACT

The invention relates to a curing accelerator for a curing resin obtained by reacting a phosphine compound (a) with a compound (b) having at least one halogen atom substituted on an aromatic ring and at least one proton atom which can be discharged, and subjecting the reaction product to dehydrohalogenation, a curing resin composition containing the curing accelerator, and an electronic component device having a device component encapsulated with the curing resin composition. The curing accelerator exhibits superior curability under moisture absorption, flow properties, reflow cracking resistance and high-temperature storage characteristics.

8 Claims, 28 Drawing Sheets

US 7,666,953 B2

PHOSPHINE-PROTONATED HALOAROMATIC COMPOUND ACCELERATOR WITH CURING RESIN AND CURING AGENT

CROSS REFERENCE TO RELATED APPLICATION

This application is a Divisional application of prior application Ser. No. 10/968,216, filed Oct. 20, 2004, abandoned, the contents of which are incorporated herein by reference in their entirety.

BACKGROUND OF THE INVENTION

1. Field of the Invention

The invention relates to a curing accelerator for a curing resin, a curing resin composition using the curing accelerator, suitable for molding materials, laminated sheet materials or adhesive materials, an electronic component device provided with device components encapsulated with the curing resin composition, and a method for obtaining a phosphine derivative used for the curing accelerator.

2. Description of the Related Art

Curing resins such as an epoxy resin are conventionally used in a wide range as molding materials, laminated sheet materials and adhesive materials. Since these curing resins require rapid curability from the viewpoint of the productivity improvement, compounds for accelerating the curing reaction, that is, curing accelerators are widely used. Of the curing resins, especially, epoxy resin compositions are in wide use in the field of the encapsulation of device components in electronic components such as transistors and ICs. This is because the epoxy resin has properties such as molding properties, electrical properties, moisture resistance, heat resistance, mechanical properties and adhesion to component inserts which are well balanced. Especially, the combination of an o-cresol novolak type epoxy resin and a phenol novolac curing agent excels in these balances, and is preferably used as a base resin for the molding material for IC encapsulation. Amine compounds such as a third amine and imidazole and phosphorus compounds such as phosphines and phosphonium are generally used as the curing accelerator in the epoxy resin compositions.

The high density mounting on printed circuit boards of electronic components has been recently advanced, and, therefore, surface-mounted packages have become mainstream in place of conventional pin inserting type packages in the electronic components. In the surface-mounted ICs such as ICs and LSIs, the occupation volume of the component to the package gradually is increased so as to improve the mounting density, and the thickness of the package has been extremely thin. In the pin inserting type packages, after pins are inserted through the wiring board, soldering is performed from the back of the wiring board, and thereby, the package is not exposed directly to high temperatures. On the other hand, after the surface-mounted type ICs are temporarily attached to the surface of the wiring board, the surface-mounted type ICs are treated by a solder bus and a reflow device or the like, and thereby, the surface-mounted type ICs are exposed directly to soldering temperatures. As a result, when the IC package absorbs moisture, the absorbing moisture expands rapidly at the time of soldering, resulting in the package crack, therefore, this has become the great problem.

So as to improve the reflow cracking resistance to the package crack at the time of the soldering, so-called the flow properties crack, epoxy resin compositions containing a lot of inorganic fillers are proposed. However, since the increasing amount of the inorganic filler causes the decrease in flow properties at the time of molding, faulty filling, faulty conduction due to breaking of bonding wires of IC chips, and the performance of molded products may lower, there is a limit in the increasing amount of the inorganic filler. As a result, this technique can not be expected to bring about any remarkable improvement in the reflow cracking resistance. Particularly, when the amine system curing accelerators such as phosphorus type curing accelerators such as triphenylphosphine, amine type curing accelerators such as 1,8-diazabicyclo[5.4.0]undecene-7 are used, the flow properties is low, and thereby this technique can not be expected to bring about any remarkable improvement in the reflow cracking resistance.

So as to overcome such a problem, it is proposed that an addition product of triphenylphosphine with 1,4-benzoquinone be used as a curing accelerator (see, Japanese Patent Application Laid-Open (JP-A) No. 9-157497). When the addition product is used as the curing accelerator, there is a problem in curability when the resin composition is exposed to air, in a word, curability under moisture absorption. When the molding material having poor curability under moisture absorption absorbs moisture from air at the time of manufacturing, transporting and using, troubles such as gate break, chip crack, the reduction of releasability are easily caused. Also, problems exist in that the difference of the air humidity at the time of manufacturing transporting and using, particularly, and the molding performance is not stable due to the difference of the season. Moreover, a problem in that rapid curability is bad, and the resin composition is not cured in a short time when an organic phospholam compound (see, JP-A No. 11-60906) proposed as a curing accelerator having steady curability is used. So as to overcome such a problem, it is proposed that an addition product of a phosphine compound in which at least one alkyl group is bonded with a phosphorus atom and a quinone compound is used as the curing accelerator (see, JP-A Nos. 2002-3574 and 2002-80563).

However, a problem exists in that when a package encapsulated with the curing resin composition used as the curing accelerator is exposed to high temperature, electrical continuity defect is easily generated in the package, that is, the package has poor high-temperature storage characteristics. The present invention was made taking account of the problems discussed above. It is an object of the present invention to provide a curing accelerator for a curing resin which exhibits superior curability under moisture absorption, flow properties, reflow cracking resistance and high-temperature storage characteristics, a method for obtaining a phosphine derivative used for the curing accelerator, a curing resin composition using the curing accelerator, and an electronic component device having a device component encapsulated with the curing resin composition.

SUMMARY OF THE INVENTION

The inventors have conducted earnest studies to solve the aforementioned problems. As a result, the present inventors have discovered that the curing resin composition having superior curability under moisture absorption, flow properties, reflow cracking resistance can be obtained by using a specific phosphorus compound as the curing accelerator, and the aforementioned object can be achieved. Thus these have accomplished the present invention.

That is, the invention relates to the following.

(1) A curing accelerator for a curing resin obtained by reacting a phosphine compound (a) with a compound (b) having at least one halogen atom substituted on an aromatic ring and at least one proton atom which can be discharged, and subjecting the reaction product to dehydrohalogenation.

(2) The curing accelerator for the curing resin according to the above (1), wherein the phosphine compound (a) is represented by the following general formula (I).

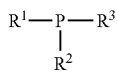

(wherein $R^1$ to $R^3$ in the formula (I) represent a hydrogen atom, or a substituted or unsubstituted hydrocarbon group having 1 to 18 carbon atoms, and each may be the same or different. Two or more of $R^1$ to $R^3$ may be mutually bonded to form a cyclic structure.)

(3) The curing accelerator for the curing resin according to any one of the above (1), (2), wherein the compound (b) having at least one halogen atom substituted on the aromatic ring and at least one proton atom which can be discharged is represented by the following general formula (II).

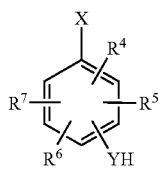

(wherein $R^4$ to $R^7$ in the formula (II) represent a hydrogen atom or a monovalent organic group having 1 to 18 carbon atoms, and each may be the same or different. YH represents a monovalent group having 0 to 18 carbon atoms and at least one proton which can be discharged. X represents a halogen atom. Two or more of $R^4$ to $R^7$ and YH may be mutually bonded to form a cyclic structure.)

(4) The curing accelerator for the curing resin according to the above (3), wherein the compound (b) having at least one halogen atom substituted on the aromatic ring and at least one proton atom which can be discharged has a phenolic hydroxyl group.

(5) The curing accelerator for the curing resin according to the above (2), wherein $R^1$ to $R^3$ in the general formula (I) are a monovalent substituent group selected from the group consisting of an alkyl group and an aryl group which does not have a phenolic hydroxyl group or a mercapto group.

(6) A curing resin composition comprising: at least one kind of the curing accelerator for the curing resin (A) according to any one of the above (1) to (5); and a curing resin (B).

(7) The curing resin composition according to the above (6), wherein the curing resin (B) contains an epoxy resin (C).

(8) The curing resin composition according to any one of the above (6) to (7), further comprising a curing agent (D).

(9) The curing resin composition according to any one of the above (6) to (7), further comprising inorganic filler (E).

(10) The curing resin composition according to the above (7), wherein the epoxy resin (C) contains at least one kind of epoxy resin selected from the group consisting of a biphenyl type epoxy resin, a stilbene type epoxy resin, a diphenylmethane type epoxy resin, a sulfur atom content type epoxy resin, a novolac type epoxy resin, a dicyclopentadiene type epoxy resin, a salicylaldehyde type epoxy resin, a copolymer type epoxy resin of naphthol and cresol, and an epoxidized material of an aralkyl type phenolic resin.

(11) The curing resin composition according to the above (8), wherein the curing agent (D) contains at least one kind selected from the group consisting of an aralkyl type phenolic resin, a dicyclopentadiene type phenolic resin, a salicylaldehyde type phenolic resin, a copolymer type resin of a benzaldehyde type phenolic resin and the aralkyl type phenolic resin, and a novolac type phenolic resin.

(12) An electronic component device comprising a device component encapsulated with the curing resin composition according to any one of the above (6) to (11).

(13) A method for producing a phosphine derivative comprising the steps of: reacting a phosphine compound (a) with a compound (b) having at least one halogen atom substituted on an aromatic ring and at least one proton atom which can be discharged to produce a phosphonium halide; and subjecting the phosphonium halide to dehydrohalogenation.

The curing accelerator for a curing resin of the invention has superior curability under moisture absorption, flow properties, reflow cracking resistance and high-temperature storage characteristics. The curing resin composition using the curing accelerator for the curing resin has superior curability under moisture absorption and flow properties. The electronic component devices having superior reflow cracking resistance, high-temperature storage characteristics and reliability can be obtained by encapsulating the electronic component parts such as IC and LSI with the curing resin composition, promising a great industrial value.

DETAILED DESCRIPTION OF THE PREFERRED EMBODIMENTS

Figure 1:
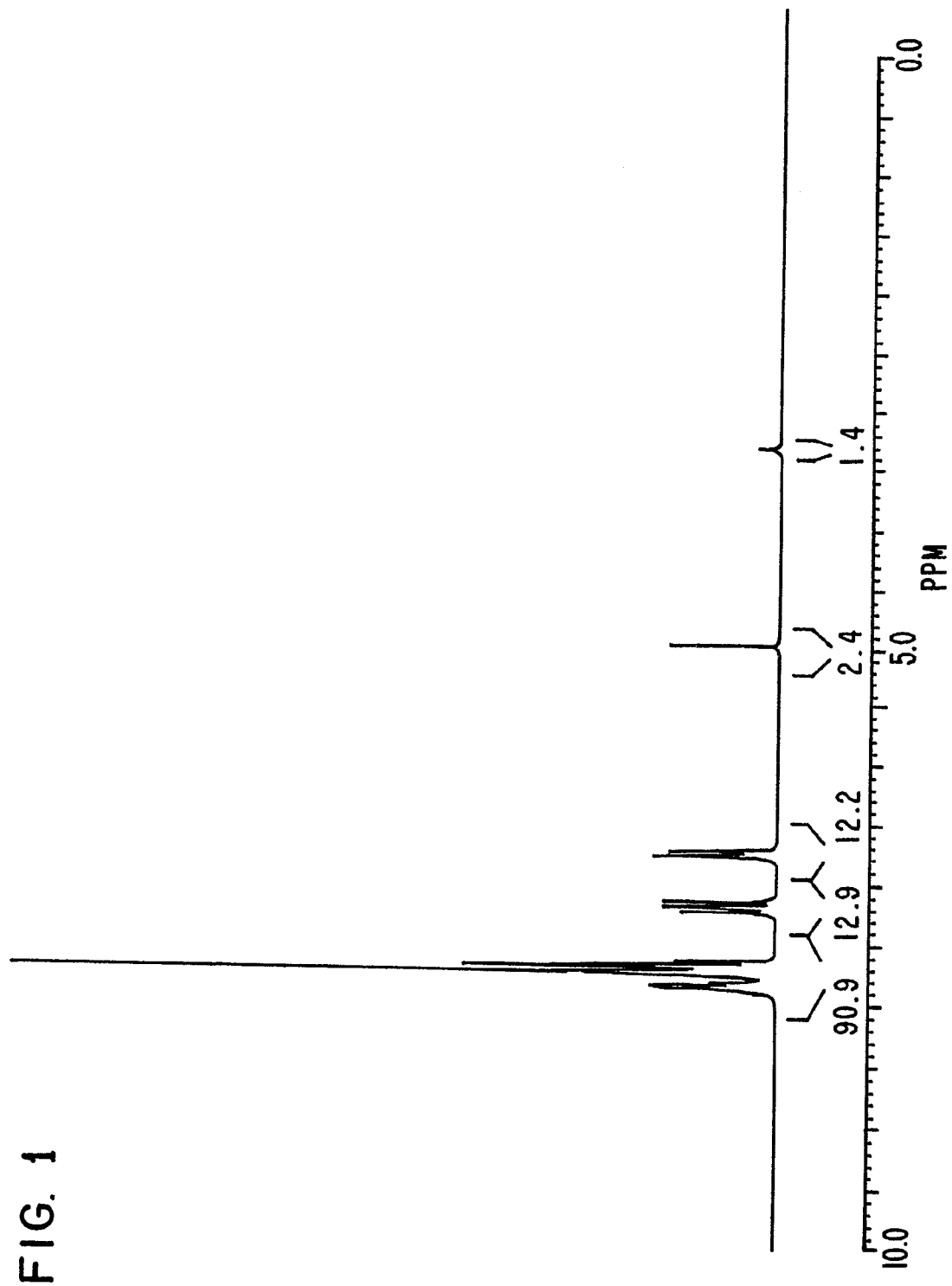
FIG. 1 is the $^1$H-NMR spectrum of a compound 1 obtained by Example of the invention.

There are no particular limitations on the curing accelerator (A) for the curing resin of the invention, as long as the curing accelerator can be obtained by reacting a phosphine compound (a) with a compound (b) having at least one halogen atom substituted on an aromatic ring and at least one proton atom which can be discharged, and then subjecting the reaction product to dehydrohalogenation.

There are no particular limitations on the phosphine compounds (a), as long as the compounds are producible. For instance, examples thereof include the compounds represented by the following general formula (I).

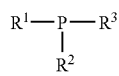

(I)

(wherein $R^1$ to $R^3$ in the formula (I) represent a hydrogen atom, or a substituted or unsubstituted hydrocarbon group having 1 to 18 carbon atoms, and each may be the same or different. Two or more of $R^1$ to $R^3$ may be mutually bonded to form a cyclic structure.)

Though $R^1$ to $R^3$ in the general formula (I) represent a hydrogen atom, or a substituted or unsubstituted hydrocarbon group having 1 to 18 carbon atoms, there are no particular limitations on the substituted or unsubstituted hydrocarbon group having 1 to 18 carbon atoms.

Examples of the substituted or unsubstituted hydrocarbon groups include a substituted or unsubstituted aliphatic hydrocarbon group having 1 to 18 carbon atoms, a substituted or unsubstituted alicyclic hydrocarbon group having 1 to 18 carbon atoms, and a substituted or unsubstituted aromatic hydrocarbon group having 1 to 18 carbon atoms.

Examples of the substituted or unsubstituted aliphatic hydrocarbon groups having 1 to 18 carbon atoms include: alkyl groups such as a methyl group, an ethyl group, a propyl group, an iso-propyl group, an n-butyl group, a sec-butyl group, a tert-butyl group, a pentyl group, a hexyl group, a octyl group, a decyl group, a dodecyl group; allyl groups; vinyl groups; and an aliphatic hydrocarbon group obtained by substituting them with an alkyl group, an alkoxy group, an aryl group, a hydroxyl group, an amino group and a halogen or the like.

Examples of the substituted or unsubstituted alicyclic hydrocarbon groups having 1 to 18 carbon atoms include a cyclopentyl group, a cyclohexyl group, a cycloheptyl group, a cyclopentenyl group, a cyclohexenyl group, and an alicyclic hydrocarbon group obtained by substituting them with an alkyl group, an alkoxy group, an aryl group, an aryloxy group, a hydroxyl group, an amino group and a halogen or the like.

Examples of the substituted or unsubstituted aromatic hydrocarbon groups having 1 to 18 carbon atoms include aryl groups such as a phenyl group and a tolyl group; alkyl group-substituted aryl groups such as a dimethyl phenyl group, an ethyl phenyl group, a butyl phenyl group and a tert-butyl phenyl group; alkoxy group-substituted aryl groups such as a methoxy phenyl, an ethoxy phenyl group, buthoxy phenyl group and a tert-buthoxy phenyl group; and an aromatic hydrocarbon group obtained by substituting them with an alkyl group, an alkoxy group, an aryl group, an aryloxy group, an amino group and a halogen or the like.

It is preferable that $R^1$ to $R^3$ are a monovalent substituent group selected from the group consisting of an alkyl group and an aryl group which does not have a phenolic hydroxyl group or a mercapto group. In particular, from the viewpoint of the availability of phosphine, $R^1$ to $R^3$ are preferably selected from the group consisting of an unsubstituted, or alkyl group or alkoxy group substituted phenyl group, such as a phenyl group, a p-tolyl group, a m-tolyl group, an o-tolyl group, a p-methoxy phenyl, a m-methoxy phenyl and an o-methoxy phenyl or the like; and a linear or cyclic alkyl group such as a methyl group, an ethyl group, a propyl group, an iso-propyl group, a butyl group, a sec-butyl group, a tert-butyl group, an octyl group and a cyclohexyl group or the like.

Of the phosphine compounds represented by the general formula (I), triphenylphosphine; diphenyl(alkylphenyl)phosphine such as diphenyl-p-tolylphosphine; diphenyl(alkoxyphenyl)phosphine such as diphenyl-p-anisylphosphine; and phenylbis(alkylphenyl)phosphine such as phenyldi-p-tolylphosphine are preferable from the viewpoint of the reflow cracking resistance. From the viewpoint of the curability under moisture absorption, tris(alkylphenyl)phosphine such as tri-p-tolylphosphine, tri-o-tolylphosphine and tri-m-tolylphosphine; tris(alkoxyphenyl)phosphine such as tri-p-anisylphosphine; phenylbis(alkoxyphenyl)phosphine such as phenyldi-p-anisylphosphine; alkyldiarylphosphine such as n-butyldiphenylphosphine and cyclohexyldiphenylphosphine; dialkylarylphosphine such as di-n-butylphenylphosphine and dicyclohexylphenylphosphine; and trialkylphosphine such as tri-n-butylphosphine, tricyclohexylphosphine, tri-n-octylphosphine, trimethyphosphine, triethylphosphine, triisopropylphosphine and tricyclopentylphosphine are preferable.

There are no particular limitations on the compounds (b) having at least one halogen atom substituted on the aromatic ring and at least one proton atom which can be discharged, as long as the compounds are producible. For instance, examples thereof include the compounds represented by the following general formula (II).

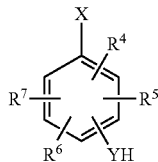

(II)

(wherein $R^4$ to $R^7$ in the general formula (II) represent a hydrogen atom or a monovalent organic group having 1 to 18 carbon atoms, and each may be the same or different. YH represents a monovalent group having 0 to 18 carbon atoms and at least one proton which can be discharged. X represents a halogen atom. Two or more of $R^4$ to $R^7$ and YH may be mutually bonded to form a cyclic structure.)

Though $R^4$ to $R^7$ in the general formula (II) represent a hydrogen atom or a monovalent organic group having 1 to 18 carbon atoms, there are no particular limitations on the monovalent organic group of 1 to 18 carbon atoms. Examples include substituted or unsubstituted aliphatic hydrocarbon groups having 1 to 18 carbon atoms, substituted or unsubstituted alicyclic hydrocarbon groups having 1 to 18 carbon atoms, substituted or unsubstituted aromatic hydrocarbon groups having 1 to 18 carbon atoms, substituted or unsubstituted aliphatic, alicyclic or aromatic oxy groups having 1 to 18 carbon atoms, substituted or unsubstituted aliphatic, alicyclic or aromatic carbonyl groups having 1 to 18 carbon atoms, substituted or unsubstituted aliphatic, alicyclic or aromatic oxycarbony groups having 1 to 18 carbon atoms, and substituted or unsubstituted aliphatic, alicyclic or aromatic carbonyoxy groups having 1 to 18 carbon atoms.

Substituted or unsubstituted aliphatic hydrocarbon groups, alicyclic hydrocarbon groups and aromatic hydrocarbon groups having 1 to 18 carbon atoms are described above.

The substituted or unsubstituted aliphatic, alicyclic or aromatic oxy groups having 1 to 18 carbon atoms include; aliphatic oxy groups such as a methoxy group, an ethoxy group, a propoxy group, an isopropoxy group, an n-butoxy group, a sec-butoxy group, a tert-butoxy group, a cyclohexyloxy group, an allyloxy group, a vinyloxy group; aromatic oxy groups such as a phenoxy group, a methylphenoxy group, an ethylphenoxy group, a methoxyphenoxy group, a butoxyphenoxy group and a phenoxyphenoxy group; and ones obtained by substituting an alkyl group, an alkoxy group, an aryl group, an aryloxy group, an amino group and a halogen or the like therefor.

The substituted or unsubstituted aliphatic, alicyclic or aromatic carbonyl groups having 1 to 18 carbon atoms include; aliphatic carbonyl groups such as a formyl group, an acetyl group, an ethyl carbonyl group, a butyryl group, a cyclohexyl carbonyl group and an allyl carbonyl; aromatic carbonyl groups such as a phenyl carbonyl group and a methylphenyl carbonyl group; and ones obtained by substituting an alkyl group, an alkoxy group, an aryl group, an aryloxy group, an amino group and a halogen or the like therefor.

The substituted or unsubstituted aliphatic, alicyclic or aromatic oxycarbony groups having 1 to 18 carbon atoms include aliphatic oxycarbonyl groups such as a methoxycarbonyl group, an ethoxycarbonyl group, a butoxycarbonyl group, an allyloxycarbonyl group and a cyclohexyloxycarbonyl group; aromatic oxycarbonyl groups such as a phenoxycarbonyl group and a methylphenoxycarbonyl group; and ones obtained by substituting an alkyl group, an alkoxy group, an aryl group, an aryloxy group, an amino group and a halogen or the like therefor.

The substituted or unsubstituted aliphatic, alicyclic or aromatic carbonyoxy groups having 1 to 18 carbon atoms include aliphatic carbonyoxy groups such as a methylcarbonyoxy group, an ethylcarbonyoxy group, a butylcarbonyoxy group, an allylcarbonyoxy group, a cyclohexylcarbonyoxy group; aromatic carbonyoxy groups such as a phenylcarbonyoxy group and a methylphenylcarbonyoxy group; and ones obtained by substituting an alkyl group, an alkoxy group, an aryl group, an aryloxy group, an amino group and a halogen or the like therefor.

When two or more of $R^4$ to $R^7$ in the formula (II) form the cyclic structure, examples thereof include 1-bromo-2-naphthol and 4-chloro-1-naphthol. However, there are no particular limitations thereon.

YH in the formula (II) represents a monovalent group having 0 to 18 carbon atoms and at least one proton which can be discharged. There are no particular limitations on the monovalent groups having 0 to 18 carbon atoms and at least one proton which can be discharged. Examples thereof include: a group in which a hydrogen atom is bonded to a 16th atom such as a hydroxyl group, a mercapto group and a hydroseleno group; a group which has a carboxyl group and has 1 to 18 carbon atoms, such as a carboxyl group, a carboxymethyl group, a carboxyethyl group, a carboxyphenyl group and a carboxynaphthyl group; and a group which has a phenolic hydroxyl group and has 1 to 18 carbon atoms, such as a hydroxyphenyl group, a hydroxyphenylmethyl group, a hydroxynaphthyl group, a hydroxyfuryl group, a hydroxythienyl group and a hydroxypyridyl group.

When YH in the formula (II) forms a cyclic structure with anyone of $R^4$ to $R^7$, examples thereof include 6-bromo-2-naphthol. However, there are no particular limitations thereon.

Examples of the compounds which are represented by the general formula (II), and have at least one halogen atom substituted on the aromatic ring and at least one proton which can be discharged include: compounds having a carboxylic acid such as 4-bromobenzoic acid, 3-bromobenzoic acid, 2-bromobenzoic acid, 4-chlorobenzoic acid, 3-chlorobenzoic acid, 2-chlorobenzoic acid, 4-iodo benzoic acid, 3-iodo benzoic acid, 2-iodo benzoic acid, 4-bromophenylacetic acid, 3-bromophenylacetic acid, 2-bromophenylacetic acid, 4-chlorophenyl acetic acid, 3-chlorophenyl acetic acid and 2-chlorophenyl acetic acid; compounds having a phenolic hydroxyl group such as 4-bromophenol, 3-bromophenol, 2-bromophenol, 4-chlorophenol, 3-chlorophenol, 2-chlorophenol, 4-iodophenol, 3-iodo phenol, 2-iodo phenol, 4-bromo-2-methylphenol, 4-bromo-3-methylphenol, 4-bromo-2,6-dimethylphenol, 4-bromo-3,5-dimethylphenol, 4-bromo-2,6-di-tert-butylphenol, 4-chloro-1-naphthol, 1-bromo-2-naphthol, 6-bromo-2-naphthol, 4-bromo-4'-hydroxybiphenyl, bromohydroxypyridine, bromohydroxyfuran and bromohydroxythiophene; and compounds having a thiol such as 4-bromothiol, 3-bromothiol, 2-bromothiol, 4-chlorothiol and bromothionaphthol.

Particularly, compounds having a phenolic hydroxyl group such as 4-bromophenol, 3-bromophenol, 2-bromophenol, 4-chlorophenol, 3-chlorophenol, 2-chlorophenol, 4-iodo phenol, 3-iodo phenol, 2-iodo phenolic, 4-bromo-2-methylphenol, 4-bromo-3-methylphenol, 4-bromo-2,6-dimethylphenol, 4-bromo-3,5-dimethylphenol, 4-bromo-2,6-di-tert-butylphenol, 4-chloro-1-naphthol, 1-bromo-2-naphthol, 6-bromo-2-naphthol, 4-bromo-4'-hydroxybiphenyl, bromohydroxypyridine, bromohydroxyfuran and bromohydroxythiophene are preferable from the viewpoint of the moisture absorption curability.

The method for producing phosphine derivative of the invention is a method for producing a phosphine derivative which can be used as the curing accelerator (A) for the curing resin. The method comprises the steps of: reacting a phosphine compound (a) (hereinafter, referred to as "compound (a)") with a compound (b) (hereinafter, referred to as "compound (b)") having at least one halogen atom substituted on an aromatic ring and at least one proton atom which can be discharged to produce a phosphonium halide; and subjecting the phosphonium halide to dehydrohalogenation.

There are no particular limitations on the method of the invention, as long as the method has a process and a reactive condition in which the compound (a) is reacted with the compound (b) to produce the phosphonium halide and the phosphonium halide is then subjected to dehydrohalogenation. The reaction between the compound (a) and the compound (b), and the dehydrohalogenation reaction may proceed in one step or in more than two steps. The phosphine derivative may be produced in one pot or in more than two pots.

The compound (a) can be reacted with the compound (b) by using a coupling catalyst or the like in case of necessity.

Examples of the coupling catalysts which can be used include: halogenated nickels such as nickel chloride(II) and nickel bromide(II); halogenated cobalts such as cobalt chloride(II) and cobalt bromide(II); and a nickel compound having a phosphine as ligand such as tris(triphenylphosphine)nickel. There are no particular limitations on the coupling catalysts as long as the coupling catalysts can react the compound (a) with the compound (b).

The compound (a) can be reacted with the compound (b) by using techniques such as the irradiation of ultraviolet rays in case of necessity.

Examples of the compounds (b) which can be reacted by using the technique of the irradiation of ultraviolet rays include the compounds (b) in which the halogen atom is iodide such as 4-iodo phenol, 3-iodo phenol, 2-iodo phenol, 4-iodo benzoic acid, 3-iodo benzoic acid, 2-iodo benzoic acid. However, there are no particular limitations on the compounds (b), as long as the compounds can be reacted by the technique.

So as to subject the product obtained by reacting the compound (a) with the compound (b) to dehydrohalogenation, reagents for aiding the dehydrohalogenation reaction can be optionally used. Examples of the reagents include basic compounds such as lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, sodium carbonate, calcium carbonate, rubidium carbonate, cesium carbonate, sodium bicarbonate, potassium hydrogen carbonate, triethylamine, tributylamine, pyridine, pyrazine, 1,5-diazabicyclo[4.3.0]nonene-5, 1,8-diazabicyclo[5.4.0]undecene-7. However, there are no particular limitations on the reagents, as long as the reagents aid the dehydrohalogenation reaction.

Examples of the curing accelerators (A) for the curing resin which can be obtained by subjecting the product produced by reacting the compound (a) with the compound (b) to dehydrohalogenation include the compounds represented by the following general formula (III). However, there are no particular limitations thereon.

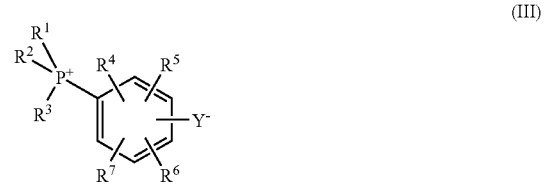

Wherein $R^1$ to $R^3$ and $R^4$ to $R^7$ in the formula (III) are the same as those in the formulae (I) and (II). $Y^-$ represents a group formed by releasing one proton from a monovalent group having 0 to 18 carbon atoms and at least one proton which can be discharged. Two or more of $R^4$ to $R^7$ and $Y^-$ may be mutually bonded to form a cyclic structure.

Examples of the compounds represented by the general formula (III) includes a compound which can be represented by the following resonance formula (IV).

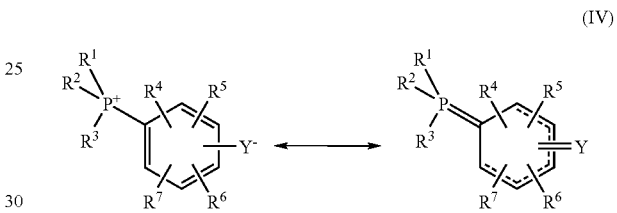

(wherein, $R^1$ to $R^7$ and $Y^-$ in the formula (IV) are common to those of the above-mentioned. Two or more of $R^4$ to $R^7$ and $Y^-$ or Y may be bonded to have a ring structure.)

Examples of the compounds which can be represented by the resonance formula (IV) include a compound in which $Y^-$ in the general formula (III) is located at ortho position or para position for $P^+$, and an element bonding to the ortho position or the para position has lone pair electron, such as a compound which is represented by the following resonance formula (V) or (VI). However, there are no particular limitations on the compound. For instance, the lone pair electron may be conjugated as represented by the following resonance formula (VII) or (VIII).

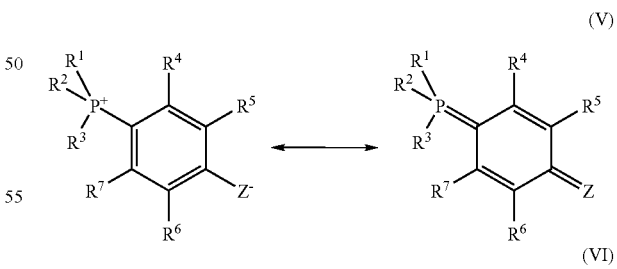

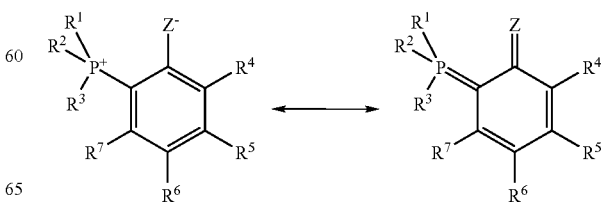

(wherein, $R^1$ to $R^7$ in the formulae (V) and (VI) are common to those of the above-mentioned. $Z^-$ represents a group in which one proton is discharged from a monovalent group having 0 to 18 carbon atoms and having at least one proton capable of being discharged and the atom bonded to a benzene ring has a conjugated or a nonconjugated lone pair electron. Two or more of $R^4$ to $R^7$ and $Z^-$ or $Z$ may be bonded to have a ring structure.)

(wherein, $R^1$ to $R^7$ in the formulae (IX), (X) and $Z^-$ in the formulae (IX) are common to those of the above-mentioned,. $W^-$ in the formula (X) represents a group in which one proton is discharged from a monovalent group having 0 to 18 carbon atoms and having at least one proton capable of being discharged and the atom bonded to a benzene ring has no lone pair electron. Two or more of $R^4$ to $R^7$, $Z^-$ and $W^-$ may be bonded to have a ring structure.)

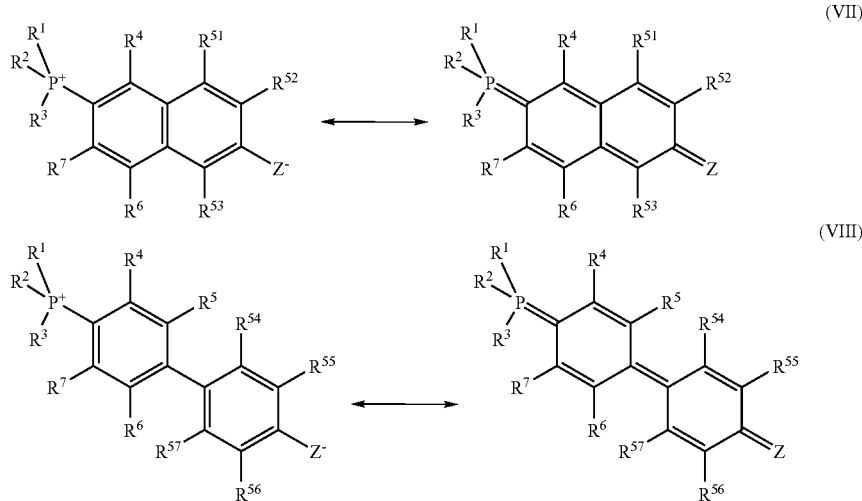

(VII)

(VIII)

(wherein, $R^1$ to $R^7$, $Z^-$ and $Z$ in the formulae (VII) and (VIII) are common to those in the above formulae (V) and (VI). $R^{51}$ to $R^{57}$ represent a hydrogen atom or a substituted or unsubstituted monovalent organic group having 1 to 18 carbon atoms, and each may be the same or different. Two or more of $R^4$ to $R^7$, $R^{51}$ to $R^{57}$ and $Z^-$ or $Z$ may be bonded to have a ring structure.)

Examples of the compounds which cannot be represented by the resonance formula (IV) include a compound in which $Y^-$ of the general formula (III) is located at meta position for $P^+$, and a compound in which $Y^-$ bonds to ortho position or para position for $P^+$ and in which the atom bonded do not have lone pair electron, such as a compound which is represented by the following resonance formula (IX) or (X). However, there are no particular limitations on the compound.

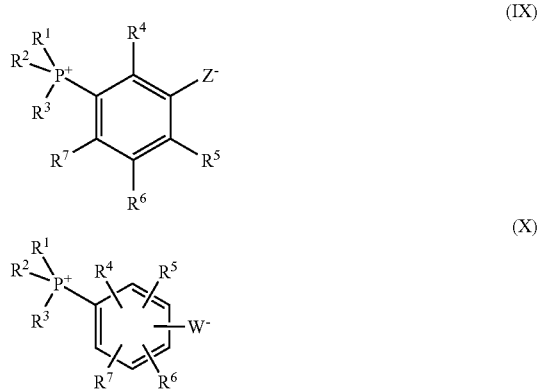

(IX)

(X)

The curing resin composition of the invention contains at least of one kind of a curing accelerator (A) for a curing resin of the invention and a curing resin (B).

There are no particular limitations on the curing resins (B) used in the invention as long as the curing accelerator (A) accelerates curing. Examples thereof include an epoxy resin, a phenolic resin, a silicon resin, an amino resin, an unsaturated polyester resin, a diallyl phthalate resin and an alkyd resin, and these may be used alone or in combination of two or more types. In particular, the epoxy resin (C) is particularly preferable from the viewpoint that the effect of the curing accelerator (A) is sufficiently exhibited.

When the epoxy resin is used as ingredients (B), the epoxy resin having at least two epoxy groups in one molecule can be used. Such epoxy resins are not limited to the following, and examples thereof include: novolac type epoxy resins including a phenol novolac type epoxy resin, an o-cresol novolak type epoxy resin obtained by epoxidizing a novolak resin obtained by subjecting phenols such as phenol, cresol, xylenol, resorcinol, catechol, bisphenol A or bisphenol F and/or naphthols such as α-naphthol,β-naphthol and dihydroxynaphthalene, and the compound which has an aldehyde group such as formaldehyde, acetaldehyde, propionaldehyde, benzaldehyde and salicylaldehyde to condensation or cocondensation in the presence of an acid catalyst;

diglycidyl ethers of phenol compounds such as bisphenol A, bisphenol F, bisphenol S, an alkyl-substituted or non-substituted biphenol and a stilbene system phenol (bisphenol type epoxy resins, biphenyl type epoxy resins and stilbene type epoxy resins or the like);

glycidyl ethers of alcohols such as butanediol, polyethylene glycol and polypropylene glycol;

glycidyl ester type epoxy resins of carboxylic acids such as phthalic acid, isophthalic acid and tetrahydrophthalic acid;

glycidyl type or methylglycidyl type epoxy resins obtained by substituting an active hydrogen bonded to the nitrogen atom of aniline or isocyanuric acid with a glycidyl group;

alicyclic epoxy resins obtained by epoxidizing the olefinic bond in the molecule, such as vinylcyclohexene diepoxide, 3,4-epoxycylcohexylmethyl-3,4-epoxycylcohexane carboxylate, and 2-(3,4-epoxy)cyclohexyl-5,5-spiro(3,4-epoxy)cyclohexane-m-dioxane;

glycidyl ethers of paraxylylene and/or metaxylylene modified phenolic resins;

glycidyl ethers of terpene modified phenolic resin;

glycidyl ethers of dicyclopentadiene modified phenolic resins;

glycidyl ethers of cyclopentadiene modified phenolic resins;

glycidyl ethers of polycyclic aromatic-ring modified phenolic resin;

glycidyl ethers of naphthalene-ring-containing phenolic resin;

halogenated phenol novolak type epoxy resins;

hydroquinone type epoxy resins;

trimethylolpropane type epoxy resins;

linear aliphatic epoxy resins obtained by oxidizing the olefinic bond with a peracid such as an peracetic acid;

diphenylmethane type epoxy resins;

epoxidized materials of aralkyl type phenolic resins such as phenol aralkyl resins and naphthol aralkyl resins; and sulfur atom content type epoxy resins.

These may be used alone or in combination of two or more types. A biphenyl type epoxy resin, a stilbene type epoxy resin, a diphenylmethane type epoxy resin, a sulfur atom content type epoxy resin, a novolac type epoxy resin, a dicyclopentadiene type epoxy resin, a salicylaldehyde type epoxy resin, the copolymer type epoxy resin of naphthols and phenols, an epoxidized material of an aralkyl type phenolic resin are preferable from the viewpoint the reflow cracking resistance and the flow properties in the epoxy resins. Particularly, 4,4'-bis(2,3-epoxypropoxy)-3,3',5,5'-tetramethybiphenyl is more preferable from the viewpoint of the reflow cracking resistance, and 4,4'-bis(2,3-epoxypropoxy)-biphenyl is preferable from the viewpoint of molding properties and heat resistance. A biphenyl type epoxy resin, a stilbene type epoxy resin, a diphenylmethane type epoxy resin, a sulfur atom content type epoxy resin, a novolac type epoxy resin, a dicyclopentadiene type epoxy resin, a salicylaldehyde type epoxy resin, the copolymer type epoxy resins of naphthols and phenols, and an epoxidized material of aralkyl type phenolic resin may be used alone or in combination of two or more types. In order for their performance to be exhibited, these may preferably be used in an amount of at least 30% by weight in total based on the total weight of the epoxy resin, and particularly preferably used in an amount of at least 50% by weight.

There are no particular limitations on the biphenyl type epoxy resins as long as the epoxy resins have a biphenyl skeleton, and the epoxy resin represented by the following general formula (XI) is preferable. Among the epoxy resin represented by the following general formula (XI), YX-4000H (trade name; manufactured by Japan Epoxy Resins Co., Ltd) in which 3, 3', 5, 5' positions are the methyl group when the positions in which the oxygen atoms are substituted among $R^8$ are made 4, 4' position, the others are the hydrogen atoms can be obtained as a marketed commodity. And 4,4'-bis(2,3-epoxypropxy) biphenyl in which all of $R^8$ are the hydrogen atoms or the like can be obtained as a marketed commodity. YL-6121H (trade name; manufactured by Japan Epoxy Resins Co., Ltd) can be also obtained as a marketed commodity, which is the mixture of the case that 3, 3', 5, 5' positions are the methyl group when the positions in which the oxygen atoms are substituted among $R^8$ were made 4, 4' position, the others are the hydrogen atoms and the case that all of $R^8$ are the hydrogen atoms.

(XI)

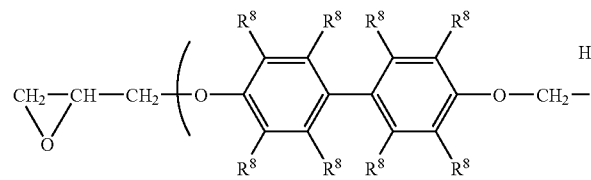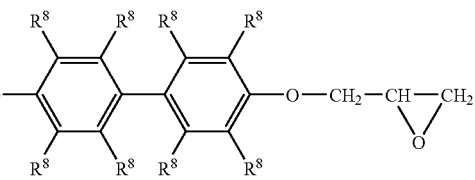

(wherein, $R^8$ in the general formula (XI) represents a hydrogen atom or an alkyl group having 1 to 12 carbon atoms or an aryl group having 4 to 18 carbon atoms, and each may be the same or different. n is a mean value, and represents a positive number of 0 to 10.)

There are no particular limitations on the stilbene type epoxy resins, as long as the epoxy resins have a stilbene skeleton. The epoxy resin represented by the following general formula (XII) is preferable. Among the epoxy resin represented by the following general formula (XII), ESLV-210 (trade name; manufactured by Japan Epoxy Resins Co., Ltd) which is the mixture of the case that 3, 3', 5, 5' positions are the methyl group when the positions in which the oxygen atoms are substituted among $R^9$ are made 4, 4' position, the others are the hydrogen atoms, and all of $R^{10}$ are the hydrogen atoms, and the case that three positions are the methyl groups, one position is the tert-butyl group, the others are the hydrogen atoms among 3, 3', 5, 5' positions, and all of $R^{10}$ are the hydrogen atoms or the like can be obtained as a marketed commodity.

(XII)

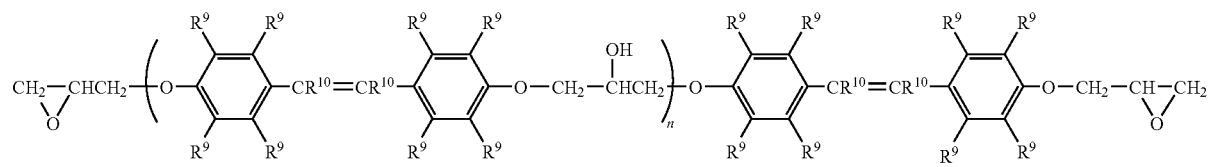

(wherein, $R^9$, $R^{10}$ in the general formula (XII) represent a hydrogen atom or a monovalent organic group which having 1 to 18 carbon atoms, and each may be the same or different. n is a mean value, and represents a positive number of 0 to 10.)

There are no particular limitations on the diphenylmethane type epoxy resins, as long as the epoxy resins have a diphenylmethane skeleton. The epoxy resin represented by the following general formula (XIII) is preferable. Among the epoxy resin represented by the following general formula (XIII), YSLV-80XY (trade name; manufactured by Nippon Steel Chemical Co., Ltd.) in which 3, 3', 5, 5' positions are the methyl group and the other are the hydrogen atoms when the positions in which the oxygen atoms are substituted among $R^{12}$ are made 4, 4' position and all of $R^{11}$ are the hydrogen atoms or the like can be obtained as a marketed commodity.

1 to 18 carbon atoms, and each may be the same or different. n is a mean value, and represents a positive number of 0 to 10.)

There are no particular limitations on the novolac type epoxy resins, as long as the epoxy resins are obtained by epoxidizing the novolac type phenolic resin. It is preferable that the epoxy resins are obtained by epoxidizing novolac type phenolic resins such as phenol novolac, cresol novolac and naphthol novolac using a technique for glycidyletherizing or the like. For instance, the epoxy resin represented by the following general formula (XV) is more preferable. ESCN-190 and ESCN-195 (trade name; manufactured by Sumitomo Chemical Co., Ltd.) in which all of $R^{14}$ are the hydrogen atoms in the epoxy resins represented by the following general formula (XV) and $R^{15}$ is the methyl group (i=1) or the like can be obtained as a marketed commodity.

(XIII)

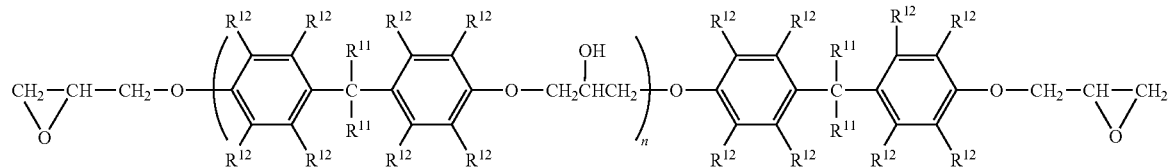

(wherein, $R^{11}$, $R^{12}$ in the general formula (XIII) represent a hydrogen atom or a monovalent organic group having 1 to 18 carbon atoms, and each may be the same or different. n is a mean value, and represents a positive number of 0 to 10.)

There are no particular limitations on the sulfur atom content type epoxy resins, as long as the epoxy resins contain a sulfur atom. Examples thereof include the epoxy resin represented by the following general formula (XIV). Among the epoxy resin represented by the following general formula (XIV), YSLV-120TE (trade name; manufactured by Nippon Steel Chemical Co., Ltd.) in which 3, 3' position are the tert-butyl group, 6, 6' position are a the methyl group, and the other are the hydrogen atoms when the positions in which the oxygen atoms are substituted among $R^{13}$ are made 4, 4' position or the like can be obtained as a marketed commodity.

(wherein, $R^{13}$ in the general formula (XIV) represents a hydrogen atom or a monovalent organic group which having (XIV)

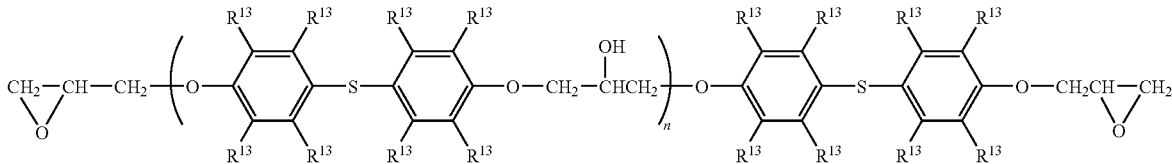

(XV)

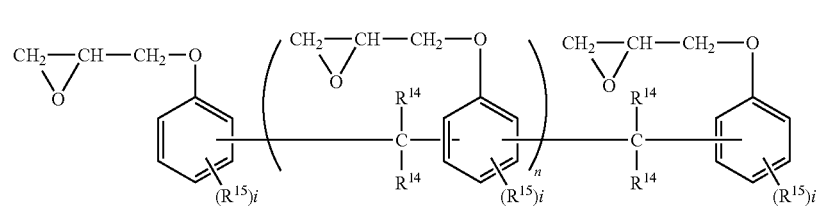

(wherein, $R^{14}$, $R^{15}$ in the general formula (XV) represent a hydrogen atom or a monovalent organic group having 1 to 18 carbon atoms, and each may be the same or different. i is an integer of 0 to 3; n is a mean value, and represents a positive number of 0 to 10.)

There are no particular limitations on the dicyclopentadiene type epoxy resins, as long as the epoxy resins are obtained by epoxidizing a compound having a dicyclopentadiene skeleton as a raw material. The epoxy resin represented by the following general formula (XVI) is preferable. HP-7200 (trade name; manufactured by Dainippon Ink And Chemicals, Incorporated) which is i=0 in the epoxy resins represented by the following general formula (XVI) or the like can be obtained as a marketed commodity.

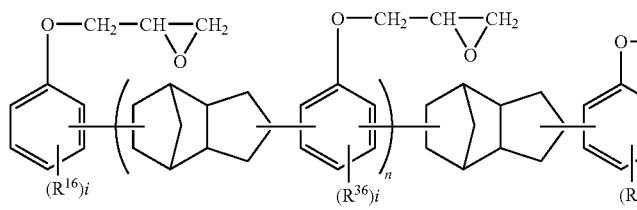

(XVI)

(wherein, $R^{16}$ in the general formula (XVI) represents a hydrogen atom or a monovalent organic group having 1 to 18 carbon atoms, and each may be the same or different. i is an integer of 0 to 3; n is a mean value, and represents a positive number of 0 to 10.)

There are no particular limitations on the salicylaldehyde type epoxy resins, as long as the epoxy resins are obtained by using a compound having a salicylaldehyde skeleton as a raw material. The salicylaldehyde type epoxy resins such as the epoxy resins obtained by glycidyletherizing the salicylaldehyde type phenolic resin such as the novolac type phenolic resins of the compound which has the compound having the salicylaldehyde skeleton and a compound having a phenolic hydroxyl group is preferable, and the epoxy resin represented by the following general formula (XVII) is more preferable. MEH-7500 (trade name; manufactured by Meiwa Plastic Industries, Ltd.) which is i=0 and k=0 in the epoxy resins represented by the following general formula (XVII) or the like can be obtained as a marketed commodity.

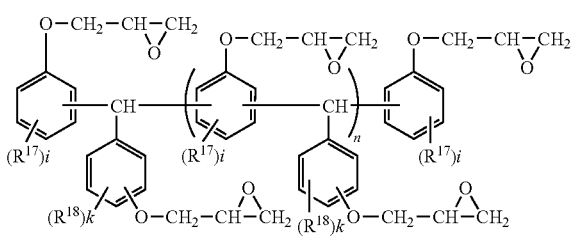

(XVII)

(wherein, $R^{17}$, $R^{18}$ in the general formula (XVII) represent a hydrogen atom or a monovalent organic group having 1 to 18 carbon atoms, and each may be the same or different. i is an integer of 0 to 3; k is an integer of 0 to 4; n is a mean value, and represents a positive number of 0 to 10.)

There are no particular limitations on the copolymer type epoxy resins of naphthols and phenols, as long as the epoxy resins are obtained by using a compound having a naphthol skeleton and a compound having a phenol skeleton as a raw material. It is preferable that the copolymer type epoxy resins are obtained by glycidyletherizing the novolac type phenolic resins using the compound having the naphthol skeleton and the compound having the phenol skeleton. The epoxy resin represented by the following general formula (XVIII) is more preferable. NC-7300 (trade name; manufactured by Nippon Kayaku Co., Ltd.) which is i=0, j=0 and k=0 in the epoxy resins represented by the following general formula (XVIII) or the like can be obtained as a marketed commodity.

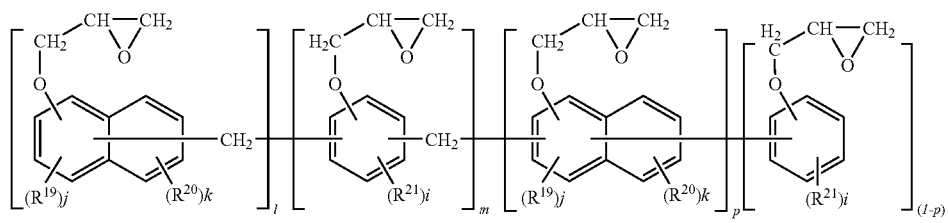

(XVIII)

(wherein, $R^{19}$ to $R^{21}$ in the general formula (XVIII) represent a hydrogen atom or a monovalent organic group having 1 to 18 carbon atoms, and each may be the same or different. i is an integer of 0 to 3; j is an integer of 0 to 2; k is an integer of 0 to 4. p is a mean value, and represents a positive number of 0 to 1. l, m are a mean value, and represents a positive number of 0 to 11. (l+m) represents a positive number of 1 to 11.)

Examples of the epoxy resins represented by the general formula (XVIII) include a random copolymer which contains l pieces of constituent units and m pieces of constituent units at random, an alternating copolymer containing alternately, a copolymer containing regularly, and a block copolymer containing into a block. Any one kind of these may be used alone or in combination of two or more types.

There are no particular limitations on the epoxidized materials of the aralkyl type phenolic resin such as the phenol aralkyl resin and the naphthol aralkyl resin as long as the epoxidized materials are obtained by using the phenolic resins synthesized from phenols such as phenol and cresol and/or naphthols such as naphothol and dimethylnaphothol, and dimethoxyparaxylene, bis(methoxymethyl) biphenyl and their derivatives as a raw material. It is preferable that the epoxidized materials are obtained by glycidyletherizing the phenolic resins synthesized from phenols such as phenol and cresol and/or naphthols such as naphothol and dimethylnaphothol, and dimethoxyparaxylene, bis(methoxymethyl) biphenyl and their derivatives. The epoxy resin represented by the following general formula (XIX) and (XX) is more preferable. NC-3000S (trade name; manufactured by Nippon Kayaku Co., Ltd.) and CER-3000 (trade name; manufactured by Nippon Kayaku Co., Ltd.) or the like can be obtained as a marketed commodity in the epoxy resins represented by the following general formula (XIX). In the NC-3000S, i=0, and $R^{23}$ are the hydrogen atoms. The CER-3000 is obtained by mixing the epoxy resin in which i=0, and $R^{23}$ are the hydrogen atoms, and the epoxy resin in which all $R^8$ of the general formula (XI) are hydrogen atoms in a ratio of 80/20 by weight. ESN-175 (trade name; manufactured by Nippon Steel Chemical Co., Ltd.) or the like can be obtained as a marketed commodity in the epoxy resins represented by the following general formula (XX). In the ESN-175, j=0, k of $R^{25}$=0, and k of $R^{26}$=0.

component (B) has a high melt viscosity and hence the curing resin composition also has a high viscosity at the time of its melt molding, tending to cause faulty filling and deformation of bonding wires (i.e., gold wires which connect device components with leads). It is preferable that the average n in one molecule is set within the range of 0 to 4. The values of i, j, k in the general formulae (XV) to (XX) are independent for each number of each R.

A curing agent (D) can be optionally used for the curing resin composition. When the epoxy resin is used as the curing resin (B), there are no particular limitations on the curing agents which can be used as long as the curing agents can cure the epoxy resin. Examples thereof include phenolic compounds such as phenolic resins, amine compounds such as diamine and polyamine, organic acid anhydrides such as phthalic anhydride, trimellitic anhydride and pyromellitic anhydride, and carboxylic acid compounds such as dicarboxylic acid and polycarboxylic acid. These may be used alone or in combination of two or more types. In particular, the phenolic resin is preferable from the viewpoint that the effect of the curing accelerator (A) is sufficiently exhibited.

There are no particular limitations on the phenolic resin used as the curing agent (D) of the epoxy resin. Examples thereof include a compound which is the phenolic resin having the phenolic hydroxyl groups of 2 or more in one mol-

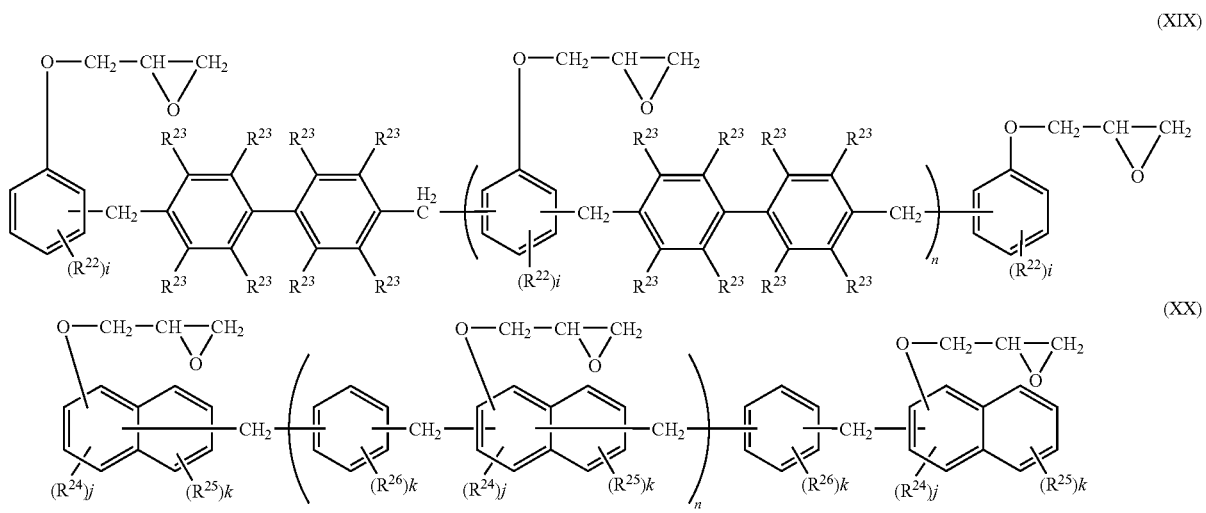

(wherein, $R^{22}$ to $R^{26}$ in the general formulae (XIX), (XX) represent a hydrogen atoms or a monovalent organic group having 1 to 18 carbon atoms, and each may be the same or different. n is a mean value, and represents a positive number of 0 to 10. i is an integer of 0 to 3; j is an integer of 0 to 2: k is an integer of 0 to 4. K of $R^{25}$ and k of $R^{26}$ may be the same or different.)

That each of $R^8$ to $R^{26}$ in the general formulae (XI) to (XX) may be the same or different means, for instance, that all of $R^8$ of 8 to 88 in the formula (XI) may be the same or different. For the others $R^9$ to $R^{26}$, all of each number included in the formula may be the same or different. Each of $R^8$ to $R^{26}$ may be the same or different. For instance, all of $R^9$, $R^{10}$ may be the same or different.

Letter symbol n in the general formulae (XI) to (XX) is within the range of 0 to 10. When it is more than 10, the ecule used generally and has two phenolic hydroxyl groups in one molecule such as resorcinol, catechol, bisphenol A, bisphenol F, and alkyl-substituted or non-substituted bisphenol;

a novolac type phenolic resin obtained by subjecting phenols such as phenol, cresol, xylenol, resorcinol, catechol, bisphenol A, bisphenol F, phenylphenol, aminophenol, and/or naphthols such as α-naphthol, β-naphthol, dihydroxynaphthalene, and aldehydes such as formaldehyde, acetaldehyde, propionaldehyde, benzaldehyde and salicylaldehyde to condensation or cocondensation in the presence of an acid catalyst;

an aralkyl type phenolic resin such as phenol aralkyl resins and naphthol aralkyl resins synthesized from phenols and/or naphthols, and dimethoxyparaxylene and bis(methoxymethyl) biphenyl;

paraxylylene and/or methaxylylene modified phenolic resin:

melamine modified phenolic resin;

terpene modified phenolic resin;

dicyclopentadiene type phenolic resin and dicyclopentadiene type naphthol resin synthesized by the copolymerization from phenols and/or naphthols and dicyclopentadiene;

cyclopentadiene modified phenolic resin;

polycyclic aromatic-ring modified phenolic resin;

biphenyl type phenolic resin;

triphenylmethane type phenolic resin; and the phenolic resins obtained by the copolymerization of two or more of these types. These may be used alone or in combination of two or more types.

tured by Meiwa Plastic Industries, Ltd.) or the like can be obtained as a marketed commodity in the phenolic resins represented by the following general formula (XXI). In XL-225, XLC and MEH-7800, i=0, and k=0.

MEH-7851 (trade name; Meiwa Plastic Industries, Ltd.) or the like in the phenolic resins represented by the following general formula (XXII) can be obtained as a marketed commodity. In the MEH-7851, i=0 and all of $R^{30}$ are the hydrogen atoms.

SN-170 (trade name; manufactured by Nippon Steel Chemical Co., Ltd.) or the like in the phenolic resins represented by the following general formula (XXIII) can be obtained as a marketed commodity. In SN-170, j=0, k of $R^{32}$=0, and k of $R^{33}$=0.

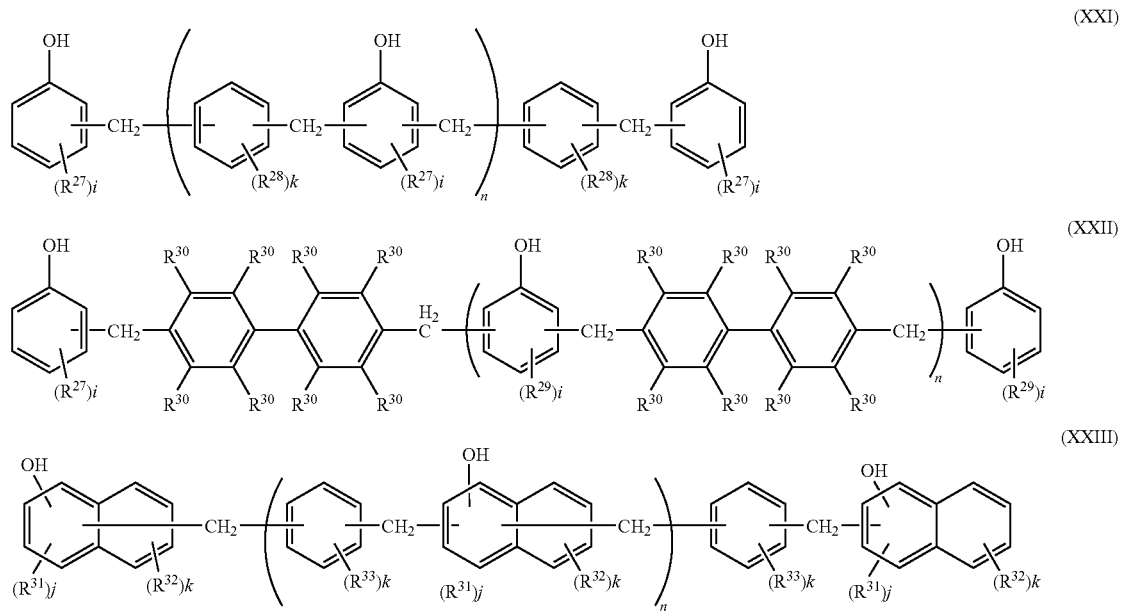

The aralkyl type phenolic resin, the dicyclopentadiene type phenolic resin, the salicylaldehyde type phenolic resin, the copolymer type phenolic resin of the benzaldehyde type and the aralkyl type, and the novolac type phenolic resin are preferable from the viewpoint of the reflow cracking resistance in these phenolic resins. The aralkyl type phenolic resin, the dicyclopentadiene type phenolic resin, the salicylaldehyde type phenolic resin, the copolymer type phenolic resin of the benzaldehyde type and the aralkyl type, and the novolac type phenolic resin may be used alone or in combination of two or more types. In order for their performance to be exhibited, these may preferably be used in an amount of at least 30% by weight in total based on the total weight of the phenolic resin, and more preferably 50% by weight.

There are no particular limitations on the aralkyl type phenolic resins as long as the resins are synthesized from phenols and/or naphthols and dicyclopentadiene, bis(methoxymethyl) biphenyl and their derivatives. The phenolic resins represented by the general formulae (XXI) to (XXIII) are preferable.

XL-225, XLC (trade name; manufactured by Mitsui Chemicals Co., Ltd.), and MEH-7800 (trade name; manufac- (wherein, $R^{27}$ to $R^{33}$ in the general formulae (XXI) to (XXIII) represent a hydrogen atom or a monovalent organic group having 1 to 18 carbon atoms, and each may be the same or different. is an integer of 0 to 3; k is an integer of 0 to 4; j is an integer of 0 to 2. n is a mean value, and represents a positive number of 0 to 10. k of $R^{32}$ and k of $R^{33}$ may be the same or different.)

There are no particular limitations on the dicyclopentadiene type phenolic resins as long as the phenolic resins are obtained by using a compound having a dicyclopentadiene skeleton as a raw material. The phenolic resin represented by the following general formula (XXIV) is preferable. DPP (trade name; manufactured by Nippon Petrochemicals Co., Ltd.) or the like in the phenolic resin represented by the following general formula (XXIV) can be obtained as a marketed commodity. In DPP, i=0

(XXIV)

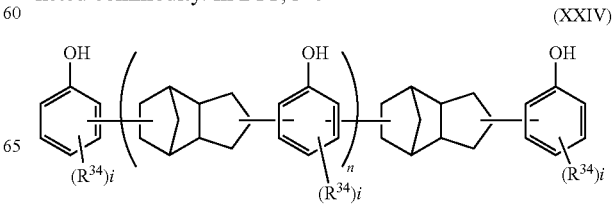

(wherein, $R^{34}$ in the general formula (XXIV) represents a hydrogen atom or a monovalent organic group having 1 to 18 carbon atoms, and each may be the same or different. i is an integer of 0 to 3; n is a mean value, and represents a positive number of 0 to 10.

There are no particular limitations on the salicylaldehyde type phenolic resins as long as the phenolic resins are obtained by using a compound having a salicylaldehyde skeleton as a raw material. The phenolic resin represented by the following general formula (XXV) is preferable.

MEH-7500 (trade name; manufactured by Meiwa Plastic Industries, Ltd.) or the like can be obtained as a marketed commodity in the phenolic resins represented by the following general formula (XXV). In MEH-7500, i=0, and k=0.

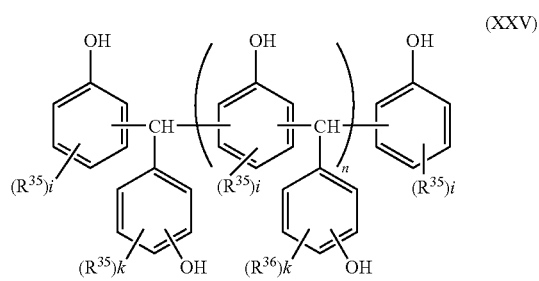

(XXV)

(wherein, $R^{35}$, $R^{36}$ in the general formula (XXV) represent a hydrogen atom or a monovalent organic group having 1 to 18 carbon atoms, and each may be the same or different. i is an integer of 0 to 3: k is an integer of 0 to 4; n is a mean value, and represents a positive number of 0 to 10.

There are no particular limitations on the copolymer type phenolic resins of the benzaldehyde type and the aralkyl type, as long as the copolymer type phenolic resins of the aralkyl type phenolic resin and the phenolic resin obtained by using a compound having a benzaldehyde skeleton as a raw material. The phenolic resin represented by the following general formula (XXVI) is preferable.

HE-510 (trade name; manufactured by Sumitomo Metal Industories Ltd.) or the like can be obtained as a marketed commodity in the phenolic resin represented by the following general formula (XXVI). In HE-510, i=0, k=0, and q=0.

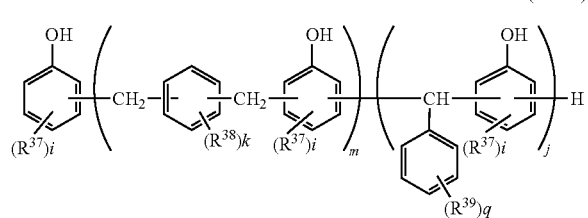

(XXVI)

(wherein, $R^{37}$ to $R^{39}$ in the general formula (XXVI) represent a hydrogen atom or a monovalent organic group having 1 to 18 carbon atoms, and each may be the same or different. i is an integer of 0 to 3; k is an integer of 0 to 4; q is an integer of 0 to 5; l, m are mean values, and represent a positive number of 0 to 11 respectively. (l+m) represents a positive number of 1 to 11.)

There are no particular limitations on the novolac type phenolic resins, as long as the phenolic resins are obtained by subjecting phenols and/or naphthols and aldehydes to condensation or cocondensation in the presence of an acid catalyst. The phenolic resin represented by the following general formula (XXVII) is preferable.

TAMANOL758, 759 (trade name; manufactured by Arakawa chemical Industries, Ltd.) and HP-850N (trade name; manufactured by Hitachi Chemical Co., Ltd.) or the like can be obtained as a marketed commodity in the phenolic resins represented by the following general formula (XXVII). In TAMANOL758, 759 and HP-850N, i=0 and all of $R^{40}$ are the hydrogen atoms.

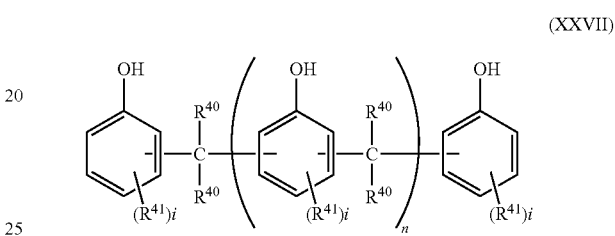

(XXVII)

($R^{40}$ and $R^{41}$ in the general formula (XXVII) represent a hydrogen atom or a monovalent organic group having 1 to 18 carbon atoms, and each may be the same or different. i is an integer of 0 to 3; k is an integer of 0 to 4; n is a mean value, and represents a positive number of 0 to 10.)

That each of $R^{27}$ to $R^{41}$ in the general formulae (XXI) to (XXVII) may be the same or different means, for instance, that all of $R^{27}$ of i pieces in the formula (XXI) may be the same or different. For the others $R^{28}$ to $R^{41}$, All of each number included in the formula may be the same or different. Each of $R^{27}$ to $R^{41}$ may be the same or different. For instance, all of $R^{27}$ and $R^{28}$ may be the same or different, and all of $R^{35}$ and $R^{36}$ may be the same or different.

Letter symbol n in the general formulae (XXI) to (XXVII) is within the range of 0 to 10. When it is more than 10, the component (B) has a high melt viscosity and hence the curing resin composition also has a high viscosity at the time of its melt molding, tending to cause faulty filling and deformation of bonding wires (i.e., gold wires which connect device components with leads). It is preferable that the average n in one molecule is set within the range of 0 to 4. The values of i, j, k, q in the general formulae (XXI) to (XXVII) are independent for each number of each R.

When the epoxy resin (C) is used as the curing resin (B) and the phenolic resin is used as the curing agent (D) of the epoxy resin in the invention, the mixing proportion of the component (C) and the component (D) is preferably set within the range of 0.5 to 2.0, more preferably 0.7 to 1.5, and still more preferably 0.8 to 1.3 in the proportion (the number of the hydroxyl groups in the phenolic resin/the number of the epoxy groups in the epoxy resin) of hydroxyl group equivalent weight of the all phenolic resin based on the epoxy equivalent weight of all epoxy resins. If it is less than 0.5, the epoxy resin may cure insufficiently to tend to make cured products have poor heat resistance, moisture resistance and electrical properties. If on the other hand it is more than 2.0, the phenolic resin component is so excessive that curing may be insufficient and phenolic hydroxyl groups may remain in the cured resin in a large quantity, tending to result in poor electrical properties and moisture resistance.

More than one kind of a general curing accelerator for accelerating the curing reaction of curing resin can be used in combination besides the curing accelerator component (A) for the curing resin composition of the invention. Examples of the curing accelerators used in combination include a cycloamidine compound such as diazabicycloalkene such as 1,5-diazabicyclo[4.3.0]nonene-5 and 1,8-diazabicyclo[5.4.0]undecene-7, derivatives thereof, phenol novolak salts thereof, a compound which has intramolecular polarisation obtained by addition of these compounds to compounds having $\pi$ bonds such as a maleic anhydride, quinone compounds such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone anddiazophenylmethane; tertiary amines such as triethylenediamine, benzildimethylamine, triethanolamine, dimethylaminoethanoland tris(dimethylaminomethyl)phenol, derivatives thereof; imidazoles such as 2-methylimidazole, 2-phenylimidazole, 2-phenyl-4-methylimidazole and 2-heptadecylimidazole; tetra-substituted-phosphonium tetra-substituted borates such as tetraphenylphosphonium tetraphenyl borate; tetraphenylboron salts such as 2-ethyl-4-methylimidazole tetraphenyl borate and N-methylimorpholine tetraphenyl borate; organophosphines such as triphenylphosphine, diphenyl(p-tolyl)phosphine, tris(alkylphenyl)phosphines, tris(alkoxyphenyl)phosphines, tris(alkylalkoxyphenyl)phosphines, tris(dialkylphenyl)phosphines, tris(trialkylphenyl)phosphines, tris(tetraalkylphenyl)phosphines, tris(dialkoxyphenyl)phosphines, tris(trialkoxyphenyl)phosphines, tris(tetraalkoxyphenyl)phosphines, trialkyl phosphines, dialkylaryl phosphines, alkyldiaryl phosphines; or complexes of any of these organophosphines with organoborons; a compound which has intramolecular polarisation obtained by addition of these organophosphines to compounds having $\pi$ bonds such as a maleic anhydride, quinone compound such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone and diazophenylmethane.

When any of these curing accelerators are used in combination, the component (A) may preferably be mixed in an amount not less than 30% by weight, and more preferably not less than 50% by weight, based on the total weight of the curing accelerator. The component (A) mixed in an amount less than 30% by weight tends to reduce curability and/or flow properties under moisture absorption, and thereby the effect of the present invention tends to be less effective.

On the total weight of the curing accelerators inclusive of the component (A), there are no particular limitations as long as these are mixed in an amount necessary for achieving the curing acceleration effect. From the viewpoint of curability under moisture absorption and flow properties, the weight of 0.1 to 10 part by weight is preferable based on 100 parts by weight of the total weight of the curing resin (B), and more preferably 1 to 7.0 part by weight. If these are in an amount less than 0.1 part by weight, the curing may be difficult in a short time, and, in an amount more than 10 parts by weight, the curing rate may be too high to obtain good molded products.

The curing resin composition of the invention may optionally be incorporated with inorganic filler (E). Especially when the curing resin composition is used as the encapsulation molding material, it is preferable for the molding material to contain the inorganic filler (E). There are no particular limitations on the inorganic filler (E) which is used in the invention and is generally used for the encapsulation molding material. The inorganic filler (E) may include fine powders of fused silica, crystal silica, glass, alumina, calcium carbonate, zirconium silicate, calcium silicate, silicon nitride, aluminum nitride, boron nitride, beryllia, zirconia, zircon, forsterite, steatite, spinel, mullite, titania, talc, clay and mica, or sphered beads of any of these. Also, as inorganic filler having a flame-retardant effect, it may include aluminum hydroxide, magnesium hydroxide, a complex metal hydroxide such as a complex hydroxide of magnesium and zinc, and zinc borate. Of the foregoing inorganic fillers, fused silica is preferred from the viewpoint of lowering the coefficient of linear expansion, and alumina from the viewpoint of a high thermal conductivity. Any of these may be used alone or in combination of two or more.

There are no particular limitations on the amount of mixing of the inorganic filler (E) as long as the effect of the invention can be achieved. It may preferably be mixed in an amount ranging from 70 to 95% by weight based on the weight of the curing resin composition. Since the inorganic filler is added for the purpose of improving the coefficient of linear expansion, thermal conductivity, modulus of elasticity or the like of cured products, its mixing in an amount less than 70% by weight tend to not bring about any sufficient improvement of these properties, and, in an amount more than 95% by volume, the curing resin composition may have a very high viscosity to have low flow properties, tending to make it difficult to carry out molding.

The inorganic filler (E) may also preferably have an average particle diameter ranging from 1 to 50 μm, and particularly preferably from 10 to 30 μm. If it has an average particle diameter smaller than 1 μm, the resin composition tends to increase in viscosity. If it has an average particle diameter larger than 50 μm, the resin component and the filler tend to separate from each other, so that the cured product tends to be non-uniformly formed or have varied properties and also any narrow gaps in a mold tend to be low filled.

From the viewpoint of flow properties, the inorganic filler (E) may preferably have a particle shape which is spherical rather than rectangular, and may preferably have a particle size distribution in a wide range. For example, when the filler is mixed in an amount of 60% by weight or more, 70% by weight or more of the particles may preferably be spherical and be size-distributed in a wide range of from 0.1 to 80 μm. Such filler can readily provide a excellent fill structure, and hence may cause less increase in viscosity of materials even when mixed in a large quantity, so that compositions having superior flow properties can be obtained.

An anion exchanger can be optionally mixed with the curing resin composition of the invention. When the curing resin composition is used as the encapsulation molding material, it is preferable to add an anion exchanger from the viewpoint of an improvement in moisture resistance and high-temperature storage characteristics of electronic component devices having device components to be encapsulated. There are no particular limitations on anion exchangers usable in the invention, and conventionally known anion exchangers can be used. For instance, Examples thereof include hydrotalcites, and hydrated oxides of elements selected from magnesium, aluminum, titanium, zirconium and bismuth. Any of these may be used alone or in combination of any number of types. In particular, hydrotalcite represented by the following general formula (XXVIII) is preferable.

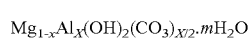  (XXVIII)

$(0 < X \leq 0.5$, m is a positive number.$)$

There are no particular limitations on the amount of any of these anion exchangers to be mixed, as long as it is an amount sufficient for capturing the anions such as halide ions. It may preferably be set in the range of from 0.1 to 30% by weight, and more preferably from 1 to 5% by weight, based on the curing resin (B).

Known colorants such as carbon black, organic dyes, organic pigments, titanium oxide, red lead and red iron oxide may be optionally mixed for the curing resin composition of the invention.

The curing resin composition of the invention may be incorporated with a release agent for providing a good releasability to a mold at the time of molding. There are no particular limitations on the release agents used in the invention, and the conventionally known release agents can be used. Examples of the release agents include higher fatty acids such as carnauba wax, montanic acid and stearic acid, higher fatty acid metal salts, an ester type wax such as montanate, polyolfin type wax such as oxidation polyethylene and non-oxidation polyethylene. These may be used alone or in combination of two or more. In particular, as the release agent, the oxide type or non-oxide type polyolefin wax may preferably be added in an amount of from 0.01 to 10% by weight, and more preferably from 0.1 to 5% by weight of the curing resin (B). If it is in an amount less than 0.01% by weight, sufficient releasability tends to be not obtainable. If it is in an amount more than 10% by weight, there is a possibility of deteriorating adhesion. The polyolefin wax may include low-molecular-weight polyethylene having number-average molecular weight of about 500 to about 10,000, such as H4, PE or PED series available from Hoechst Corp. as marketed commodity. When any of these additional release agent is used in combination in addition to the polyolefin wax, it may preferably be mixed in a proportion of from 0.1 to 10% by weight, and more preferably from 0.5 to 3% by weight, based on the curing resin (B).

The curing resin composition of the invention may be optionally incorporated with a flame retardant for imparting flame retardance. There are no particular limitations on the flame retardant used in the invention. As the flame retardant, usable are known organic or inorganic compounds containing a halogen atom, an antimony atom, a nitrogen atom or a phosphorus atom, metal hydroxides and acenaphthylene. These may be used alone or in combination of two or more types. There are no particular limitations on the amount of mixing of the flame retardant as long as the flame-retardant effect can be achieved. The flame retardant may preferably be mixed in a proportion of from 1 to 30% by weight, and more preferably from 2 to 15% by weight, based on the epoxy resin (C).

Known coupling agents for improving adhesion between the resin component and the filler can be added to the encapsulation curing resin composition of the invention. The known coupling agents including silane compounds such as epoxysilane, mercaptosilane, aminosilane, alkylsilane, ureidosilane and vinylsilane, titanium compounds, aluminum chelates, and aluminum/zirconium compounds or the like can e used.

It is preferable that the amount of mixing of the coupling agent is 0.05 to 5 percent by weight based on the inorganic filler (E), and more preferably 0.1 to 2.5 percent by weight. When the amount of mixing is less than 0.05 percent by weight, adhesion with the flame tends to reduce. When the amount of mixing is more than 5 percent by weight, the molding properties of the package tends to reduce.

Examples of the coupling agents include, for instance, silane coupling agents such as vinyltrichlorosilane, vinyltriethoxysilane, vinyltris($\beta$-methoxyethoxy)silane, $\gamma$-methacryloxypropyltrimethoxysilane, $\gamma$-methacryloxypropyltriethoxysilane, $\gamma$-acryloxypropyltrimethoxysilane, $\beta$-(3,4-epoxycyclohexyl)ethyltrimethoxysilane, $\gamma$-glycidoxypropyltrimethoxysilane, $\gamma$-glycidoxypropylmethyldimethoxysilane, vinyltriacetoxysilane, $\gamma$-mercaptopropyltrimethoxysilane, $\gamma$-aminopropyltriethoxysilane, $\gamma$-anilinopropyltrimethoxysilane, $\gamma$-anilinopropyltriethoxysilane, $\gamma$-anilinopropylmethyldimethoxysilane, $\gamma$-anilinopropylmethyldiethoxysilane, $\gamma$-anilinopropylethyldiethoxysilane, $\gamma$-anilinopropylethyldimethoxysilane, $\gamma$-anilinomethyltrimethoxysilane, $\gamma$-anilinomethyltriethoxysilane, $\gamma$-anilinomethylmethyldimethoxysilane, $\gamma$-anilinomethylmethyldiethoxysilane, $\gamma$-anilinomethylethyldiethoxysilane, $\gamma$-anilinomethylethyldimethoxysilane, N-(p-methoxyphenyl)-$\gamma$-aminopropyltrimethoxysilane, N-(p-methoxyphenyl)-$\gamma$-aminopropyltriethoxysilane, N-(p-methoxyphenyl)-$\gamma$-aminopropylmethyldimethoxysilane, N-(p-methoxyphenyl)-$\gamma$-aminopropylmethydiethoxysilane, N-(p-methoxyphenyl)-$\gamma$-aminopropylethyldiethoxysilane, N-(p-methoxyphenyl)-$\gamma$-aminopropylethyldimethoxysilane, $\gamma$-(N-methyl)aminopropyltrimethoxyslane, $\gamma$-(N-ethyl)aminopropyltrimethoxysilane, $\gamma$-(N-butyl)aminopropyltrimethoxysilane, $\gamma$-(N-benzyl)aminopropyltrimethoxysilane, $\gamma$-(N-methyl)aminopropyltriethoxysilane, $\gamma$-(N-ethyl)aminopropyltriethoxysilane, $\gamma$-(N-butyl)aminopropyltriethoxysilane, $\gamma$-(N-benzyl)aminopropyltriethoxysilane, $\gamma$-(N-methyl)aminopropylmethyldimethoxysilane, $\gamma$-(N-ethyl)aminopropylmethyldimethoxysilane, $\gamma$-(N-butyl)aminopropylmethyldimethoxysilane, $\gamma$-(N-benzyl)aminopropylmethyldimethoxysilane, $\gamma$-($\beta$-aminoethyl)aminopropylmethyldimethoxysilane, $\gamma$-[bis($\beta$-hydroxyethyl)]aminopropyltrimethoxysilane, N-$\beta$-(aminoethyl)-$\gamma$-aminopropyltriethoxysilane, $\gamma$-($\beta$-aminoethyl)aminopropyltrimethoxysilane, $\gamma$-($\beta$-aminoethyl)aminopropyldimethoxymethylsilane, N-(trimethoxysilylpropyl)ethylenediamine, N-(dimethoxymethylsilylisopropyl)ethylenediamine, methyltrimethoxysilane, dimethyldimethoxysilane, methyltriethoxysilane, N-$\beta$-(N-vinylbenzylaminoethyl)-$\gamma$-aminopropyltrimethoxysilane, $\gamma$-chloropropyltrimethoxysilane, hexamethyldisilane, vinyltrimethoxysilane and $\gamma$-mercaptopropylmethyldimethoxysilane, and titanate coupling agents such as isopropyltriisostearoyltitanate, isopropyltris(dioctylpyrophosphate)titanate, isopropyltri(N-aminoethyl-aminoethyl)titanate, tetraoctylbis(ditridesylphosphite)titanate, tetra(2,2-diallyloxymethyl-1-butyl)bis(ditridesyl)phosphate titanate, bis(dioctylpyrophosphate)oxyacetate titanate, bis(dioctylpyrophosphate)ethylenetitanate, isopropyltrioctanoyltitanate, isopropyldimethacrylisostearoyltitanate, isopropyltridodecylbenzenesulfonyltitanate, isopropylisostearoyldiacryltitanate, isopropyltri(dioctylphosphate)titanate, isopropyltricumylphenyltitanate and tetraisopropylbis(dioctylphosphite)titanate. The coupling agents are not limited thereto. These may be used alone or in combination of two or more types. In these, the coupling agent having a secondary amino group is preferable from the viewpoint of the flow properties and the wire flow.

A stress relaxation agent such as silicone oil and silicone rubber powder can be optionally mixed to the curing resin composition of the invention. Mixing the stress relaxation agent can reduce the amount of the warp transformation of the package and the package crack. There are no particular limitations on the stress relaxation agents which can be used as long as the stress relaxation agents are a known plasticizer (stress relaxation agent) which is generally used. Examples of the plasticizers generally used include thermoplastic elastomers of silicone type, styrene type, olefine type, urethane type, polyester type, polyether type, polyamide type, polybutadiene type; rubber particles such as NR (crude rubber), NBR (acrylonitrile-butadiene rubber), an acrylic rubber, a urethane rubber and a silicone powder; and rubber particles having a core shell structure such as methylmethacrylate-styrene-butadiene copolymer (MBS), methylmethacrylate-silicone copolymer and methylmethacrylate-butyl acrylate copolymer. These may be used alone or in combination of two or more types. In particularly, the silicone type plasticizer is preferable, and examples of the silicone type plasticizer including a plasticizer having an epoxy group, a plasticizer having an amino group, and a polyether-modified plasticizer of these.

Incidentally, the curing resin composition of the invention may be prepared by any methods as long as the materials of various types can uniformly be dispersed and be mixed. A commonly available preparation method may include a method in which materials formulated in prescribed quantities are thoroughly mixed by means of a mixer and the mixture obtained is melt-kneaded by means of a mixing roll or an extruder, followed by cooling and then pulverization. For example, it can be obtained by stirring and mixing the above components uniformly in prescribed quantities and kneading the resultant mixture by means of a kneader, roll mill or extruder previously heated to 70 to 140° C. followed by cooling and then pulverization. The product obtained may be made into tablets in such a size and weight that may suit to molding conditions, so as to be usable with ease.

The electronic component device of the present invention can be produced by mounting active devices such as semiconductor chips, transistors, diodes or thyristors and passive devices such as capacitors, resistors or coils on a support member such as a lead frame, a tape carrier having been wired, a wiring board, glass or a silicon wafer, and encapsulating necessary portions with the curing resin composition of the present invention. Such electronic component devices include commonly available resin-encapsulated ICs in which semiconductor devices are fastened onto a lead frame, and terminals (such as bonding pads) and leads of the device are connected by wire bonding or through bumps, followed by encapsulation with the curing resin composition of the invention by transfer molding or the like. The commonly available resin-encapsulated ICs include DIP (dual-inline package), PLCC (plastic-leaded chip carrier), QFP (quad flat package), SOP (small outline package), SOJ (small outline J-lead package), TSOP (thin small outline package) and TQFP (thin quad flat package). The electronic component devices include TCPs (tape carrier packages) in which semiconductor chips bonded to a tape carrier through bumps are encapsulated with the curing resin composition of the invention; COB (chip on board) modules in which active devices such as semiconductor chips, transistors, diodes or thyristors and/or passive devices such as capacitors, resistors or coils which are connected to wirings formed on a wiring board and a glass by using wire bonding, flip chip bonding and solder or the like are encapsulated with the curing resin composition of the invention; hybrids IC; multichip modules; BGAs (ball grid arrays) in which devices are mounted on an organic substrate on the back of which terminals for wiring-board connection have been formed, and the devices are connected through bumps or by wire bonding, to wirings formed on the organic substrate, followed by encapsulation with the curing resin composition of the invention; CSPs (chip size packages) or the like. The curing resin composition of the invention is also effectively usable in printed circuit boards.

As methods of encapsulation for the electronic component device by using the curing resin composition of the invention, low-pressure transfer molding is most commonly used. Injection molding or compression molding may also be used.

EXAMPLES

Examples of the invention will be described below. The examples of the present invention are not intended as a definition of the limits of the invention.

[Synthesis Example for a Curing Accelerator for a Curing Resin]

Synthesis Example 1

Triphenylphosphine of 20.4 g, 4-bromo phenol of 26.9 g, nickel (II) chloride hexahydrate of 3.5 g and DMF of 20 g were put in a flask, and were stirred at 145° C. for 6 hours. Under reduced pressure, the reaction liquid was concentrated, and methanol of 60 ml was added to the reaction liquid. Sodium hydroxide of 9.3 g was then added to the reaction liquid, and the reaction liquid was stirred until the sodium hydroxide was completely dissolved.

The solution obtained was filtered on celite, and was concentrated under reduced pressure until the whole amount became about 50 ml. The solution was then turned on into water of 1 liter, and the crystal deposited was filtered. The crystal was then dried under reduced pressure after washing, and a compound of 25.6 g was obtained. Elementary analysis revealed that C was 81.34 and H was 5.40 as calculated values (%), and C was 81.21 and H was 5.34 as measured values (%).

Synthesis Example 2

A compound of 24.5 g was obtained in the same manner as in Synthesis Example 1 except that 4-chlorophenol of 20 g was put in place of 4-bromo phenol. Elementary analysis revealed that C was 81.34 and H was 5.40 as calculated values (%), and C was 81.23 and H was 5.33 as measured values (%).

Synthesis Example 3

Triphenylphosphine of 20.4 g, 3-bromo phenol of 26.9 g, nickel (II) chloride hexahydrate of 3.5 g and DMF of 20 g were put in a flask, and were stirred at 145° C. for 6 hours. Under reduced pressure, the reaction liquid was concentrated, and methanol of 60 ml was added to the reaction liquid. Sodium hydroxide of 9.3 g was then added to the reaction liquid, and the reaction liquid was stirred until the sodium hydroxide was completely dissolved. The solution obtained was filtered on celite, and was concentrated under reduced pressure until the whole amount became about 50 ml. The solution was then turned on into water of 1 liter. The resultant solution was concentrated until the resultant solution become about 200 ml, and the crystal deposited was filtered. The crystal was then dried, and a compound of 10.2 g was obtained. Elementary analysis revealed that C was 81.34 and H was 5.40 as calculated values (%), and C was 81.15 and H was 5.29 as measured values (%).

Synthesis Example 4

A compound of 24.3 g was obtained in the same manner as in Synthesis Example 1 except that 2-bromophenol of 26.9 g was put in place of 4-bromophenol. Elementary analysis revealed that C was 81.34 and H was 5.40 as calculated values (%), and C was 81.22 and H was 5.32 as measured values (%).

Synthesis Example 5

A compound of 25.2 g was obtained in the same manner as in Synthesis Example 1 except that 2-chlorophenol of 20 g was put in place of 4-bromophenol. Elementary analysis revealed that C was 81.34 and H was 5.40 as calculated values (%), and C was 81.20 and H was 5.34 as measured values (%).

Synthesis Example 6

A compound of 25.9 g was obtained in the same manner as in Synthesis Example 1 except that 4-bromo-2,6-dimethylphenol of 31.3 g was put in place of 4-bromophenol. Elementary analysis revealed that C was 81.66 and H was 6.06 as calculated values (%), and C was 81.47 and H was 5.99 as measured values (%).

Synthesis Example 7

A compound of 27.2 g was obtained in the same manner as in Synthesis Example 2 except that tri-p-tolylphosphine of 23.7 g was put in place of triphenylphosphine. Elementary analysis revealed that C was 81.80 and H was 6.36 as calculated values (%), and C was 81.67 and H was 6.29 as measured values (%).

Synthesis Example 8

A compound of 25.9 g was obtained in the same manner as in Synthesis Example 1 except that 6-bromo-2-naphthol of 36.2 g was put in place of 4-bromophenol. Elementary analysis revealed that C was 83.15 and H was 5.23 as calculated values (%), and C was 83.01 and H was 5.18 as measured values (%).

Synthesis Example 9

A compound of 16.5 g was obtained in the same manner as in Synthesis Example 2 except that cyclohexyldiphenylphosphine of 20.9 g was put in place of triphenylphosphine. Elementary analysis revealed that C was 79.98 and H was 6.99 as calculated values (%), and C was 79.86 and H was 6.90 as measured values (%).

The compounds obtained by the Synthesis Examples 1 to 9 were analyzed by the following method.

(1) $^1$H-NMR

The compound of about 10 mg was solved in methanol-d4 of about 0.5 ml, and the resultant solution was put in a sample tube of φ5 mm. The solution was measured by AC-250 (trade name: manufactured by Bruker Japan Co., Ltd). The shift value was based on a small amount of CHD$_2$OH (3.3 ppm) contained in the solvent.

(2) $^{13}$C-NMR

The compound of about 100 mg was solved in methanol-d4 of about 0.5 ml, and the resultant solution was put in a sample tube of φ5 mm. The solution was measured by AC-250 (trade name: manufactured by Bruker Japan Co., Ltd). The shift value was based on methanol-d4 (49 ppm).

(3) $^{31}$P-NMR

The compound of about 100 mg was solved in methanol-d4 of about 0.5 ml, and the resultant solution was put in a sample tube of φ5 mm. The solution was measured by AC-250 (trade name, manufactured by Bruker Japan Co., Ltd). The shift value was based on triphenyl phosphate (0 ppm).

(4) IR

The compound was measured by KBr method using FTS 3000MX (trade name, manufactured by Bio-Rad Laboratories).

Figure 2:
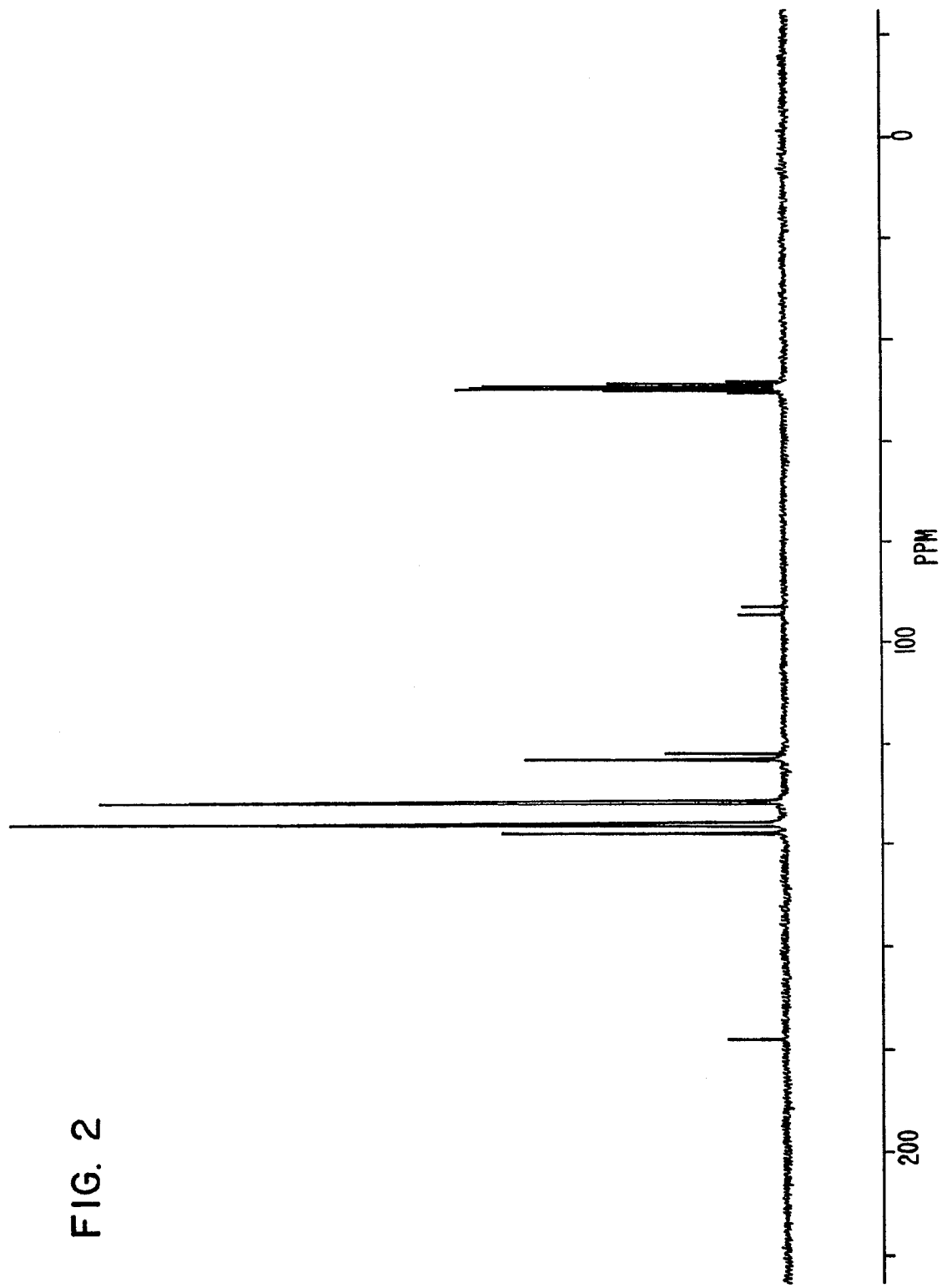
FIG. 2 is the $^{13}$C-NMR spectrum of a compound 1 obtained by Example of the invention.
Figure 3:
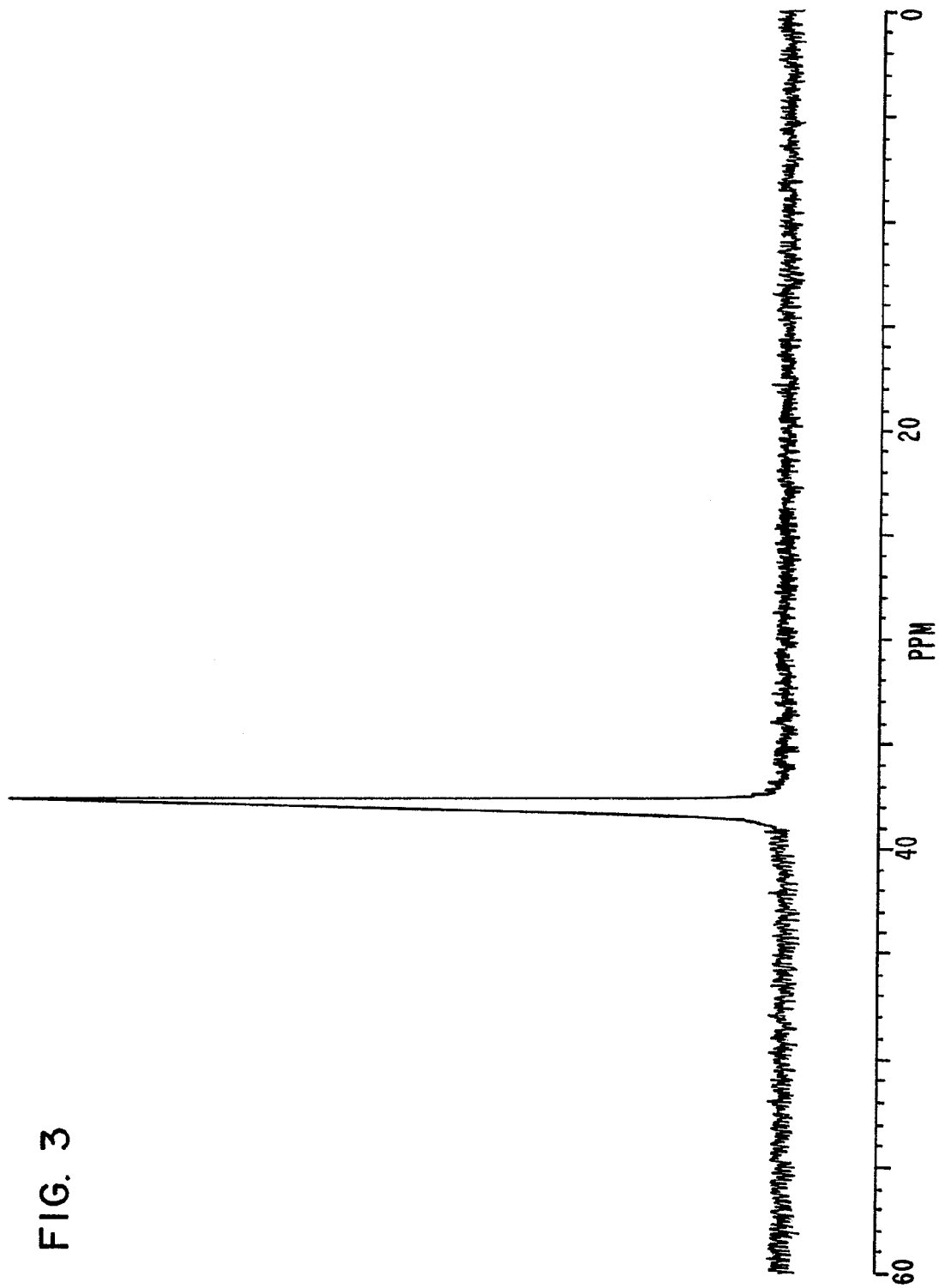
FIG. 3 is the $^{31}$P-NMR spectrum of a compound 1 obtained by Example of the invention.
Figure 4:
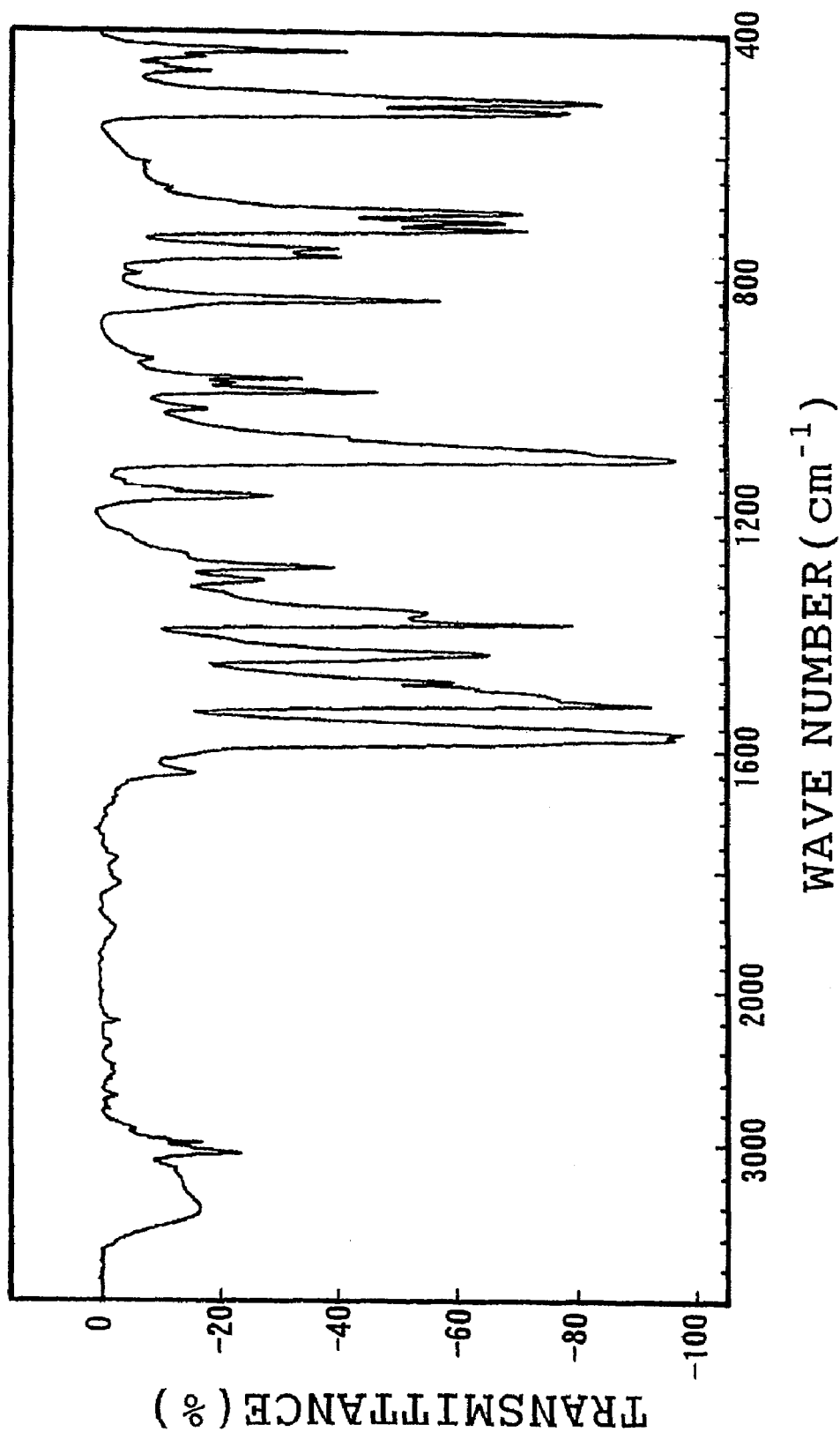
FIG. 4 is the IR spectrum of a compound 1 obtained by Example of the invention.

From these results of analysis, the compounds synthesized by the Synthesis Examples 1 and 2 were the same compound (compound 1), and it was ascertained that the structures thereof were represented by the following formula (XXIX). The yields thereof were 93% and 89%. The spectrums of $^1$H-NMR(CD$_3$OD), $^{13}$C-NMR(CD$_3$OD), $^{31}$P-NMR (CD$_3$OD) and IR (KBr method) of the compound 1 were respectively represented in FIGS. 1, 2, 3, 4.

Figure 5:
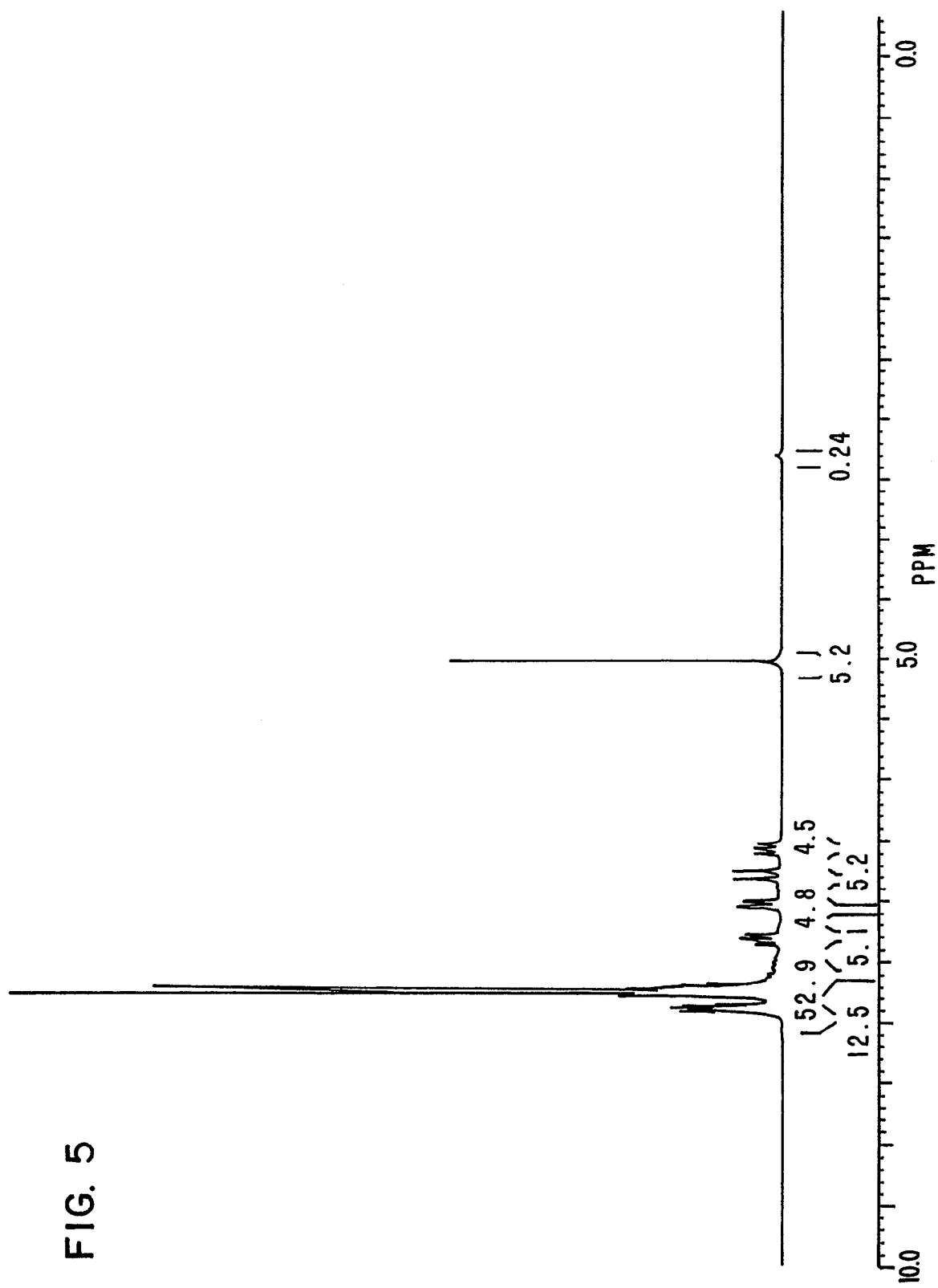
FIG. 5 is the $^1$H-NMR spectrum of a compound 2 obtained by Example of the invention.
Figure 6:
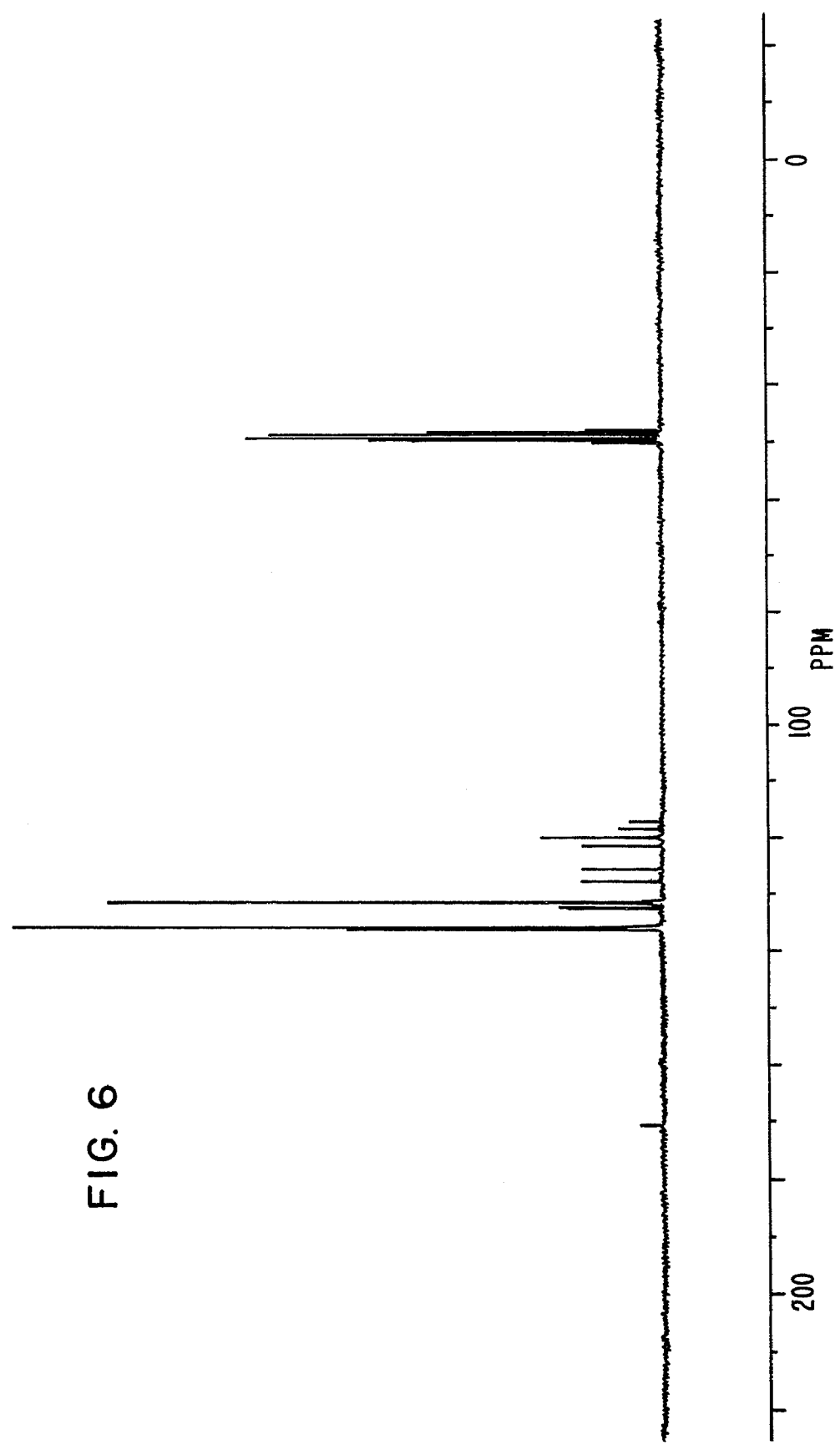
FIG. 6 is the $^{13}$C-NMR spectrum of a compound 2 obtained by Example of the invention.
Figure 7:
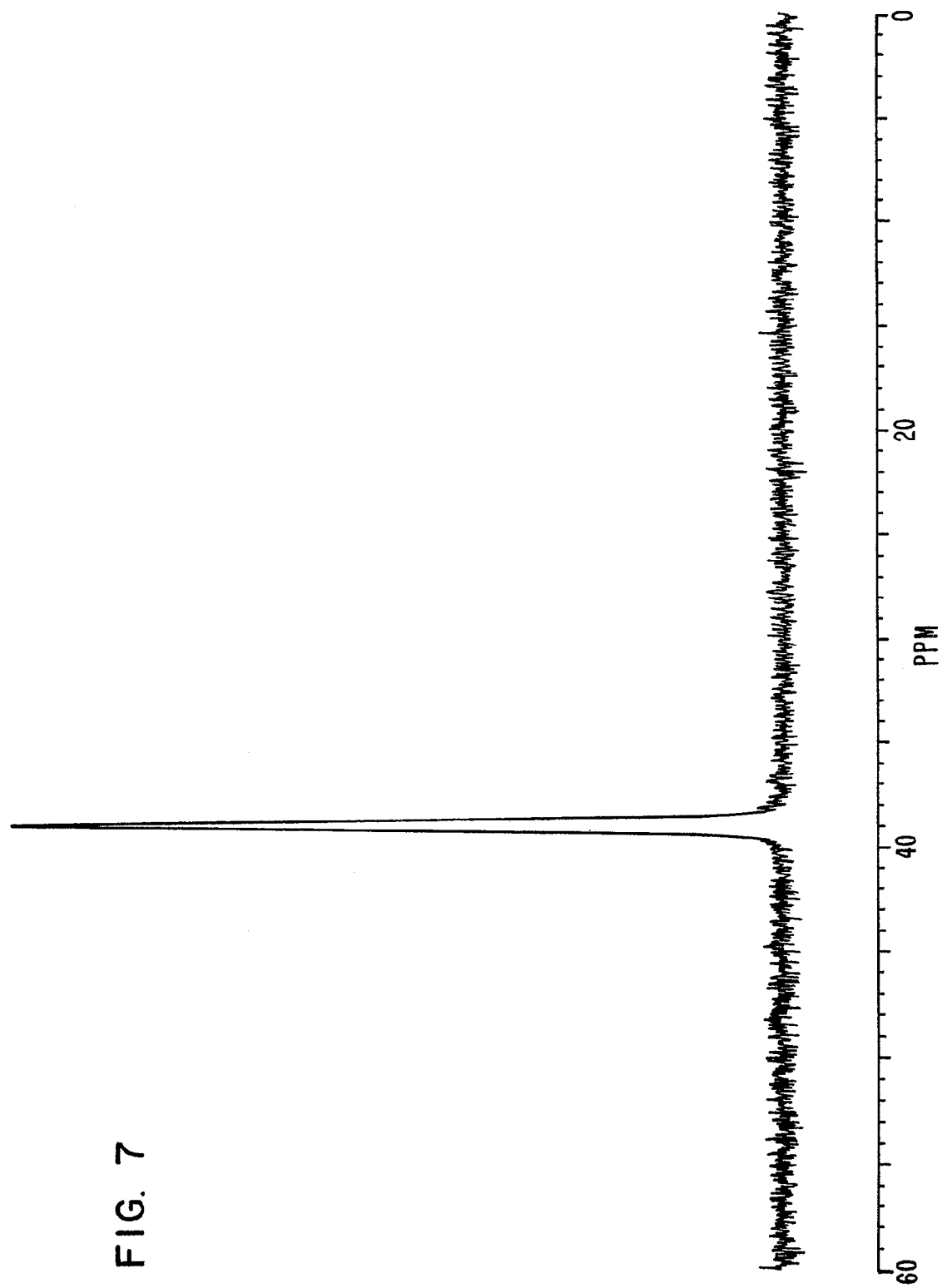
FIG. 7 is the $^{31}$P-NMR spectrum of a compound 2 obtained by Example of the invention.
Figure 8:
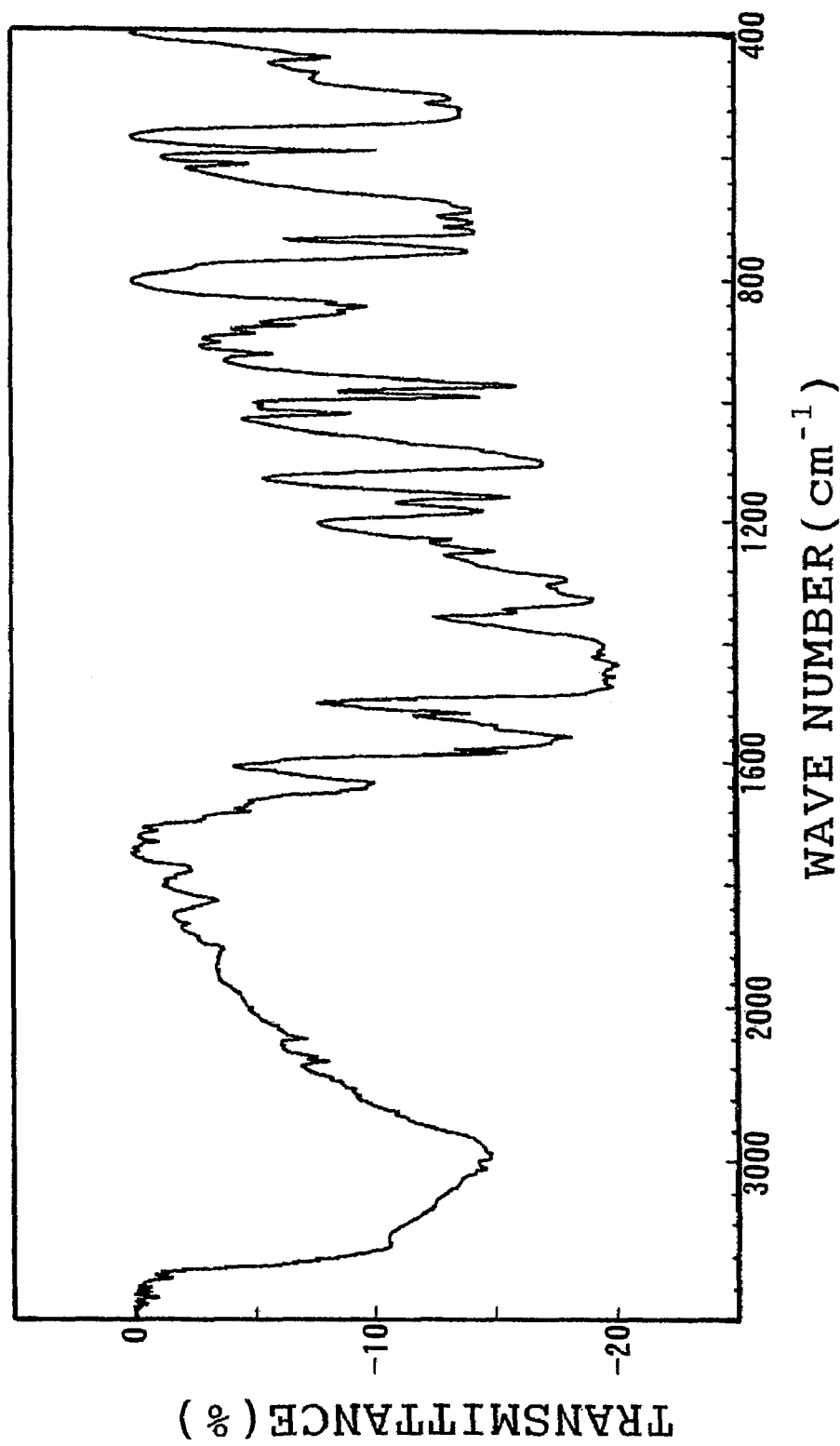
FIG. 8 is the IR spectrum of a compound 2 obtained by Example of the invention.

From these results of analysis, it was ascertained that the structure of the compound (compound 2) synthesized by the Synthesis Example 3 was represented by the following formula (XXX). The yield was 37%. The spectrums of $^1$H-NMR (CD$_3$OD), $^{13}$C-NMR(CD$_3$OD), $^{31}$P-NMR(CD$_3$OD) and IR (KBr) of the compound 2 were respectively represented in FIGS. 5, 6, 7, 8.

Figure 9:
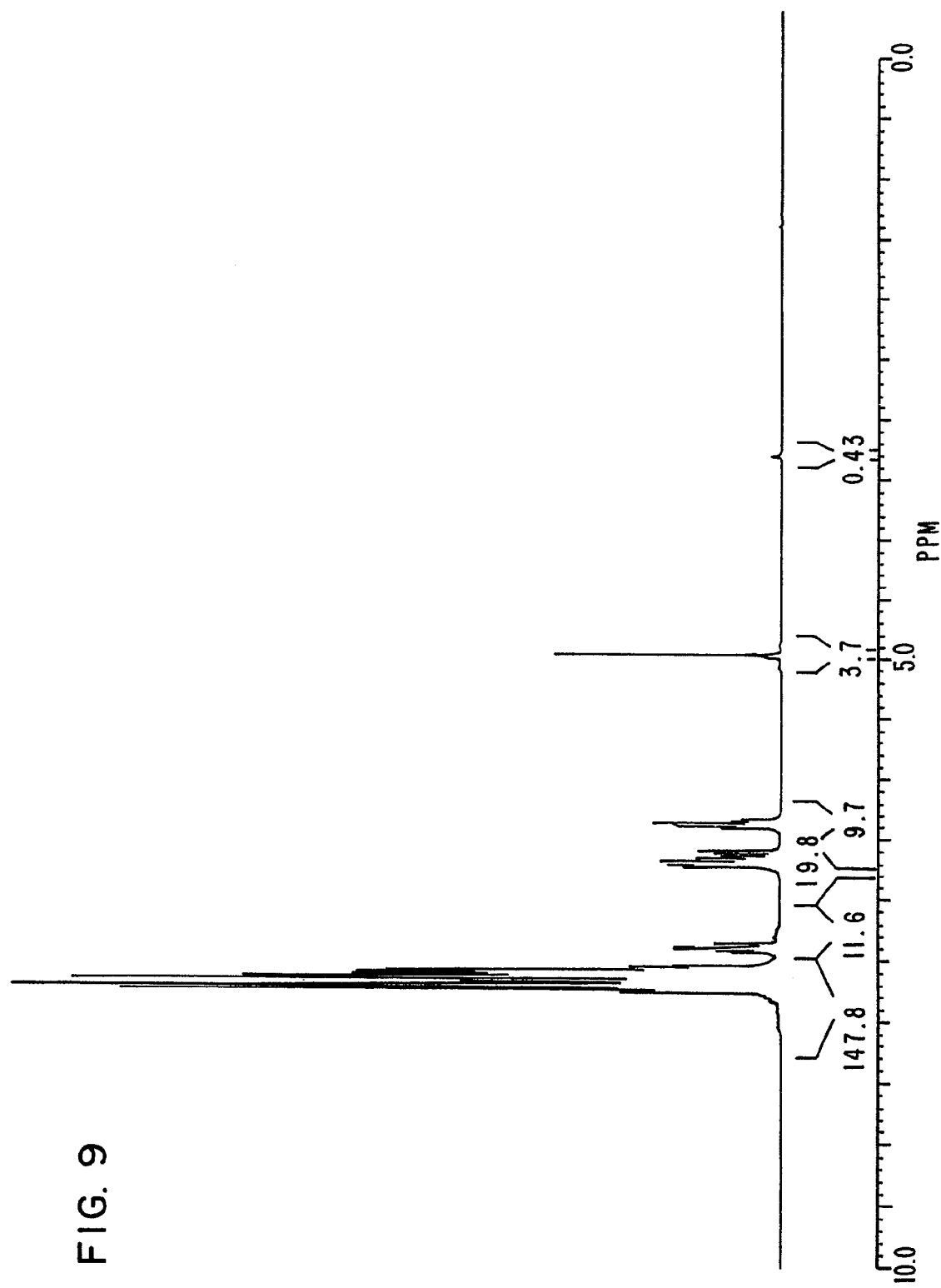
FIG. 9 is the $^1$H-NMR spectrum of a compound 3 obtained by Example of the invention.
Figure 10:
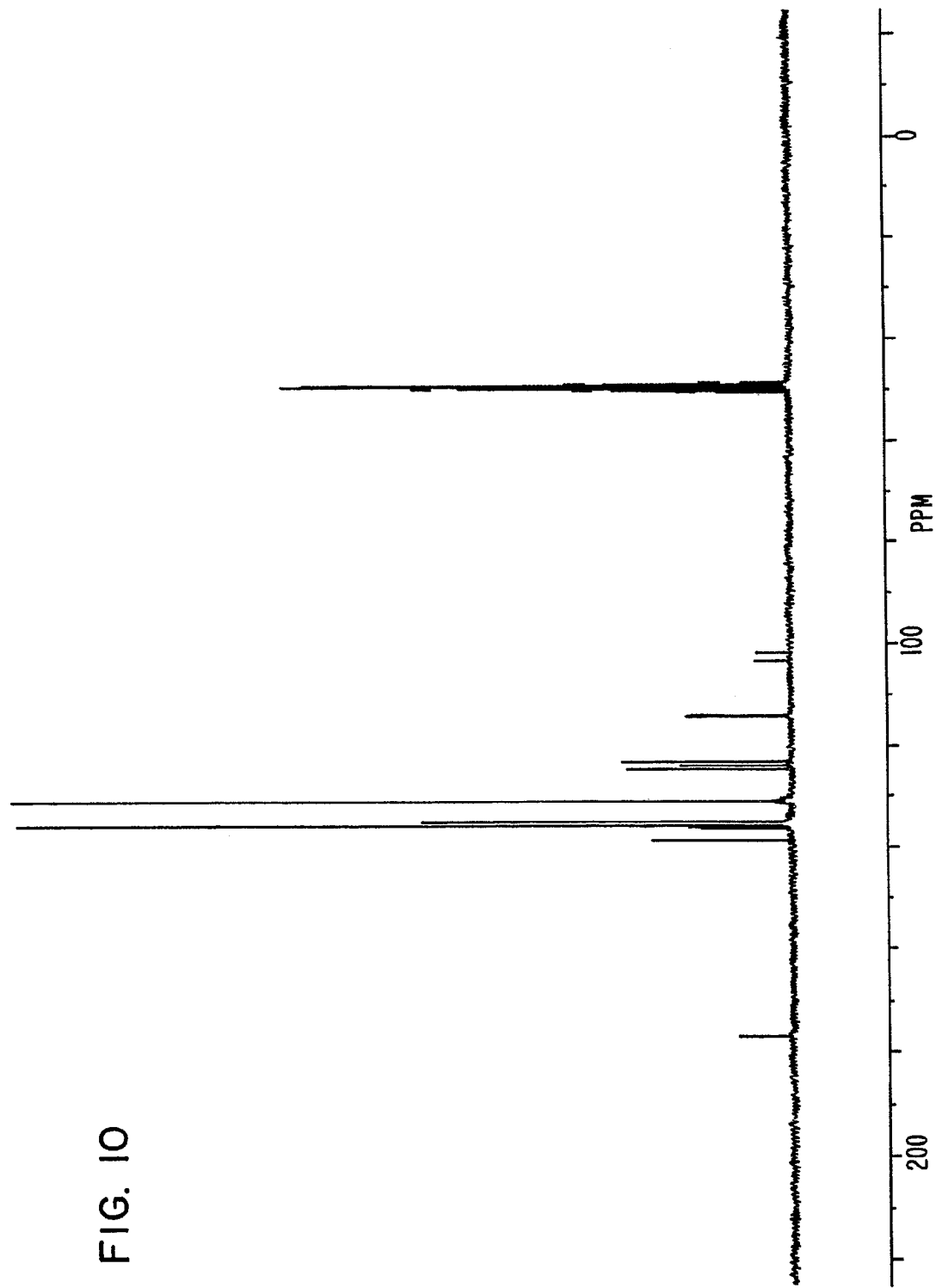
FIG. 10 is the $^{13}$C-NMR spectrum of a compound 3 obtained by Example of the invention.
Figure 11:
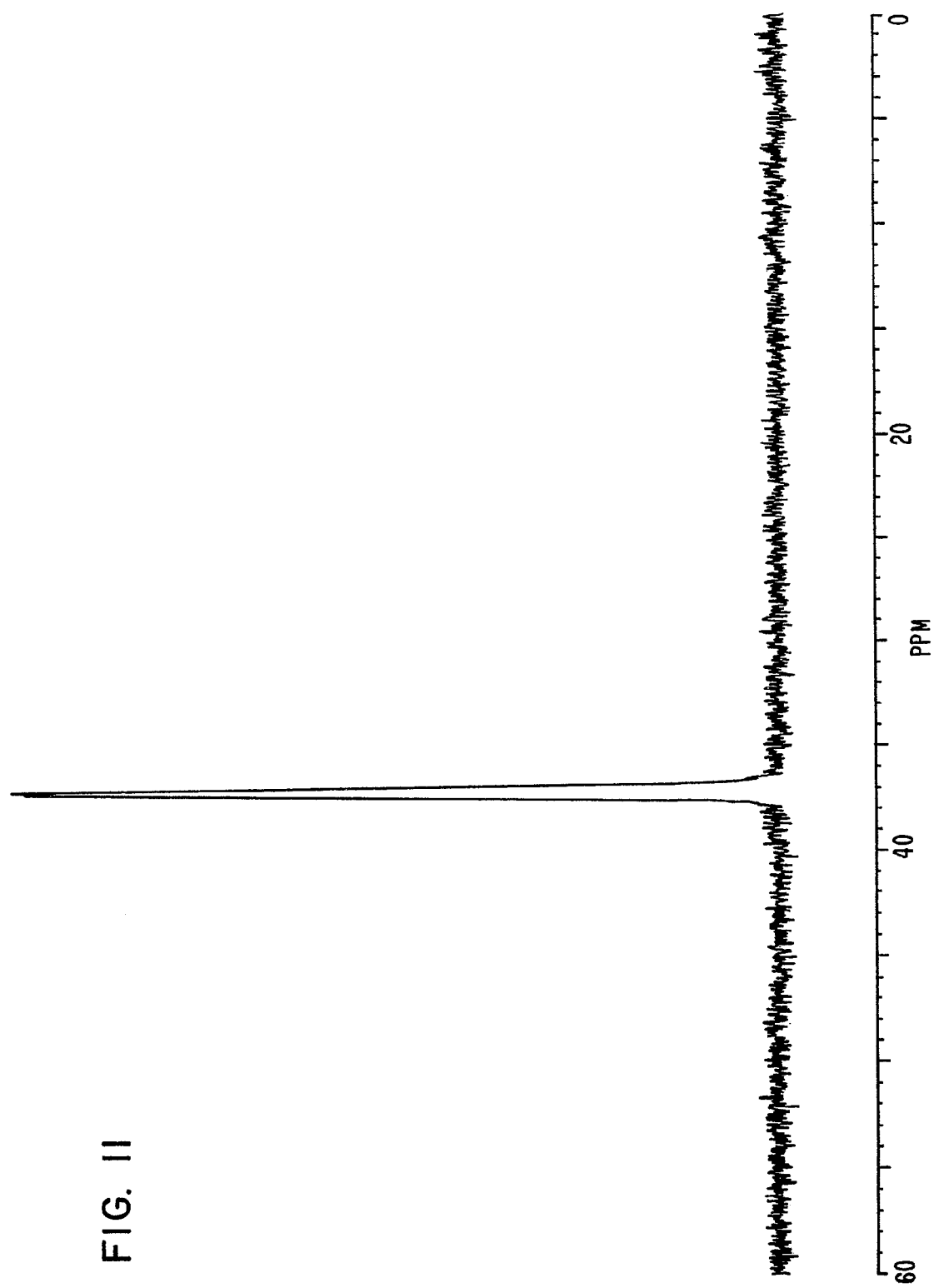
FIG. 11 is the $^{31}$P-NMR spectrum of a compound 3 obtained by Example of the invention.
Figure 12:
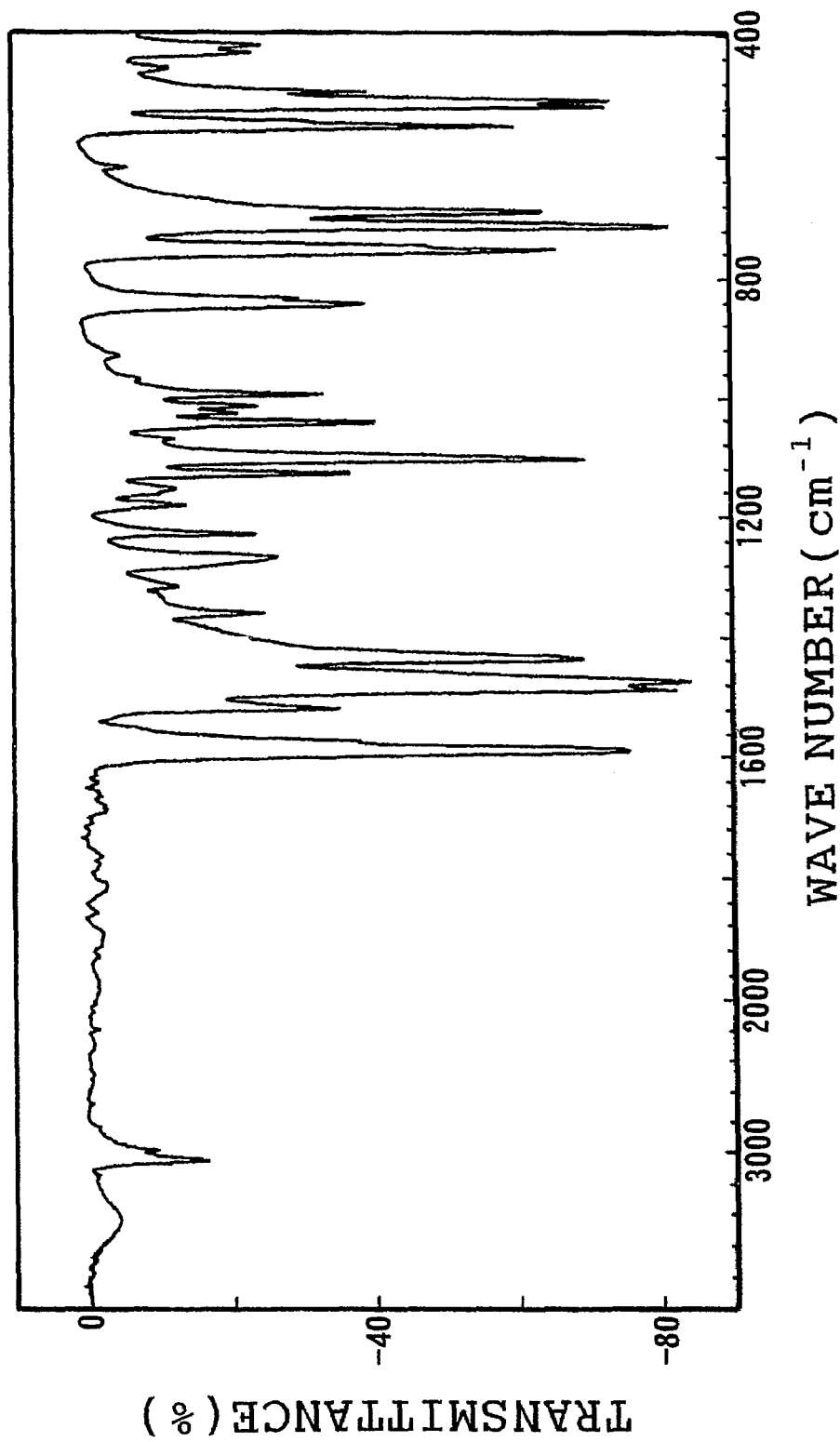
FIG. 12 is the IR spectrum of a compound 3 obtained by Example of the invention.

From these results of analysis, the compounds synthesized by the Synthesis Examples 4 and 5 were the same compound (compound 3), and it was ascertained that the structures thereof were represented by the following formula (XXXI). The yields thereof were respectively 88% and 91%. The spectrums of $^1$H-NMR(CD$_3$OD), $^{13}$C-NMR(CD$_3$OD), $^{31}$P-NMR(CD$_3$OD) and IR (KBr) were respectively represented in FIGS. 9, 10, 11, 12.

Figure 13:
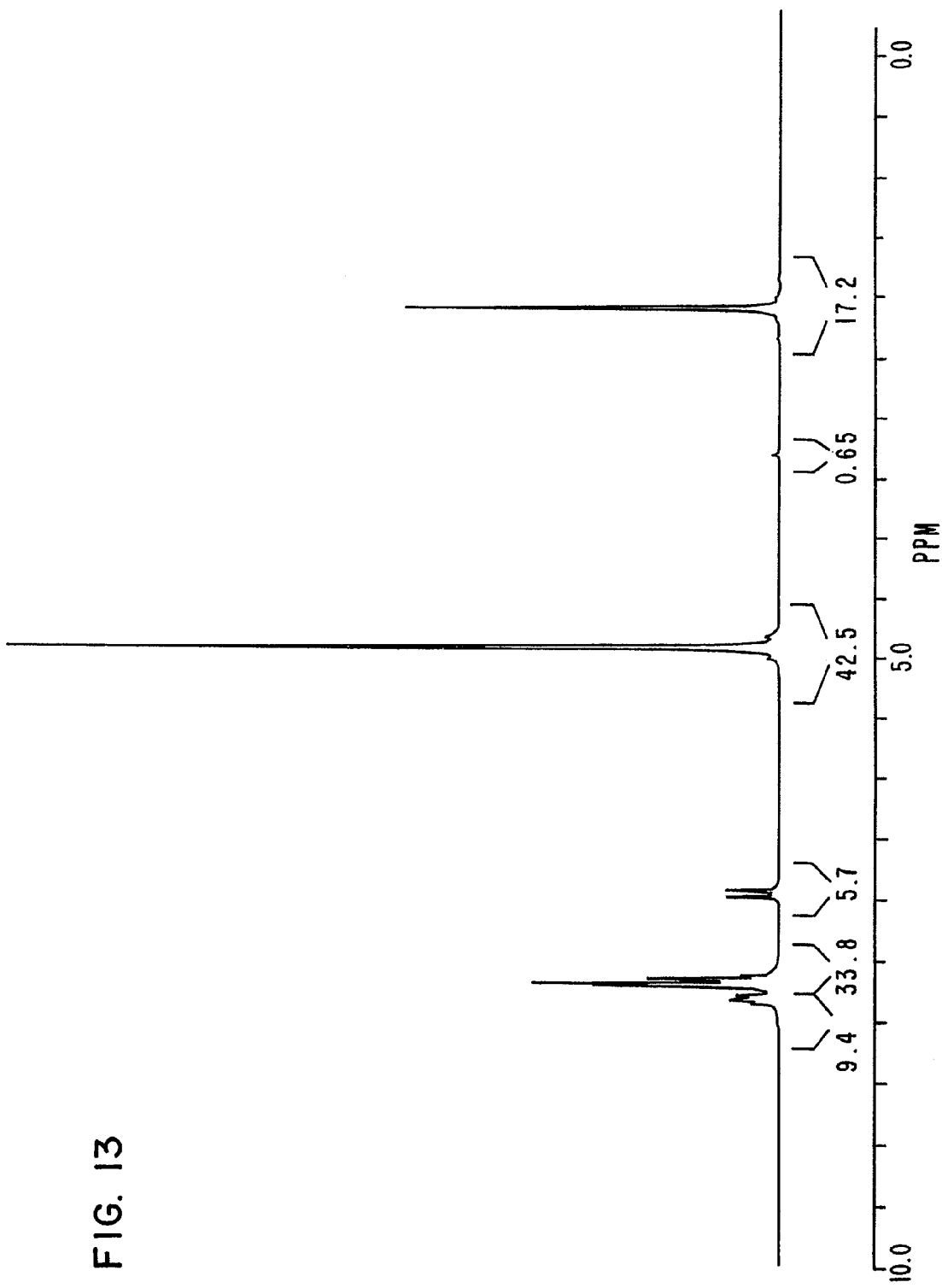
FIG. 13 is the $^1$H-NMR spectrum of a compound 4 obtained by Example of the invention.
Figure 14:
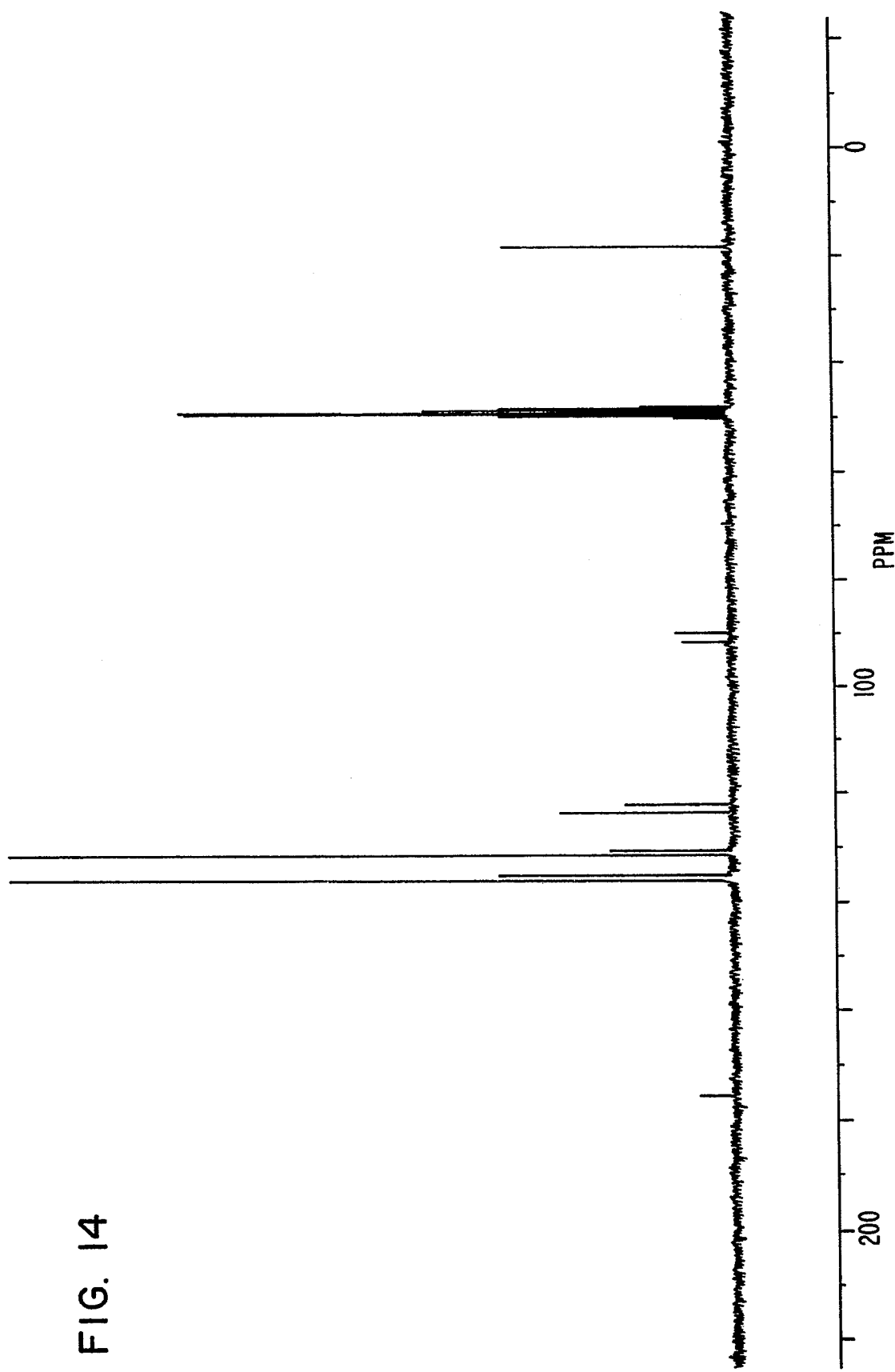
FIG. 14 is the $^{13}$C-NMR spectrum of a compound 4 obtained by Example of the invention.
Figure 15:
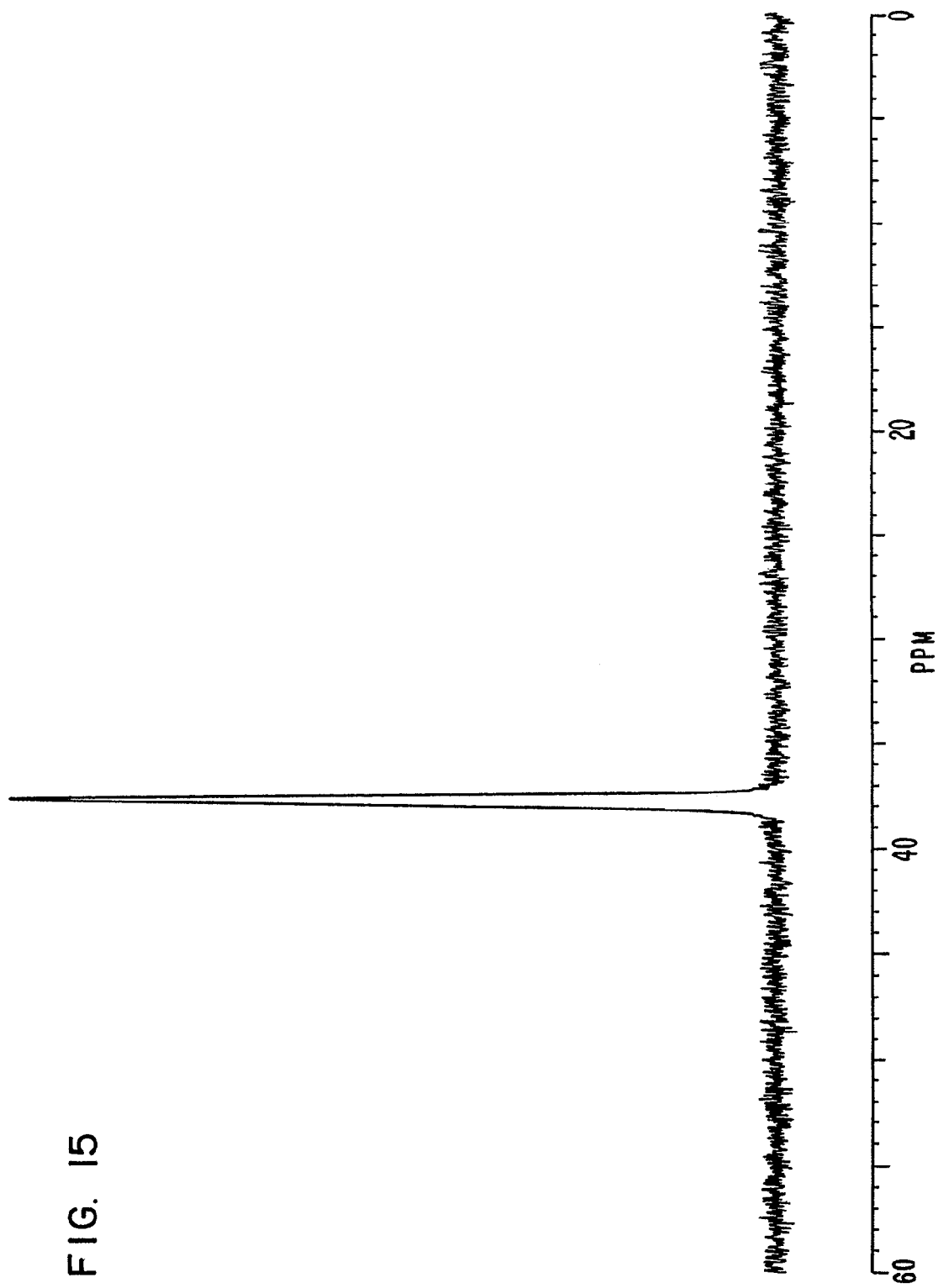
FIG. 15 is the $^{31}$P-NMR spectrum of a compound 4 obtained by Example of the invention.
Figure 16:
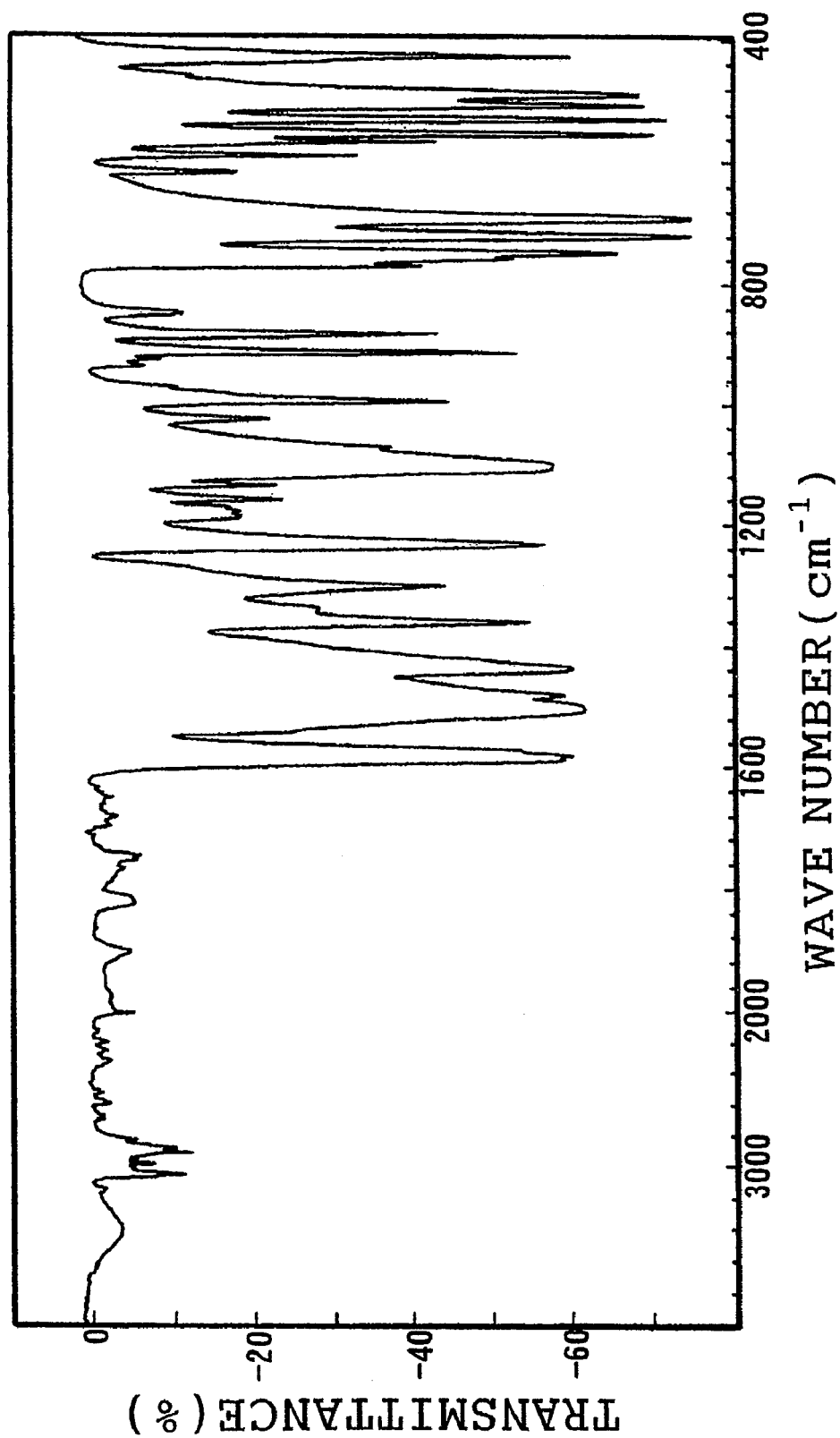
FIG. 16 is the IR spectrum of a compound 4 obtained by Example of the invention.

From these results of analysis, it was ascertained that the structure of the compound (compound 4) synthesized by the Synthesis Example 6 was represented by the following formula (XXXII). The yield was 87%. The spectrums of $^1$H-NMR(CD$_3$OD), $^{13}$C-NMR(CD$_3$OD), $^{31}$P-NMR (CD$_3$OD) and IR (KBr) were respectively represented in FIGS. 13, 14, 15, 16.

Figure 17:
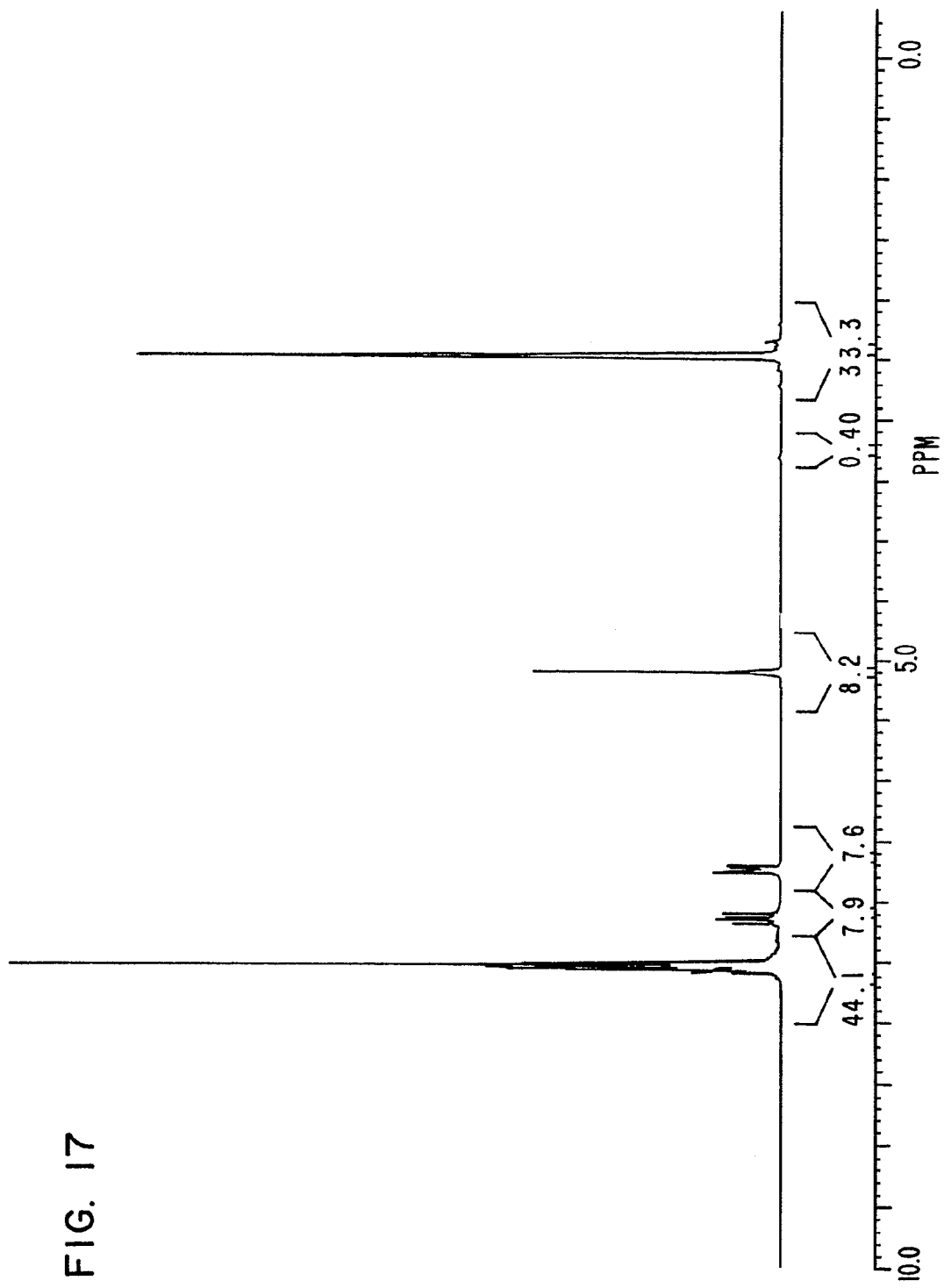
FIG. 17 is the $^{1}$H-NMR spectrum of a compound 5 obtained by Example of the invention.
Figure 18:
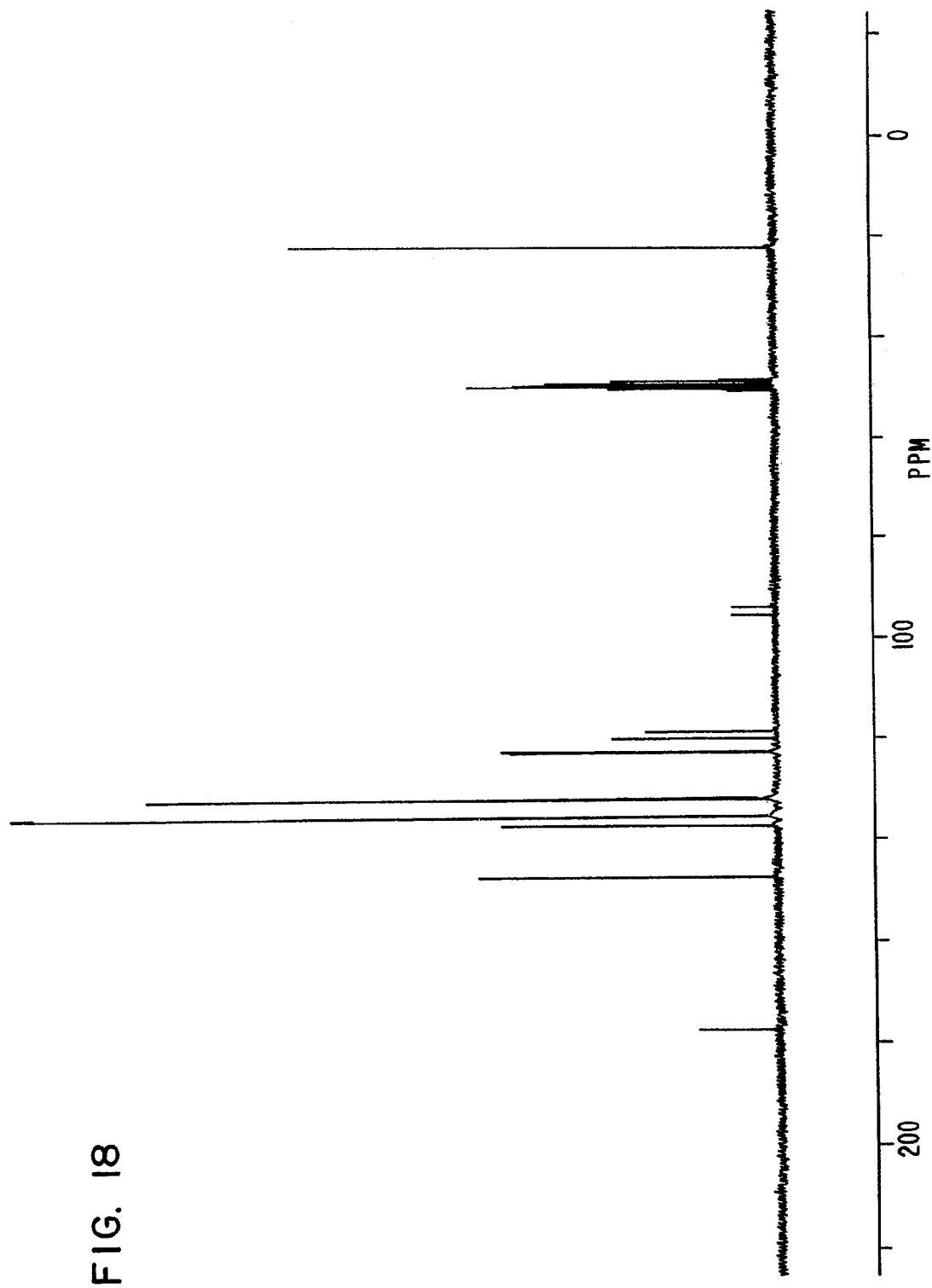
FIG. 18 is the $^{13}$C-NMR spectrum of a compound 5 obtained by Example of the invention.
Figure 19:
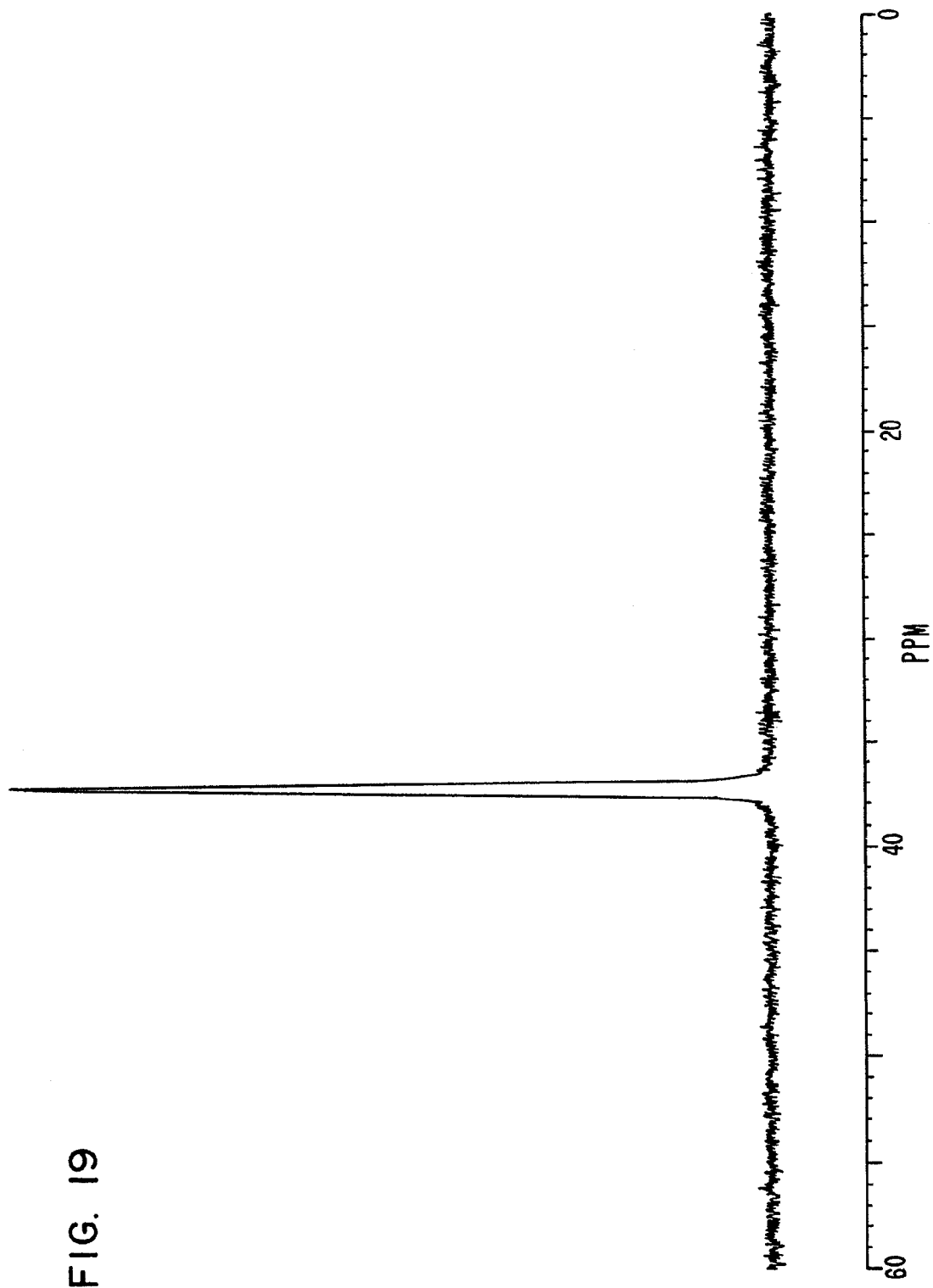
FIG. 19 is the $^{31}$P-NMR spectrum of a compound 5 obtained by Example of the invention.
Figure 20:
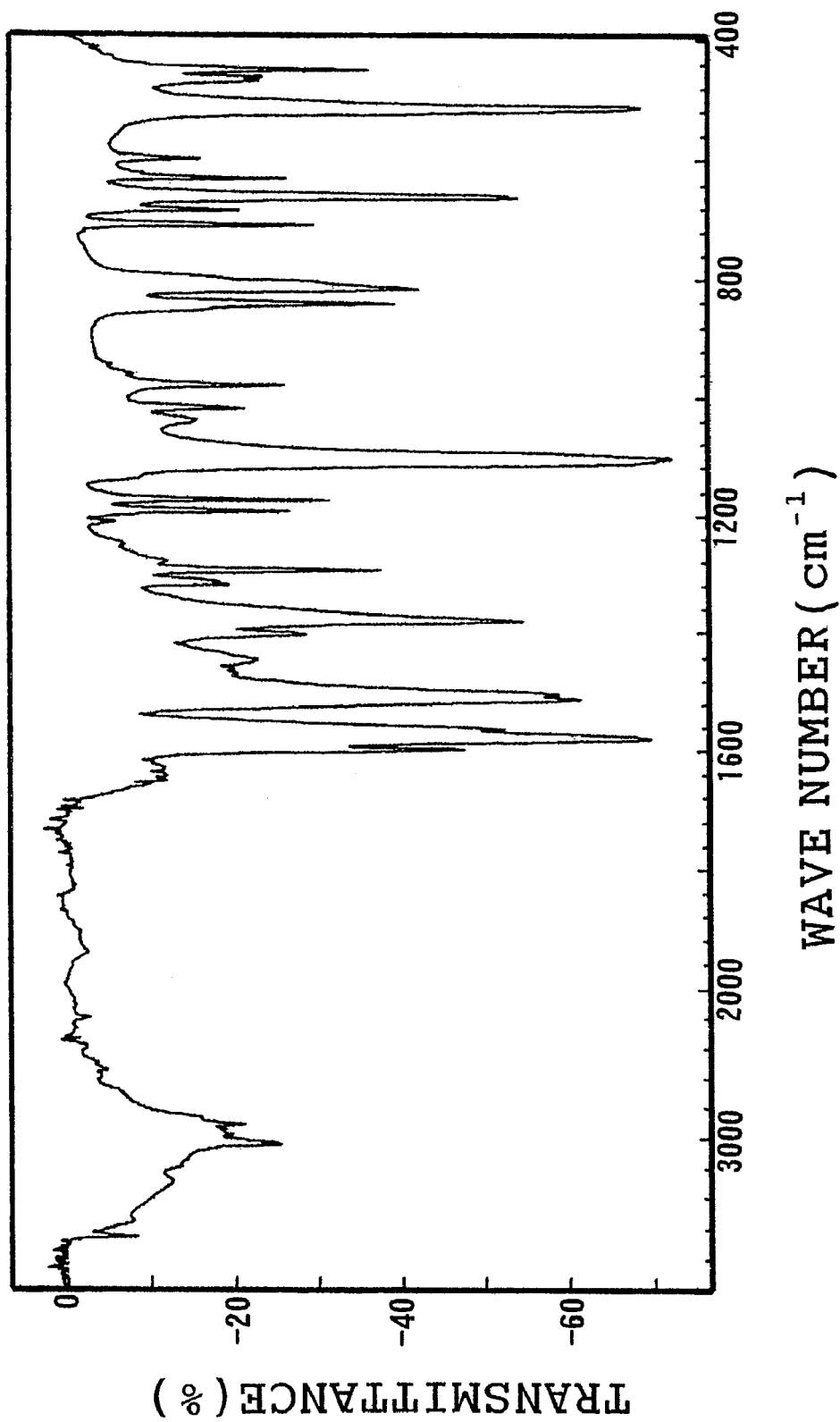
FIG. 20 is the IR spectrum of a compound 5 obtained by Example of the invention.

From these results of analysis, it was ascertained that the structure of the compound (compound 5) synthesized by the Synthesis Example 7 was represented by the following formula (XXXIII). The yield was 88%. The spectrums of $^1$H-NMR(CD$_3$OD), $^{13}$C-NMR(CD$_3$OD), $^{31}$P-NMR (CD$_3$OD) and IR (KBr) were respectively represented in FIGS. 17, 18, 19, 20.

Figure 21:
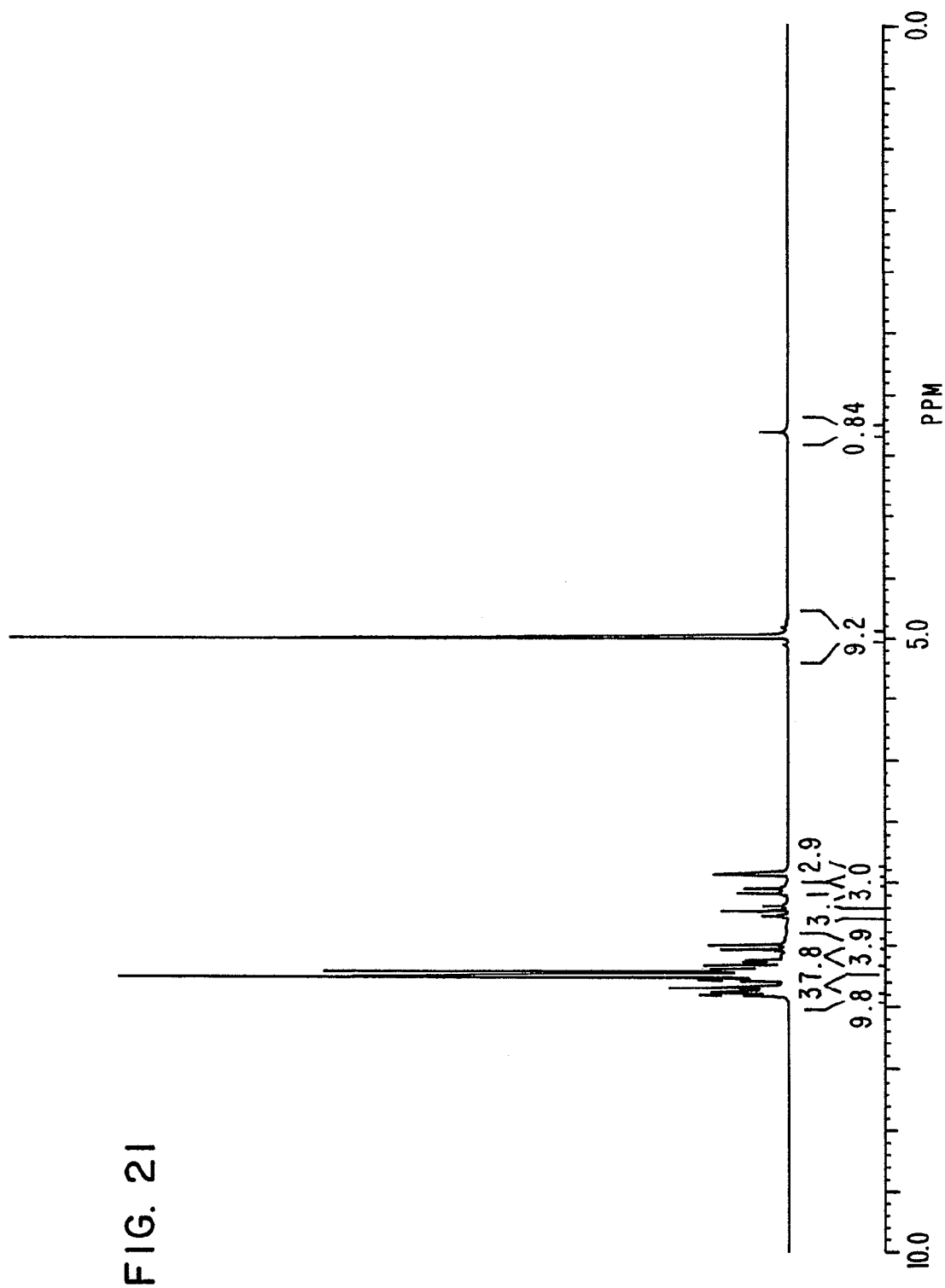
FIG. 21 is the $^{1}$H-NMR spectrum of a compound 6 obtained by Example of the invention.
Figure 22:
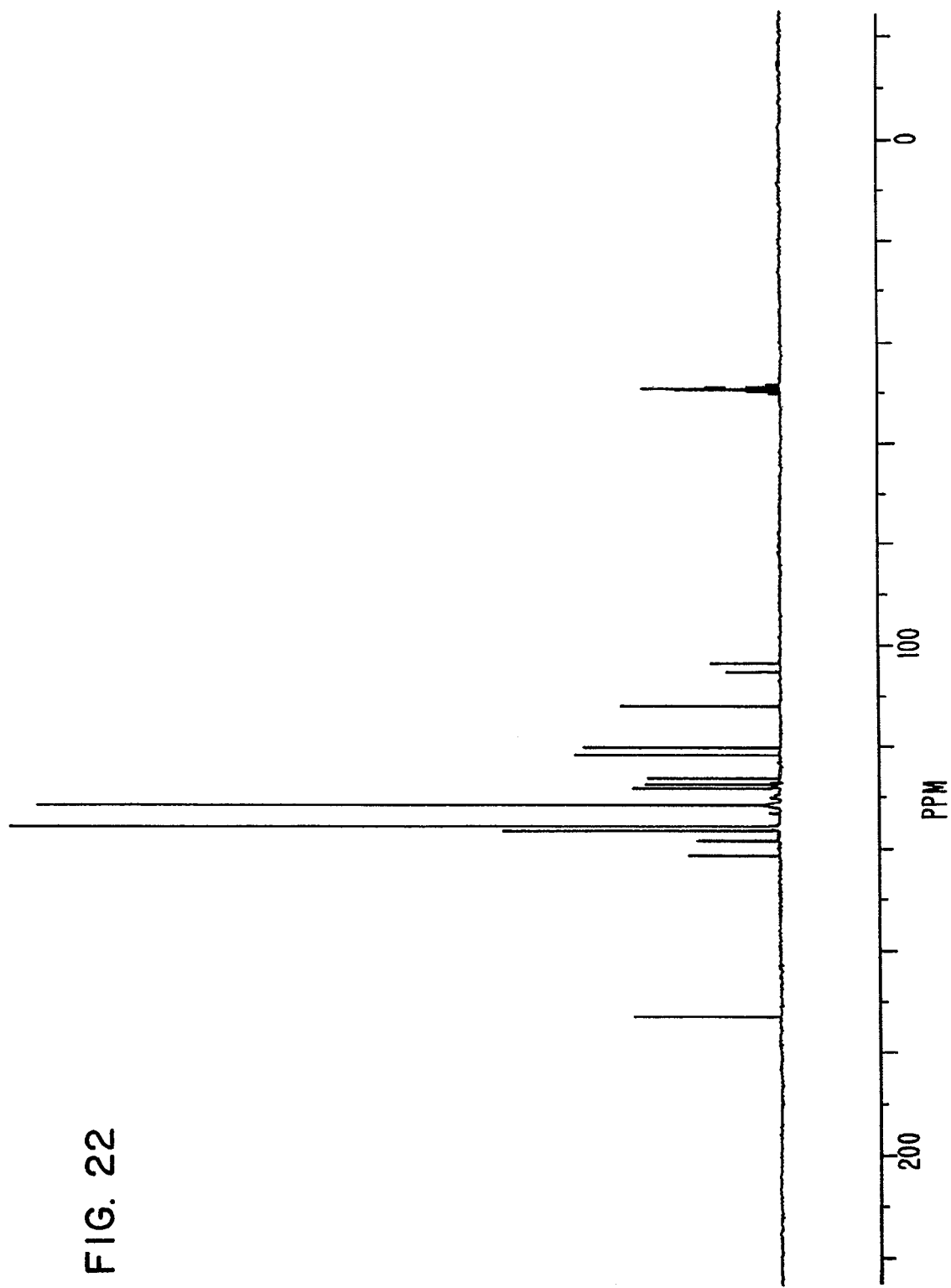
FIG. 22 is the $^{13}$C-NMR spectrum of a compound 6 obtained by Example of the invention.
Figure 23:
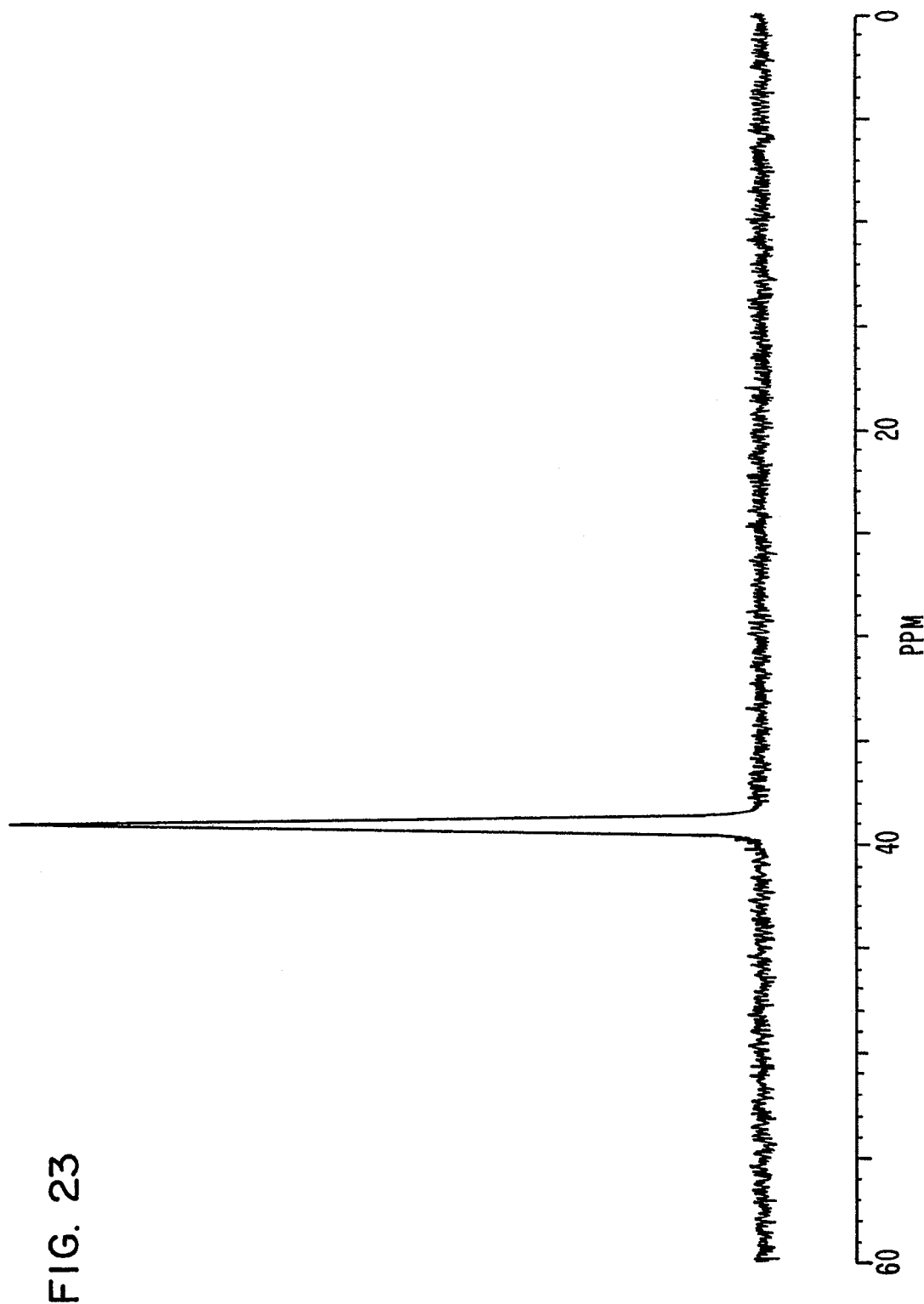
FIG. 23 is the $^{31}$P-NMR spectrum of a compound 6 obtained by Example of the invention.
Figure 24:
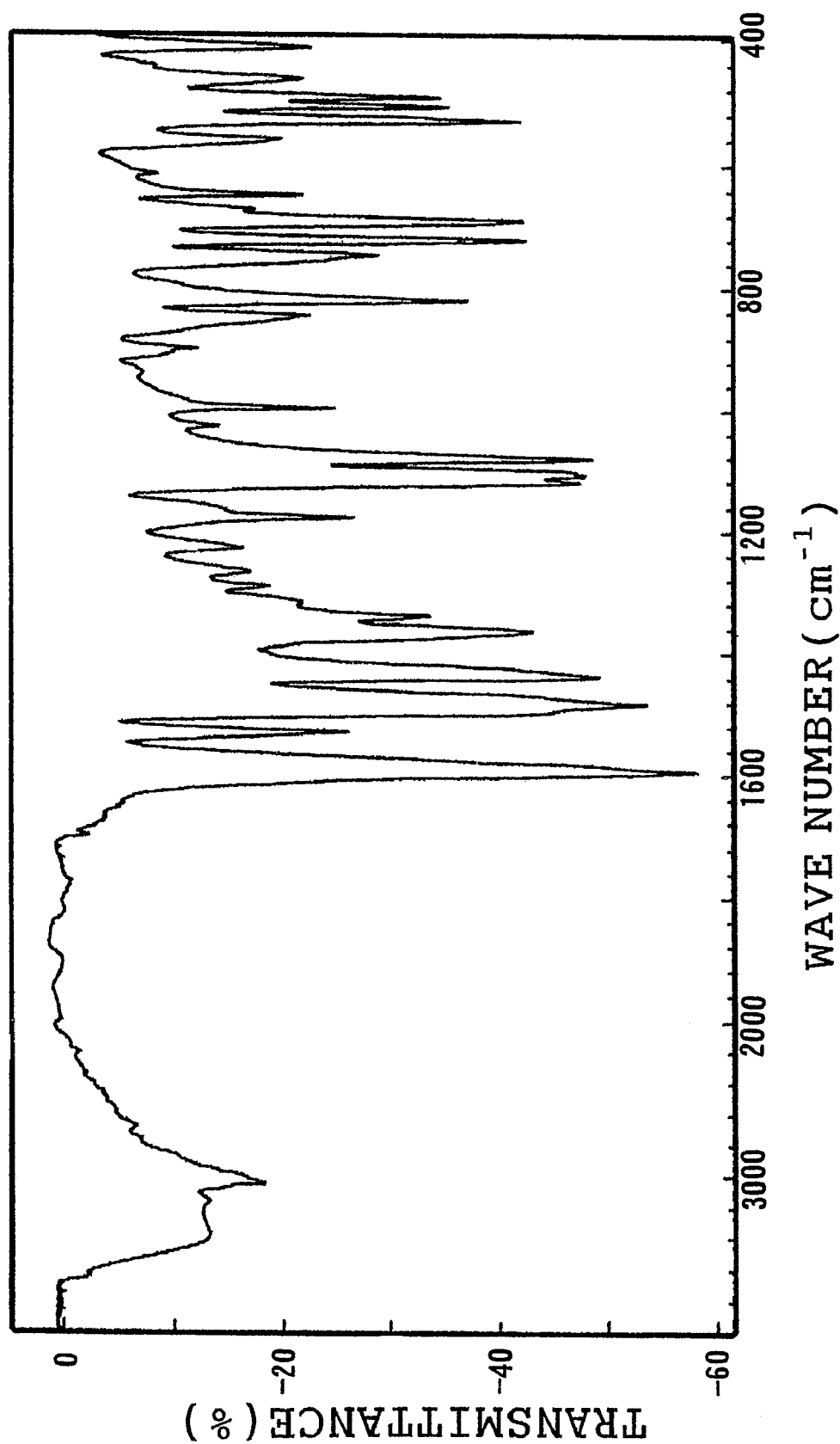
FIG. 24 is the IR spectrum of a compound 6 obtained by Example of the invention.

From these results of analysis, it was ascertained that the structure of the compound (compound 6) synthesized by the Synthesis Example 8 was represented by the following formula (XXXIV). The yield was 82%. The spectrums of $^1$H-NMR(CD$_3$OD), $^{13}$C-NMR(CD$_3$OD), $^{31}$P-NMR (CD$_3$OD) and IR (KBr) were respectively represented in FIGS. 21, 22, 23, 24.

Figure 25:
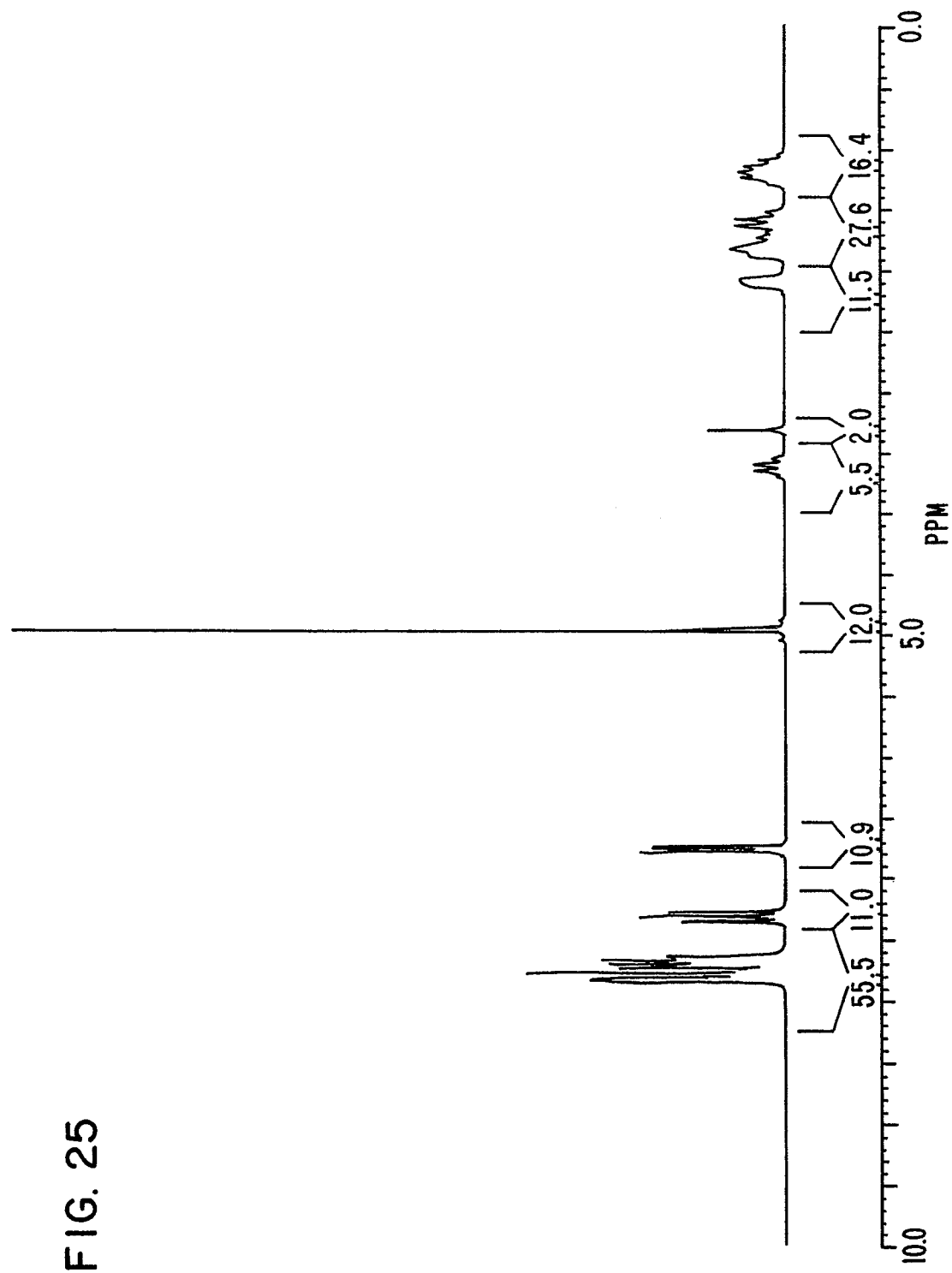
FIG. 25 is the $^{1}$H-NMR spectrum of a compound 7 obtained by Example of the invention.
Figure 26:
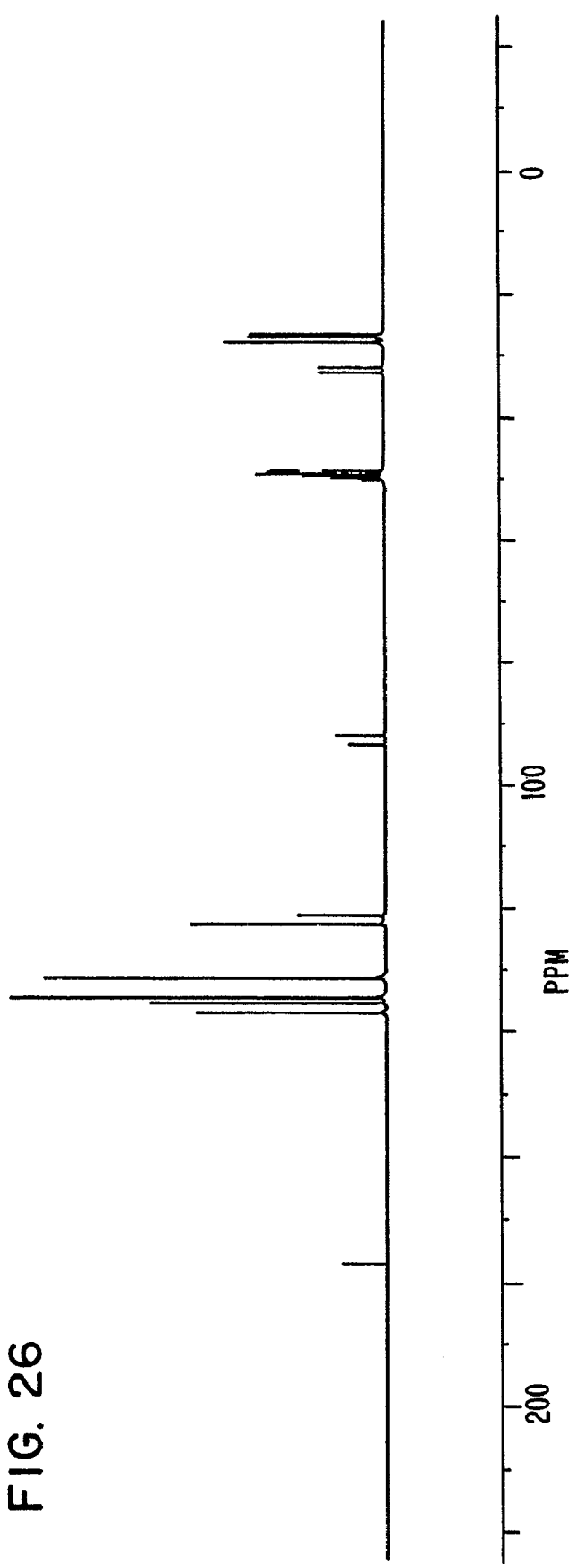
FIG. 26 is the $^{13}$C-NMR spectrum of a compound 7 obtained by Example of the invention.
Figure 27:
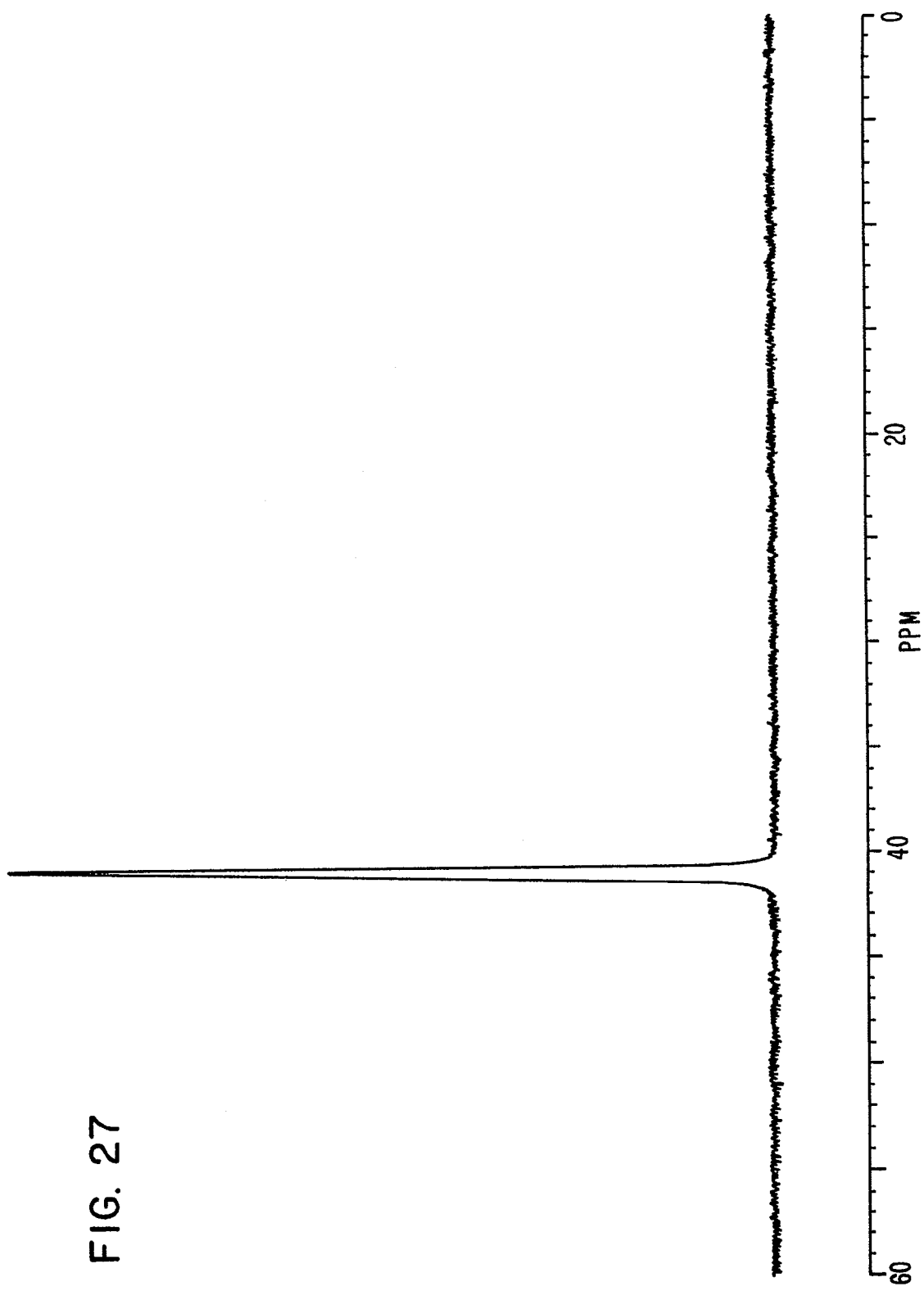
FIG. 27 is the $^{31}$P-NMR spectrum of a compound 7 obtained by Example of the invention.
Figure 28:
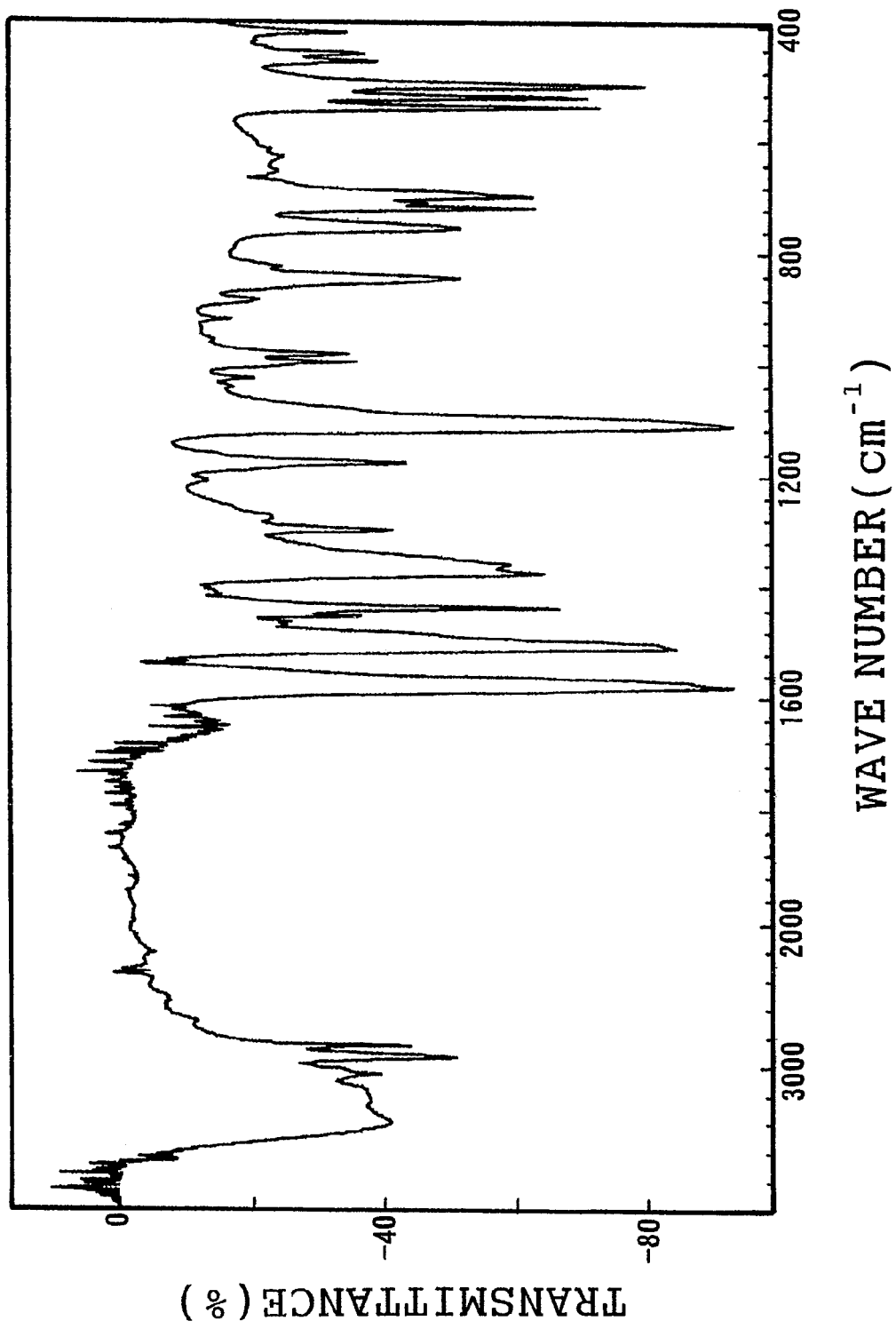
FIG. 28 is the IR spectrum of a compound 7 obtained by Example of the invention.

From these results of analysis, it was ascertained that the structure of the compound (compound 7) synthesized by the Synthesis Example 9 was represented by the following formula (XXXV). The yield was 59%. The spectrums of $^1$H-NMR(CD$_3$OD), $^{13}$C-NMR(CD$_3$OD), $^{31}$P-NMR (CD$_3$OD) and IR (KBr) were respectively represented in FIGS. 25, 26, 27, 28.

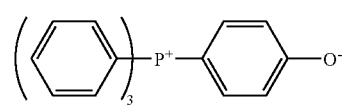

(XXIX)

-continued

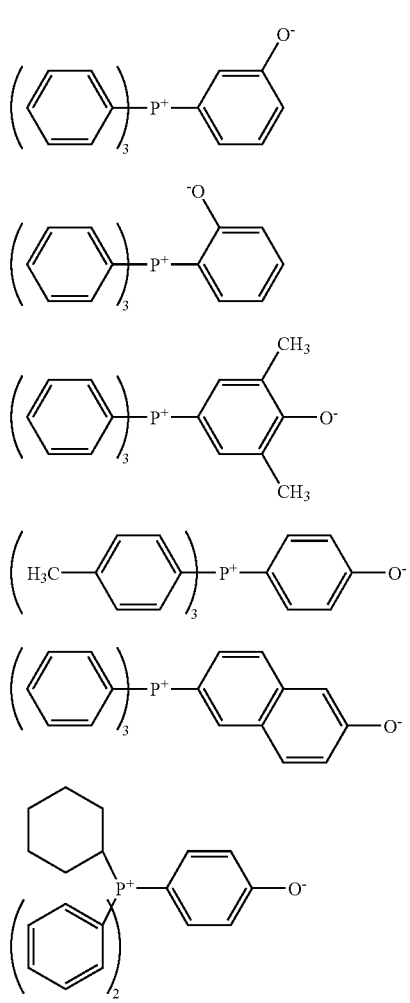

(XXX)

(XXXI)

(XXXII)

(XXXIII)

(XXXIV)

(XXXV)

The compounds other than the compound (XXX) can be represented by the resonance of the formula (IV) among the compounds (XXIX) to (XXXV), and the compound (XXX) cannot be represented by the resonance of the formula (IV).

(Preparation and Property Evaluation of Curing Resin Composition)

Examples 1 to 61 and Comparative Examples 1 to 81

As the epoxy resin, prepared were a biphenyl type epoxy resin having an epoxy equivalent weight of 196 and a melting point of 106° C. (epoxy resin 1: YX-4000H (trade name); manufactured by Japan Epoxy Resins Co., Ltd),
a sulfur atom content type epoxy resin having an epoxy equivalent weight of 245 and a melting point of 110° C. (epoxy resin 2: YSLV-120TE (trade name); manufactured by Nippon Steel Chemical Co., Ltd.),
a diphenylmethane skeleton type epoxy resin having an epoxy equivalent weight of 192 and a melting point of 79° C. (epoxy resin 3: YSLV-80XY (trade name); manufactured by Nippon Steel Chemical Co., Ltd.),
a stilbene type epoxy resin having an epoxy equivalent weight of 210 and a melting point of 120° C. (epoxy resin 4: ESLV-210 (trade name); manufactured by Sumitomo Chemical Co., Ltd.),
an o-cresol novolak type epoxy resin having an epoxy equivalent weight of 195 and a softening point of 62° C. (epoxy resin 5: ESCN-190-2 (trade name); manufactured by Sumitomo Chemical Co., Ltd.),
a dicyclopentadiene modified phenol novolac type epoxy resin having an epoxy equivalent weight of 264 and a softening point of 64° C. (epoxy resin 6: HP-7200 (trade name) manufactured by Dainippon Ink and Chemicals, Incorporated),
a salicylaldehyde type epoxy resin having an epoxy equivalent weight of 167 (epoxy resin 7: EPPN-502H (trade name) manufactured by Nippon Kayaku Co., Ltd.),
a mixture (epoxy resin 8: CER-3000 (trade name) manufactured by Nippon Kayaku Co., Ltd.) of an epoxidized material of an aralkyl type phenolic resin and a biphenyl type epoxy resin in a ratio of 80/20 by weight, having an epoxy equivalent weight of 242 and a softening point of 95° C. and
an epoxidized material of aralkyl type phenolic resin having an epoxy equivalent weight of 265 and a softening point of 66° C. (epoxy resin 9: ESN-175 (tradename) Nippon Steel Chemical Co., Ltd.).
A brominated bisphenol-A epoxy resin having an epoxy equivalent weight of 393, a softening point 80° C. and a bromine content of 48% by weight (brominated epoxy resin) was prepared as an epoxy resin having a flame-retardant effect.
As the curing agent, prepared were a phenol aralkyl resin having a hydroxyl group equivalent weight of 176 and a softening point of 70° C. (curing agent 1: MILEX XL-225 (trade name), manufactured by Mitsui Chemicals Inc.),
a biphenyl skeleton type phenolic resin having a hydroxyl group equivalent weight of 199 and a softening point 89° C. (curing agent 2: MEH-7851 (trade name) manufactured by Meiwa Plastic Industries, Ltd.),
a naphthol aralkyl resin having a hydroxyl group equivalent weight of 183 and softening point 79° C. (Curing agent 3: SN-170 (trade name), manufactured by Nippon Steel Chemical Co., Ltd.),
a dicyclopentadiene modified phenol novolac resin having a hydroxyl group equivalent weight of 170 and a softening point of 93° C. (curing agent 4: DPP (trade name), manufactured by Nippon Petrochemicals Co., Ltd.),
a phenol novolac resin having a hydroxyl group equivalent weight of 106 (curing agent 5: HP-850N (trade name), manufactured by Hitachi Chemical Co., Ltd.),
a copolymer type phenolic resin of a benzaldehyde type phenolic resin and an aralkyl type phenolic resin having a hydroxyl group equivalent weight of 156 (curing agent 6: HE-510 (trade name), manufactured by Sumikin Chemical Co., Ltd.), and a salicylaldehyde type phenolic resin having a hydroxyl group equivalent weight of 106 (curing agent 7: MEH-7500 (trade name) manufactured by Meiwa Plastic Industries, Ltd.).
A resin (curing agent 8: SN-170AR10 (trade name) manufactured by Nippon Steel Chemical Co., Ltd.) obtained by adding acenaphthylene of 10 percent by weight to a naphthol aralkyl resin having a hydroxyl group equivalent weight of 209 and a softening point 73° C. was prepared as a phenolic resin having a flame-retardant effect.
As the curing accelerators of Examples, prepared were the compound 1 (curing accelerator 1), the compound 2 (curing accelerator 2), the compound 3 (curing accelerator 3), the compound 4 (curing accelerator 4), the compound 5 (curing accelerator 5), the compound 6 (curing accelerator 6), the compound 7 (curing accelerator 7). As the curing accelerators of Comparative Examples, prepared were triphenylphosphine (curing accelerator A), an addition product (curing accelerator B) of triphenylphosphine and 1,4-benzoquinone, an addition product (curing accelerator C) of tri-n-butylphosphine and 1,4-benzoquinone, an addition product (curing accelerator D) of tricyclohexylphosphine and 1,4-benzoquinone, (cyclopentadienilidene) triphenylphosphorane (curing accelerator E) represented by the following formula (XXXVI), 2-(triphenylphosphaaniliden) succinicanhydride (curing accelerator F) represented by the following formula (XXXVII), a phenol novolac salt (curing accelerator G: SA-841 (trade name) manufactured by San-Apro Ltd.) of DBU.

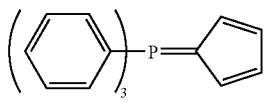
(XXXVI)

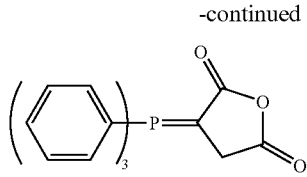
(XXXVII)

Spherical molten silica having an average grain diameter of 17.5 μm and a specific surface of 3.8 $m^2/g$ is used as the inorganic filler. As the other additive ingredients, prepared were epoxysilane (γ-glycidoxypropyltrimethoxysilane) as a coupling agent, carbon black (MA-100; trade name, manufactured by Mitsubishi Chemical Co., Ltd.) as the colorant, carnauba wax (Serarika NODA Co., Ltd.) as the release agent, and antimony trioxide as the flame retardant.

Curing resin compositions of Examples 1 to 61 and Comparative Examples 1 to 81 were obtained by mixing in the weight part represented in tables 1 to 13 using these, and roll-kneading under conditions of the kneading temperature of 80° C. and kneading time of 15 minutes.

TABLE 1

| mixing material | example | | | | | | | comparative example | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| epoxy resin 1 | 85 | 85 | 85 | 85 | 85 | 85 | 85 | 85 | 85 | 85 | 85 | 85 | 85 | 85 |
| brominated epoxy resin | 15 | 15 | 15 | 15 | 15 | 15 | 15 | 15 | 15 | 15 | 15 | 15 | 15 | 15 |
| curing agent 1 | 83 | 83 | 83 | 83 | 83 | 83 | 83 | 83 | 83 | 83 | 83 | 83 | 83 | 83 |
| curing accelerator 1 | 2.3 | | | | | | | | | | | | | |
| curing accelerator 2 | | 2.9 | | | | | | | | | | | | |
| curing accelerator 3 | | | 2.3 | | | | | | | | | | | |
| curing accelerator 4 | | | | 2.5 | | | | | | | | | | |
| curing accelerator 5 | | | | | 2.6 | | | | | | | | | |
| curing accelerator 6 | | | | | | 3.0 | | | | | | | | |
| curing accelerator 7 | | | | | | | 3.1 | | | | | | | |
| curing accelerator A | | | | | | | | 2.4 | | | | | | |
| curing accelerator B | | | | | | | | | 3.4 | | | | | |
| curing accelerator C | | | | | | | | | | 2.8 | | | | |
| curing accelerator D | | | | | | | | | | | 3.5 | | | |
| curing accelerator E | | | | | | | | | | | | 3.0 | | |
| curing accelerator F | | | | | | | | | | | | | 3.3 | |
| curing accelerator G | | | | | | | | | | | | | | 9.0 |
| carnauba wax | 1 | 1 | 1 | 1 | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 | 11 | 11 | 11 | 11 |
| molten silica | 1510 | 1515 | 1510 | 1512 | 1512 | 1515 | 1516 | 1511 | 1518 | 1514 | 1519 | 1515 | 1518 | 1559 |
| molten silica (% by weight) | 88 | 88 | 88 | 88 | 88 | 88 | 88 | 88 | 88 | 88 | 88 | 88 | 88 | 88 |

TABLE 2

| mixing material | example | | | | | | | comparative example | | | | | | |
|---|---|---|---|---|---|---|---|---|---|---|---|---|---|---|
| | 8 | 9 | 10 | 11 | 12 | 13 | 14 | 8 | 9 | 10 | 11 | 12 | 13 | 14 |
| epoxy resin 2 | 85 | 85 | 85 | 85 | 85 | 85 | 85 | 85 | 85 | 85 | 85 | 85 | 85 | 85 |
| brominated epoxy resin | 15 | 15 | 15 | 15 | 15 | 15 | 15 | 15 | 15 | 15 | 15 | 15 | 15 | 15 |
| curing agent 1 | 68 | 68 | 68 | 68 | 68 | 68 | 68 | 68 | 68 | 68 | 68 | 68 | 68 | 68 |
| curing accelerator 1 | 2.3 | | | | | | | | | | | | | |
| curing accelerator 2 | | 2.9 | | | | | | | | | | | | |
| curing accelerator 3 | | | 2.3 | | | | | | | | | | | |
| curing accelerator 4 | | | | 2.5 | | | | | | | | | | |
| curing accelerator 5 | | | | | 2.6 | | | | | | | | | |
| curing accelerator 6 | | | | | | 3.0 | | | | | | | | |
| curing accelerator 7 | | | | | | | 3.1 | | | | | | | |
| curing accelerator A | | | | | | | | 2.4 | | | | | | |
| curing accelerator B | | | | | | | | | 3.4 | | | | | |
| curing accelerator C | | | | | | | | | | 2.8 | | | | |
| curing accelerator D | | | | | | | | | | | 3.5 | | | |
| curing accelerator E | | | | | | | | | | | | 3.0 | | |
| curing accelerator F | | | | | | | | | | | | | 3.3 | |
| curing accelerator G | | | | | | | | | | | | | | 9.0 |
| carnauba wax | 1 | 1 | 1 | 1 | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 | 11 | 11 | 11 | 11 |
| molten silica | 1398 | 1403 | 1398 | 1400 | 1401 | 1403 | 1404 | 1399 | 1406 | 1402 | 1407 | 1403 | 1406 | 1447 |
| molten silica (% by weight) | 88 | 88 | 88 | 88 | 88 | 88 | 88 | 88 | 88 | 88 | 88 | 88 | 88 | 88 |

TABLE 3

| mixing material | example | | | | | | | comparative example | | | | | | |
|---|---|---|---|---|---|---|---|---|---|---|---|---|---|---|
| | 15 | 16 | 17 | 18 | 19 | 20 | 21 | 15 | 16 | 17 | 18 | 19 | 20 | 21 |
| epoxy resin 3 | 85 | 85 | 85 | 85 | 85 | 85 | 85 | 85 | 85 | 85 | 85 | 85 | 85 | 85 |
| brominated epoxy resin | 15 | 15 | 15 | 15 | 15 | 15 | 15 | 15 | 15 | 15 | 15 | 15 | 15 | 15 |
| curing agent 2 | 96 | 96 | 96 | 96 | 96 | 96 | 96 | 96 | 96 | 96 | 96 | 96 | 96 | 96 |
| curing accelerator 1 | 3.0 | | | | | | | | | | | | | |
| curing accelerator 2 | | 3.8 | | | | | | | | | | | | |
| curing accelerator 3 | | | 3.0 | | | | | | | | | | | |
| curing accelerator 4 | | | | 3.3 | | | | | | | | | | |
| curing accelerator 5 | | | | | 3.4 | | | | | | | | | |
| curing accelerator 6 | | | | | | 3.9 | | | | | | | | |
| curing accelerator 7 | | | | | | | 4.0 | | | | | | | |
| curing accelerator A | | | | | | | | 3.1 | | | | | | |
| curing accelerator B | | | | | | | | | 4.4 | | | | | |
| curing accelerator C | | | | | | | | | | 3.6 | | | | |
| curing accelerator D | | | | | | | | | | | 4.6 | | | |
| curing accelerator E | | | | | | | | | | | | 3.9 | | |

TABLE 3-continued

|  | example | | | | | | | comparative example | | | | | | |
|---|---|---|---|---|---|---|---|---|---|---|---|---|---|---|
| mixing material | 15 | 16 | 17 | 18 | 19 | 20 | 21 | 15 | 16 | 17 | 18 | 19 | 20 | 21 |
| curing accelerator F |  |  |  |  |  |  |  |  |  |  |  |  | 4.3 |  |
| curing accelerator G |  |  |  |  |  |  |  |  |  |  |  |  |  | 11.7 |
| carnauba wax | 1 | 1 | 1 | 1 | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 | 11 | 11 | 11 | 11 |
| molten silica | 1608 | 1614 | 1608 | 1610 | 1611 | 1615 | 1616 | 1609 | 1619 | 1613 | 1620 | 1615 | 1618 | 1672 |
| molten silica (% by weight) | 88 | 88 | 88 | 88 | 88 | 88 | 88 | 88 | 88 | 88 | 88 | 88 | 88 | 88 |

TABLE 4

|  | example | | comparative example | | | example | | comparative example | | |
|---|---|---|---|---|---|---|---|---|---|---|
| mixing material | 22 | 23 | 22 | 23 | 24 | 24 | 25 | 25 | 26 | 27 |
| epoxy resin 1 |  |  |  |  |  | 85 | 85 | 85 | 85 | 85 |
| epoxy resin 4 | 85 | 85 | 85 | 85 | 85 |  |  |  |  |  |
| brominated epoxy resin | 15 | 15 | 15 | 15 | 15 | 15 | 15 | 15 | 15 | 15 |
| curing agent 1 | 78 | 78 | 78 | 78 | 78 |  |  |  |  |  |
| curing agent 2 |  |  |  |  |  | 94 | 94 | 94 | 94 | 94 |
| curing accelerator 1 | 2.1 |  |  |  |  | 2.8 |  |  |  |  |
| curing accelerator 3 |  | 2.1 |  |  |  |  | 2.8 |  |  |  |
| curing accelerator A |  |  | 2.2 |  |  |  |  | 2.9 |  |  |
| curing accelerator B |  |  |  | 3.1 |  |  |  |  | 4.1 |  |
| curing accelerator C |  |  |  |  | 2.5 |  |  |  |  | 3.4 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1471 | 1471 | 1472 | 1479 | 1475 | 1593 | 1593 | 1594 | 1603 | 1598 |
| molten silica (% by weight) | 88 | 88 | 88 | 88 | 88 | 88 | 88 | 88 | 88 | 88 |

TABLE 5

|  | example | | comparative example | | | example | | comparative example | | |
|---|---|---|---|---|---|---|---|---|---|---|
| mixing material | 26 | 27 | 28 | 29 | 30 | 28 | 29 | 29 | 30 | 31 |
| epoxy resin 1 | 85 | 85 | 85 | 85 | 85 | 85 | 85 | 85 | 85 | 85 |
| brominated epoxy resin | 15 | 15 | 15 | 15 | 15 | 15 | 15 | 15 | 15 | 15 |
| curing agent 3 | 86 | 86 | 86 | 86 | 86 |  |  |  |  |  |
| curing agent 5 |  |  |  |  |  | 50 | 50 | 50 | 50 | 50 |
| curing accelerator 1 | 2.5 |  |  |  |  | 2.1 |  |  |  |  |
| curing accelerator 3 |  | 2.5 |  |  |  |  | 2.1 |  |  |  |
| curing accelerator A |  |  | 2.6 |  |  |  |  | 2.2 |  |  |
| curing accelerator B |  |  |  | 3.7 |  |  |  |  | 3.1 |  |
| curing accelerator C |  |  |  |  | 3.1 |  |  |  |  | 2.5 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1536 | 1536 | 1537 | 1545 | 1540 | 1266 | 1266 | 1267 | 1274 | 1270 |
| molten silica (% by weight) | 88 | 88 | 88 | 88 | 88 | 88 | 88 | 88 | 88 | 88 |

TABLE 6

|  | example | | comparative example | | | example | | comparative example | | |
|---|---|---|---|---|---|---|---|---|---|---|
| mixing material | 30 | 31 | 34 | 35 | 36 | 32 | 33 | 37 | 38 | 39 |
| epoxy resin 1 | 42.5 | 42.5 | 42.5 | 42.5 | 42.5 |  |  |  |  |  |
| epoxy resin 2 |  |  |  |  |  | 42.5 | 42.5 | 42.5 | 42.5 | 42.5 |
| epoxy resin 5 | 42.5 | 42.5 | 42.5 | 42.5 | 42.5 | 42.5 | 42.5 | 42.5 | 42.5 | 42.5 |
| brominated epoxy resin | 15 | 15 | 15 | 15 | 15 | 15 | 15 | 15 | 15 | 15 |
| curing agent 1 | 83 | 83 | 83 | 83 | 83 | 76 | 76 | 76 | 76 | 76 |
| curing accelerator 1 | 2.0 |  |  |  |  | 2.0 |  |  |  |  |
| curing accelerator 3 |  | 2.0 |  |  |  |  | 2.0 |  |  |  |
| curing accelerator A |  |  | 2.0 |  |  |  |  | 2.0 |  |  |

TABLE 6-continued

|  | example | | comparative example | | | example | | comparative example | | |
|---|---|---|---|---|---|---|---|---|---|---|
| mixing material | 30 | 31 | 34 | 35 | 36 | 32 | 33 | 37 | 38 | 39 |
| curing accelerator B |  |  |  | 2.9 |  |  |  |  | 2.9 |  |
| curing accelerator C |  |  |  |  | 2.4 |  |  |  |  | 2.4 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1264 | 1264 | 1265 | 1270 | 1267 | 1217 | 1217 | 1218 | 1223 | 1220 |
| molten silica (% by weight) | 86 | 86 | 86 | 86 | 86 | 86 | 86 | 86 | 86 | 86 |

TABLE 7

|  | example | | comparative example | | | example | | comparative example | | |
|---|---|---|---|---|---|---|---|---|---|---|
| mixing material | 34 | 35 | 40 | 41 | 42 | 36 | 37 | 43 | 44 | 45 |
| epoxy resin 4 | 42.5 | 42.5 | 42.5 | 42.5 | 42.5 |  |  |  |  |  |
| epoxy resin 5 | 42.5 | 42.5 | 42.5 | 42.5 | 42.5 | 85 | 85 | 85 | 85 | 85 |
| brominated epoxy resin | 15 | 15 | 15 | 15 | 15 | 15 | 15 | 15 | 15 | 15 |
| curing agent 1 | 81 | 81 | 81 | 81 | 81 | 83 | 83 | 83 | 83 | 83 |
| curing accelerator 1 | 1.8 |  |  |  |  | 1.6 |  |  |  |  |
| curing accelerator 3 |  | 1.8 |  |  |  |  | 1.6 |  |  |  |
| curing accelerator A |  |  | 1.9 |  |  |  |  | 1.7 |  |  |
| curing accelerator B |  |  |  | 2.7 |  |  |  |  | 2.4 |  |
| curing accelerator C |  |  |  |  | 2.2 |  |  |  |  | 2.0 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1248 | 1248 | 1248 | 1253 | 1250 | 1080 | 1080 | 1080 | 1084 | 1081 |
| molten silica (% by weight) | 86 | 86 | 86 | 86 | 86 | 84 | 84 | 84 | 84 | 84 |

TABLE 8

|  | example | | comparative example | | | example | | comparative example | | |
|---|---|---|---|---|---|---|---|---|---|---|
| mixing material | 38 | 39 | 46 | 47 | 48 | 40 | 41 | 49 | 50 | 51 |
| epoxy resin 5 | 85 | 85 | 85 | 85 | 85 | 85 | 85 | 85 | 85 | 85 |
| brominated epoxy resin | 15 | 15 | 15 | 15 | 15 | 15 | 15 | 15 | 15 | 15 |
| curing agent 4 | 81 | 81 | 81 | 81 | 81 |  |  |  |  |  |
| curing agent 5 |  |  |  |  |  | 50 | 50 | 50 | 50 | 50 |
| curing accelerator 1 | 1.8 |  |  |  |  | 1.4 |  |  |  |  |
| curing accelerator 3 |  | 1.8 |  |  |  |  | 1.4 |  |  |  |
| curing accelerator A |  |  | 1.9 |  |  |  |  | 1.4 |  |  |
| curing accelerator B |  |  |  | 2.7 |  |  |  |  | 2.0 |  |
| curing accelerator C |  |  |  |  | 2.2 |  |  |  |  | 1.7 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1066 | 1066 | 1066 | 1071 | 1068 | 904 | 904 | 905 | 908 | 906 |
| molten silica(% by weight) | 84 | 84 | 84 | 84 | 84 | 84 | 84 | 84 | 84 | 84 |

TABLE 9

|  | example | | comparative example | | | example | | comparative example | | |
|---|---|---|---|---|---|---|---|---|---|---|
| mixing material | 42 | 43 | 52 | 53 | 54 | 44 | 45 | 55 | 56 | 57 |
| epoxy resin 5 | 85 | 85 | 85 | 85 | 85 |  |  |  |  |  |
| epoxy resin 6 |  |  |  |  |  | 85 | 85 | 85 | 85 | 85 |
| brominated epoxy resin | 15 | 15 | 15 | 15 | 15 | 15 | 15 | 15 | 15 | 15 |
| curing agent 4 | 40 | 40 | 40 | 40 | 40 |  |  |  |  |  |
| curing agent 5 | 25 | 25 | 25 | 25 | 25 | 38 | 38 | 38 | 38 | 38 |
| curing accelerator 1 | 1.6 |  |  |  |  | 2.1 |  |  |  |  |
| curing accelerator 3 |  | 1.6 |  |  |  |  | 2.1 |  |  |  |
| curing accelerator A |  |  | 1.7 |  |  |  |  | 2.2 |  |  |
| curing accelerator B |  |  |  | 2.4 |  |  |  |  | 3.1 |  |

TABLE 9-continued

|  | example | | comparative example | | | example | | comparative example | | |
| --- | --- | --- | --- | --- | --- | --- | --- | --- | --- | --- |
| mixing material | 42 | 43 | 52 | 53 | 54 | 44 | 45 | 55 | 56 | 57 |
| curing accelerator C |  |  |  | 2.0 |  |  |  |  |  | 2.5 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 985 | 985 | 985 | 989 | 987 | 844 | 844 | 845 | 850 | 847 |
| molten silica (% by weight) | 84 | 84 | 84 | 84 | 84 | 84 | 84 | 84 | 84 | 84 |

TABLE 10

|  | example | | comparative example | | | example | | comparative example | | |
| --- | --- | --- | --- | --- | --- | --- | --- | --- | --- | --- |
| mixing material | 46 | 47 | 58 | 59 | 60 | 48 | 49 | 61 | 62 | 63 |
| epoxy resin 1 | 85 | 85 | 85 | 85 | 85 |  |  |  |  |  |
| epoxy resin 3 |  |  |  |  |  | 85 | 85 | 85 | 85 | 85 |
| brominated epoxy resin | 15 | 15 | 15 | 15 | 15 | 15 | 15 | 15 | 15 | 15 |
| curing agent 6 | 74 | 74 | 74 | 74 | 74 | 75 | 75 | 75 | 75 | 75 |
| curing accelerator 1 | 2.8 |  |  |  |  | 3.0 |  |  |  |  |
| curing accelerator 3 |  | 2.8 |  |  |  |  | 3.0 |  |  |  |
| curing accelerator A |  |  | 2.9 |  |  |  |  | 3.1 |  |  |
| curing accelerator B |  |  |  | 4.1 |  |  |  |  | 4.4 |  |
| curing accelerator C |  |  |  |  | 3.4 |  |  |  |  | 3.6 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1444 | 1444 | 1445 | 1454 | 1449 | 1456 | 1456 | 1457 | 1467 | 1461 |
| molten silica (% by weight) | 88 | 88 | 88 | 88 | 88 | 88 | 88 | 88 | 88 | 88 |

TABLE 11

|  | example | | comparative example | | | example | | comparative example | | |
| --- | --- | --- | --- | --- | --- | --- | --- | --- | --- | --- |
| mixing material | 50 | 51 | 64 | 65 | 66 | 52 | 53 | 67 | 68 | 69 |
| epoxy resin 1 | 85 | 85 | 85 | 85 | 85 |  |  |  |  |  |
| epoxy resin 7 |  |  |  |  |  | 85 | 85 | 85 | 85 | 85 |
| brominated epoxy resin | 15 | 15 | 15 | 15 | 15 | 15 | 15 | 15 | 15 | 15 |
| curing agent 7 | 50 | 50 | 50 | 50 | 50 | 58 | 58 | 58 | 58 | 58 |
| curing accelerator 1 | 2.1 |  |  |  |  | 1.2 |  |  |  |  |
| curing accelerator 3 |  | 2.1 |  |  |  |  | 1.2 |  |  |  |
| curing accelerator A |  |  | 2.2 |  |  |  |  | 1.2 |  |  |
| curing accelerator B |  |  |  | 3.1 |  |  |  |  | 1.7 |  |
| curing accelerator C |  |  |  |  | 2.5 |  |  |  |  | 1.4 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1266 | 1266 | 1267 | 1274 | 1270 | 944 | 944 | 944 | 947 | 945 |
| molten silica (% by weight) | 88 | 88 | 88 | 88 | 88 | 84 | 84 | 84 | 84 | 84 |

TABLE 12

|  | example | | comparative example | | | example | | comparative example | | |
| --- | --- | --- | --- | --- | --- | --- | --- | --- | --- | --- |
| mixing material | 54 | 55 | 70 | 71 | 72 | 56 | 57 | 73 | 74 | 75 |
| epoxy resin 8 | 85 | 85 | 85 | 85 | 85 |  |  |  |  |  |
| epoxy resin 9 |  |  |  |  |  | 85 | 85 | 85 | 85 | 85 |
| brominated epoxy resin | 15 | 15 | 15 | 15 | 15 | 15 | 15 | 15 | 15 | 15 |
| curing agent 1 | 69 | 69 | 69 | 69 | 69 | 63 | 63 | 63 | 63 | 63 |
| curing accelerator 1 | 1.8 |  |  |  |  | 1.8 |  |  |  |  |
| curing accelerator 3 |  | 1.8 |  |  |  |  | 1.8 |  |  |  |
| curing accelerator A |  |  | 1.9 |  |  |  |  | 1.9 |  |  |
| curing accelerator B |  |  |  | 2.7 |  |  |  |  | 2.7 |  |

TABLE 12-continued

|  | example | | comparative example | | | example | | comparative example | | |
| --- | --- | --- | --- | --- | --- | --- | --- | --- | --- | --- |
| mixing material | 54 | 55 | 70 | 71 | 72 | 56 | 57 | 73 | 74 | 75 |
| curing accelerator C |  |  |  |  | 2.2 |  |  |  |  | 2.2 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1400 | 1400 | 1401 | 1407 | 1403 | 1361 | 1361 | 1362 | 1368 | 1364 |
| molten silica (% by weight) | 88 | 88 | 88 | 88 | 88 | 88 | 88 | 88 | 88 | 88 |

TABLE 13

|  | example | | comparative example | | | example | | comparative example | | |
| --- | --- | --- | --- | --- | --- | --- | --- | --- | --- | --- |
| mixing material | 58 | 59 | 76 | 77 | 78 | 60 | 61 | 79 | 80 | 81 |
| epoxy resin 8 | 100 | 100 | 100 | 100 | 100 |  |  |  |  |  |
| epoxy resin 9 |  |  |  |  |  | 100 | 100 | 100 | 100 | 100 |
| curing agent 8 | 86 | 86 | 86 | 86 | 86 | 79 | 79 | 79 | 79 | 79 |
| curing accelerator 1 | 2.1 |  |  |  |  | 2.1 |  |  |  |  |
| curing accelerator 3 |  | 2.1 |  |  |  |  | 2.1 |  |  |  |
| curing accelerator A |  |  | 2.2 |  |  |  |  | 2.2 |  |  |
| curing accelerator B |  |  |  | 3.1 |  |  |  |  | 3.1 |  |
| curing accelerator C |  |  |  |  | 2.5 |  |  |  |  | 2.5 |
| carnauba wax | 1 | 1 | 1 | 1 | 1 | 1 | 1 | 1 | 1 | 1 |
| antimony trioxide | 6 | 6 | 6 | 6 | 6 | 6 | 6 | 6 | 6 | 6 |
| carbon black | 2.6 | 2.6 | 2.6 | 2.6 | 2.6 | 2.6 | 2.6 | 2.6 | 2.6 | 2.6 |
| epoxy silane | 11 | 11 | 11 | 11 | 11 | 11 | 11 | 11 | 11 | 11 |
| molten silica | 1533 | 1533 | 1534 | 1540 | 1536 | 1478 | 1478 | 1479 | 1485 | 1481 |
| molten silica (% by weight) | 88 | 88 | 88 | 88 | 88 | 88 | 88 | 88 | 88 | 88 |

The curing resin compositions of Example and Comparative Examples were evaluated by the following tests. Tables 14 to 26 represent the results of evaluation.

The curing resin compositions were molded under conditions of the temperature of a metal mold of 180° C., the molding pressure of 6.9 MPa and the curing time of 90 seconds by a transfer molding machine. The post-curing was performed for 6 hours at 175° C.

(1) Spiral Flow (Index of a Flow)

Flow distance (cm) was measured by molding the curing resin composition using a metal mold for spiral flow measurement according to EMMI-1-66 under the conditions.

(2) Hot Hardness

The curing resin compositions were molded in a disc having a diameter of 50 mm and a thickness of 3 mm under the conditions. After molded, the hot hardness of the discs was immediately measured by using a shore D hardness meter.

(3) Hot Hardness Under Moisture Absorption

After the curing resin compositions were left for 72 hours under the conditions of 25° C./50% RH, the hot hardness was measured by using the shore D hardness meter on the condition as the above (2).

(4) Reflow Cracking Resistance: 1

The package of a QFP of 80 pins having an external size of 14×20×2.0 mm in which a silicon chip for test of the size 8×10×0.4 mm on a 42 alloy frame was mounted by using the silver paste was molded and post-cured by using the curing resin composition under the conditions. After the package was moisturized under the conditions of 85% RH and 30° C. for 168 hours, a reflow process was performed under the conditions of 215° C. for 90 seconds by a vapor phase reflow device, and the presence of generation of crack was confirmed. Reflow cracking resistance was evaluated by the number of cracked package based on the number (5) of test package.

(5) Reflow Cracking Resistance: 2

Reflow cracking resistance was evaluated under the same conditions as the above (4) except that the packages were moisturized under the conditions of 60% RH and 85° C. for 168 hours.

(6) Reflow Cracking Resistance: 3

Reflow cracking resistance was evaluated under the same conditions as the above (4) except that the packages were moisturized under the conditions of 85% RH and 85° C. for 168 hours.

(7) High-Temperature Storage Characteristics

A test device was used in which an aluminum wiring having a line/space of 10 μm was formed on a silicon substrate having an oxidation film of a thickness 5 μm and having an external shape size of 5×9 mm and. The test device was mounted with a silver paste on a 16 pins type DIP (Dual Inline Package) 42 alloy lead frame to which partial silver plating is applied. Packages in which bonding pads of the device and inner leads were connected in Au lines by a thermonic wire at 200° C. were molded under the conditions by using the curing resin composition, and post-cured. After storing the packages under the conditions of 200° C. for 500 hours and 1000 hours, the packages were taken out, and a continuity test was performed. The number of defective packages was examined, and high-temperature storage characteristics was evaluated by the number of defective packages based on the number (10) of the test packages.

TABLE 14

| evaluation item | example | | | | | | | comparative example | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| spiral flow | 110 | 108 | 111 | 109 | 111 | 109 | 108 | 74 | 100 | 108 | 105 | Molding was impossible | 107 | 69 |
| hot hardness | 83 | 82 | 83 | 83 | 84 | 83 | 84 | 80 | 79 | 83 | 83 | | 75 | 81 |
| hot hardness under moisture absorption | 82 | 81 | 82 | 82 | 83 | 82 | 83 | 66 | 63 | 82 | 82 | | 64 | 10 |
| reflow cracking resistance 1 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 2 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 3 | 0/5 | 0/5 | 0/5 | 0/5 | 0/5 | 0/5 | 0/5 | 0/5 | 0/5 | 0/5 | 0/5 | | 0/5 | 0/5 |
| high-temp. storage characteristics | | | | | | | | | | | | | | |
| 500 h | 0/10 | 0/10 | 0/10 | 0/10 | 0/10 | 0/10 | 0/10 | 0/10 | 0/10 | 0/10 | 0/10 | | 0/10 | 0/10 |
| 1000 h | 0/10 | 0/10 | 0/10 | 0/10 | 0/10 | 0/10 | 0/10 | 0/10 | 0/10 | 10/10 | 10/10 | | 0/10 | 10/10 |

TABLE 15

| evaluation item | example | | | | | | | comparative example | | | | | | |
|---|---|---|---|---|---|---|---|---|---|---|---|---|---|---|
| | 8 | 9 | 10 | 11 | 12 | 13 | 14 | 8 | 9 | 10 | 11 | 12 | 13 | 14 |
| spiral flow | 121 | 120 | 122 | 119 | 121 | 120 | 118 | 73 | 95 | 116 | 118 | Molding was impossible | 105 | 66 |
| hot hardness | 80 | 79 | 80 | 80 | 81 | 80 | 81 | 77 | 76 | 80 | 80 | | 70 | 78 |
| hot hardness under moisture absorption | 79 | 78 | 79 | 79 | 80 | 79 | 80 | 63 | 55 | 79 | 79 | | 45 | 0 |
| reflow cracking resistance 1 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 2 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 3 | 0/5 | 0/5 | 0/5 | 0/5 | 0/5 | 0/5 | 0/5 | 0/5 | 0/5 | 0/5 | 0/5 | | 0/5 | 0/5 |
| high-temp. storage characteristics | | | | | | | | | | | | | | |
| 500 h | 0/10 | 0/10 | 0/10 | 0/10 | 0/10 | 0/10 | 0/10 | 0/10 | 0/10 | 0/10 | 0/10 | | 0/10 | 0/10 |
| 1000 h | 0/10 | 0/10 | 0/10 | 0/10 | 0/10 | 0/10 | 0/10 | 0/10 | 0/10 | 10/10 | 10/10 | | 0/10 | 10/10 |

TABLE 16

| evaluation item | example | | | | | | | comparative example | | | | | | |
|---|---|---|---|---|---|---|---|---|---|---|---|---|---|---|
| | 15 | 16 | 17 | 18 | 19 | 20 | 21 | 15 | 16 | 17 | 18 | 19 | 20 | 21 |
| spiral flow | 110 | 111 | 112 | 110 | 113 | 110 | 108 | 70 | 97 | 109 | 107 | Molding was impossible | 104 | 68 |
| hot hardness | 78 | 77 | 78 | 78 | 79 | 78 | 79 | 74 | 73 | 78 | 78 | | 65 | 76 |
| hot hardness under moisture absorption | 76 | 75 | 76 | 76 | 77 | 76 | 77 | 55 | 48 | 76 | 76 | | 40 | 0 |
| reflow cracking resistance 1 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 2 | 0/5 | 0/5 | 0/5 | 0/5 | 0/5 | 0/5 | 0/5 | 0/5 | 0/5 | 0/5 | 0/5 | | 0/5 | 0/5 |
| reflow cracking resistance 3 | 0/5 | 0/5 | 0/5 | 0/5 | 0/5 | 0/5 | 0/5 | 0/5 | 0/5 | 0/5 | 0/5 | | 0/5 | 0/5 |
| high-temp. storage characteristics | | | | | | | | | | | | | | |
| 500 h | 0/10 | 0/10 | 0/10 | 0/10 | 0/10 | 0/10 | 0/10 | 0/10 | 0/10 | 0/10 | 0/10 | | 0/10 | 0/10 |
| 1000 h | 0/10 | 0/10 | 0/10 | 0/10 | 0/10 | 0/10 | 0/10 | 0/10 | 0/10 | 10/10 | 10/10 | | 0/10 | 10/10 |

TABLE 17

| evaluation item | example | | comparative example | | | example | | comparative example | | |
|---|---|---|---|---|---|---|---|---|---|---|
| | 22 | 23 | 22 | 23 | 24 | 24 | 25 | 25 | 26 | 27 |
| spiral flow | 105 | 104 | 71 | 98 | 101 | 106 | 104 | 72 | 97 | 101 |
| hot hardness | 82 | 82 | 80 | 79 | 82 | 79 | 79 | 76 | 75 | 79 |
| hot hardness under moisture absorption | 81 | 81 | 66 | 63 | 81 | 78 | 77 | 62 | 58 | 78 |

TABLE 17-continued

| | example | | comparative example | | | example | | comparative example | | |
|---|---|---|---|---|---|---|---|---|---|---|
| evaluation item | 22 | 23 | 22 | 23 | 24 | 24 | 25 | 25 | 26 | 27 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 0/5 | 0/5 | 0/5 | 0/5 | 0/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 18

| | example | | comparative example | | | example | | comparative example | | |
|---|---|---|---|---|---|---|---|---|---|---|
| evaluation item | 26 | 27 | 28 | 29 | 30 | 28 | 29 | 31 | 32 | 33 |
| spiral flow | 103 | 104 | 72 | 97 | 100 | 101 | 102 | 69 | 98 | 99 |
| hot hardness | 80 | 80 | 78 | 77 | 80 | 84 | 84 | 82 | 81 | 84 |
| hot hardness under moisture absorption | 79 | 78 | 62 | 59 | 79 | 83 | 83 | 69 | 66 | 83 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 0/5 | 0/5 | 0/5 | 0/5 | 0/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 19

| | example | | comparative example | | | example | | comparative example | | |
|---|---|---|---|---|---|---|---|---|---|---|
| evaluation item | 30 | 31 | 34 | 35 | 36 | 32 | 33 | 37 | 38 | 39 |
| spiral flow | 104 | 104 | 74 | 99 | 101 | 103 | 104 | 73 | 98 | 101 |
| hot hardness | 82 | 82 | 80 | 79 | 82 | 81 | 81 | 78 | 77 | 81 |
| hot hardness under moisture absorption | 81 | 81 | 66 | 63 | 81 | 80 | 80 | 63 | 59 | 80 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 0/5 | 0/5 | 0/5 | 0/5 | 0/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 20

| | example | | comparative example | | | example | | comparative example | | |
|---|---|---|---|---|---|---|---|---|---|---|
| evaluation item | 34 | 35 | 40 | 41 | 42 | 36 | 37 | 43 | 44 | 45 |
| spiral flow | 102 | 103 | 63 | 94 | 99 | 100 | 101 | 64 | 95 | 87 |
| hot hardness | 82 | 82 | 81 | 80 | 82 | 82 | 82 | 80 | 79 | 82 |
| hot hardness under moisture absorption | 81 | 80 | 67 | 65 | 81 | 81 | 81 | 65 | 63 | 81 |
| reflow cracking resistance 1 | 0/5 | 0/5 | 0/5 | 0/5 | 0/5 | 0/5 | 0/5 | 0/5 | 0/5 | 0/5 |

TABLE 20-continued

| | example | | comparative example | | | example | | comparative example | | |
|---|---|---|---|---|---|---|---|---|---|---|
| evaluation item | 34 | 35 | 40 | 41 | 42 | 36 | 37 | 43 | 44 | 45 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 5/5 | 5/5 | 5/5 | 5/5 | 5/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 21

| | example | | comparative example | | | example | | comparative example | | |
|---|---|---|---|---|---|---|---|---|---|---|
| evaluation item | 38 | 39 | 46 | 47 | 48 | 40 | 41 | 49 | 50 | 51 |
| spiral flow | 102 | 101 | 65 | 94 | 98 | 98 | 97 | 61 | 91 | 84 |
| hot hardness | 80 | 80 | 79 | 78 | 80 | 86 | 86 | 85 | 84 | 86 |
| hot hardness under moisture absorption | 79 | 78 | 60 | 56 | 79 | 86 | 86 | 76 | 72 | 86 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 5/5 | 5/5 | 5/5 | 5/5 | 5/5 |
| reflow cracking resistance 3 | 5/5 | 5/5 | 5/5 | 5/5 | 5/5 | 5/5 | 5/5 | 5/5 | 5/5 | 5/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 22

| | example | | comparative example | | | example | | comparative example | | |
|---|---|---|---|---|---|---|---|---|---|---|
| evaluation item | 42 | 43 | 52 | 53 | 54 | 44 | 45 | 55 | 56 | 57 |
| spiral flow | 100 | 101 | 63 | 94 | 96 | 99 | 98 | 60 | 91 | 94 |
| hot hardness | 84 | 84 | 82 | 81 | 84 | 80 | 80 | 78 | 77 | 80 |
| hot hardness under moisture absorption | 83 | 83 | 69 | 66 | 83 | 79 | 79 | 59 | 54 | 79 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 5/5 | 5/5 | 5/5 | 5/5 | 5/5 | 5/5 | 5/5 | 5/5 | 5/5 | 5/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 23

| | example | | comparative example | | | example | | comparative example | | |
|---|---|---|---|---|---|---|---|---|---|---|
| evaluation item | 46 | 47 | 58 | 59 | 60 | 48 | 49 | 61 | 62 | 63 |
| spiral flow | 105 | 103 | 72 | 98 | 101 | 112 | 113 | 75 | 103 | 109 |
| hot hardness | 84 | 84 | 81 | 80 | 84 | 82 | 82 | 80 | 79 | 82 |
| hot hardness under moisture absorption | 83 | 83 | 68 | 65 | 83 | 81 | 81 | 66 | 62 | 81 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |

TABLE 23-continued

|  | example | | comparative example | | | example | | comparative example | | |
|---|---|---|---|---|---|---|---|---|---|---|
| evaluation item | 46 | 47 | 58 | 59 | 60 | 48 | 49 | 61 | 62 | 63 |
| reflow cracking resistance 3 | 0/5 | 0/5 | 0/5 | 0/5 | 0/5 | 0/5 | 0/5 | 0/5 | 0/5 | 0/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 24

|  | example | | comparative example | | | example | | comparative example | | |
|---|---|---|---|---|---|---|---|---|---|---|
| evaluation item | 50 | 51 | 64 | 65 | 66 | 52 | 53 | 67 | 68 | 69 |
| spiral flow | 106 | 104 | 75 | 99 | 102 | 99 | 100 | 65 | 92 | 95 |
| hot hardness | 84 | 84 | 82 | 81 | 84 | 87 | 87 | 86 | 85 | 87 |
| hot hardness under moisture absorption | 83 | 83 | 70 | 66 | 83 | 87 | 87 | 79 | 76 | 87 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 5/5 | 5/5 | 5/5 | 5/5 | 5/5 | 5/5 | 5/5 | 5/5 | 5/5 | 5/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 25

|  | example | | comparative example | | | example | | comparative example | | |
|---|---|---|---|---|---|---|---|---|---|---|
| evaluation item | 54 | 55 | 70 | 71 | 72 | 56 | 57 | 73 | 74 | 75 |
| spiral flow | 110 | 108 | 80 | 103 | 106 | 108 | 107 | 78 | 102 | 105 |
| hot hardness | 83 | 82 | 80 | 79 | 83 | 82 | 81 | 78 | 77 | 82 |
| hot hardness under moisture absorption | 82 | 81 | 71 | 69 | 82 | 81 | 80 | 65 | 63 | 81 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 0/5 | 0/5 | 0/5 | 0/5 | 0/5 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

TABLE 26

|  | example | | comparative example | | | example | | comparative example | | |
|---|---|---|---|---|---|---|---|---|---|---|
| evaluation item | 58 | 59 | 76 | 77 | 78 | 60 | 61 | 79 | 80 | 81 |
| spiral flow | 106 | 104 | 75 | 99 | 102 | 99 | 100 | 65 | 92 | 95 |
| hot hardness | 82 | 81 | 78 | 77 | 82 | 81 | 81 | 75 | 73 | 81 |
| hot hardness under moisture absorption | 81 | 80 | 68 | 66 | 81 | 80 | 80 | 63 | 59 | 80 |
| reflow cracking resistance 1 | 0/5 | 0/5 | 0/5 | 0/5 | 0/5 | 0/5 | 0/5 | 0/5 | 0/5 | 0/5 |
| reflow cracking resistance 2 | 0/5 | 0/5 | 0/5 | 0/5 | 0/5 | 0/5 | 0/5 | 0/5 | 0/5 | 0/5 |
| reflow cracking resistance 3 | 0/5 | 0/5 | 0/5 | 0/5 | 0/5 | 0/5 | 0/5 | 0/5 | 0/5 | 0/5 |

TABLE 26-continued

| | example | | comparative example | | | example | | comparative example | | |
|---|---|---|---|---|---|---|---|---|---|---|
| evaluation item | 58 | 59 | 76 | 77 | 78 | 60 | 61 | 79 | 80 | 81 |
| high-temp. storage characteristics | | | | | | | | | | |
| 500 h | 0/10 | 0/10 | 0/10 | 0/10 | 0/10 | 0/10 | 0/10 | 0/10 | 0/10 | 0/10 |
| 1000 h | 0/10 | 0/10 | 0/10 | 0/10 | 10/10 | 0/10 | 0/10 | 0/10 | 0/10 | 10/10 |

Examples 1 to 61 which contain the curing accelerator for a curing resin of the invention were superior in the flow properties, the storage stability, the hot hardness, the hot hardness under moisture absorption, the reflow cracking resistance and the high-temperature storage characteristics.

On the other hand, Comparative Examples 1-81 which does not contain the curing accelerator for a curing resin of the invention were inferior in at least one of the storage stability, the hot hardness, the hot hardness under moisture absorption, the reflow cracking resistance and the high-temperature storage characteristics as compared with Examples having the same resin composition.

What is claimed is:

1. A method for producing a curing resin composition comprising:
   reacting a phosphine compound (a) with a compound (b) having at least one halogen atom substituted on an aromatic ring and at least one proton atom which can be discharged, to obtain a phosphonium halide;
   subjecting the phosphonium halide to dehydrohalogenation to obtain a phosphine derivative; and
   mixing the phosphine derivative as a curing accelerator (A) with at least a curing resin (B), a curing agent (D) and inorganic filler (E).

2. The method for producing a curing resin composition according to claim 1, wherein the phosphine compound (a) is represented by the following general formula (I):

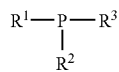
(I)

(wherein $R^1$ to $R^3$ in the formula (I) represent a hydrogen atom, or a substituted or unsubstituted hydrocarbon group having 1 to 18 carbon atoms, and each is the same or different, and two or more of $R^1$ to $R^3$ are optionally mutually bonded to form a cyclic structure).

3. The method for producing a curing resin composition according to claim 1, wherein the compound (b) having at least one halogen atom substituted on the aromatic ring and at least one proton atom which can be discharged is represented by the following general formula (II):

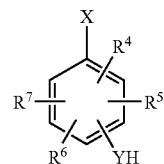
(II)

(wherein $R^4$ to $R^7$ in the formula (II) represent a hydrogen atom or a monovalent organic group having 1 to 18 carbon atoms, and each is the same or different, YH represents a monovalent group having 0 to 18 carbon atoms and at least one proton which can be discharged, X represents a halogen atom, and two or more of $R^4$ to $R^7$ and YH are optionally mutually bonded to form a cyclic structure).

4. The method for producing a curing resin composition according to claim 3, wherein the compound (b) having at least one halogen atom substituted on the aromatic ring and at least one proton atom which can be discharged has a phenolic hydroxyl group.

5. The method for producing a curing resin composition according to claim 2, wherein $R^1$ to $R^3$ in the general formula (I) are a monovalent substituent group selected from the group consisting of an alkyl group and an aryl group which does not have a phenolic hydroxyl group or a mercapto group.

6. The method for producing a curing resin composition according to claim 1, wherein the curing resin (B) contains an epoxy resin (C).

7. The method for producing a curing resin composition according to claim 6, wherein the epoxy resin (C) contains at least one kind of epoxy resin selected from the group consisting of a biphenyl epoxy resin, a stilbene epoxy resin, a diphenylmethane epoxy resin, a sulfur atom content epoxy resin, a novolac epoxy resin, a dicyclopentadiene epoxy resin, a salicylaldehyde epoxy resin, a copolymer epoxy resin of naphthol and cresol, and an epoxidized material of an aralkyl phenolic resin.

8. The method for producing a curing resin composition according to claim 1, wherein the curing agent (D) contains at least one kind selected from the group consisting of an aralkyl phenolic resin, a dicyclopentadiene phenolic resin, a salicylaldehyde phenolic resin, a copolymer resin of a benzaldehyde phenolic resin and the aralkyl phenolic resin, and a novolac phenolic resin.

* * * * *